(12) United States Patent
Ri et al.

(10) Patent No.: US 6,576,386 B1
(45) Date of Patent: Jun. 10, 2003

(54) AROMATIC BLOCK POLYCARBONATE RESIN, DIPHENOL COMPOUND FOR PREPARATION OF THE POLYCARBONATE RESIN, ELECTROPHOTOGRAPHIC PHOTOCONDUCTOR, ELECTROPHOTOGRAPHIC IMAGE FORMING APPARATUS AND PROCESS, AND PROCESS CARTRIDGE

(75) Inventors: Kohkoku Ri, Shizuoka (JP); Masaomi Sasaki, Shizuoka (JP); Kazukiyo Nagai, Shizuoka (JP); Shinichi Kawamura, Shizuoka (JP); Susumu Suzuka, Kanagawa (JP); Katsuhiro Morooka, Kanagawa (JP)

(73) Assignees: Ricoh Company, Ltd., Tokyo (JP); Hodogaya Chemical., Ltd., Kawasaki (JP)

( * ) Notice: Subject to any disclaimer, the term of this patent is extended or adjusted under 35 U.S.C. 154(b) by 0 days.

(21) Appl. No.: 09/635,127

(22) Filed: Aug. 9, 2000

(30) Foreign Application Priority Data

Aug. 10, 1999 (JP) ............................................ 11-226521
Oct. 1, 1999 (JP) ............................................ 11-281648
Jul. 25, 2000 (JP) ...................................... 2000-224229

(51) Int. Cl.[7] .......................... G03G 5/047; G03G 5/05; C08G 69/00
(52) U.S. Cl. ........................ 430/58.7; 430/96; 430/66; 528/203; 525/467
(58) Field of Search ............................... 430/58.7, 59.6, 430/96; 528/203; 525/467

(56) References Cited

U.S. PATENT DOCUMENTS

| | | |
|---|---|---|
| 5,344,985 A | 9/1994 | Tanaka et al. |
| 5,370,954 A | 12/1994 | Ohta et al. |
| 5,436,100 A | 7/1995 | Shimada et al. |
| 5,457,232 A | 10/1995 | Tanaka et al. |
| 5,459,275 A | 10/1995 | Tanaka et al. |
| 5,492,784 A | 2/1996 | Yoshikawa et al. |
| 5,576,132 A | 11/1996 | Tanaka et al. |
| 5,578,405 A | 11/1996 | Ikegami et al. |
| 5,587,516 A | 12/1996 | Tanaka et al. |
| 5,599,995 A | 2/1997 | Tanaka et al. |
| 5,604,065 A | 2/1997 | Shimada et al. |
| 5,616,805 A | 4/1997 | Tanaka et al. |
| 5,672,728 A | 9/1997 | Tanaka et al. |
| 5,672,756 A | 9/1997 | Shimada et al. |
| 5,853,935 A * | 12/1998 | Suzuki et al. ............... 430/59.6 |
| 5,871,876 A * | 2/1999 | Ikuno et al. ................ 430/58.7 |
| 5,942,363 A | 8/1999 | Tanaka et al. |
| 5,981,124 A | 11/1999 | Shimada et al. |
| 6,027,848 A * | 2/2000 | Pai et al. .................. 430/58.05 |
| 6,087,055 A * | 7/2000 | Niimi ........................ 430/58.7 |
| 6,093,784 A * | 7/2000 | Tamura et al. ............. 430/59.6 |
| 6,103,435 A | 8/2000 | Shimada et al. |
| 6,184,362 B1 | 2/2001 | Shimada et al. |
| 6,187,492 B1 * | 2/2001 | Ri et al. ........................ 430/96 |
| 6,191,249 B1 | 2/2001 | Tanaka et al. |

OTHER PUBLICATIONS

Alger, Mark S. Polymer Science Dictionary. London: Elsevier Applied Science. (1989) p. 41.*
Borsenberger, Paul M. Organic Photoreceptors for Imaging Systems. New York: Marcel–Dekker, Inc. pp. 289–293. (1993).*

* cited by examiner

Primary Examiner—Christopher Rodee
(74) Attorney, Agent, or Firm—Oblon, Spivak, McClelland, Maier & Neustadt, P.C.

(57) ABSTRACT

An aromatic block polycarbonate resin is prepared by polymerizing a diphenol compound of formula (2) or (4), a dial compound of formula (1) or (5), and a halogenated carbonyl compound. The diphenol compound of formula (4) is produced by polymerizing the diphenol compound of formula (2) and a halogenated carbonyl compound by solution or interfacial polymerization. An electrophotographic photoconductor has an electroconductive support and a photoconductive layer formed thereon containing the above-mentioned aromatic block polycarbonate resin. An electrophotographic image forming method or apparatus employs the above-mentioned photoconductor. A process cartridge holds therein the photoconductor and at least one of the electrophotographic image forming units.

4 Claims, 23 Drawing Sheets

AROMATIC BLOCK POLYCARBONATE RESIN, DIPHENOL COMPOUND FOR PREPARATION OF THE POLYCARBONATE RESIN, ELECTROPHOTOGRAPHIC PHOTOCONDUCTOR, ELECTROPHOTOGRAPHIC IMAGE FORMING APPARATUS AND PROCESS, AND PROCESS CARTRIDGE

BACKGROUND OF THE INVENTION

1. Field of the Invention

The present invention relates to an aromatic block polycarbonate resin which is useful as the photoconductive material for use in the electrophotographic photoconductor, and the production process of the aromatic block polycarbonate resin. The present invention also relates to a diphenol compound used to produce the above-mentioned polycarbonate resin, and the production process of the diphenol compound. Further, the present invention relates to an electrophotographic photoconductor comprising an electroconductive support and a photoconductive layer formed thereon, comprising the above-mentioned aromatic block polycarbonate resin. In addition, the present invention also relates to an electrophotographic image forming apparatus and method using the above-mentioned photoconductor, and a process cartridge which is freely attachable to the image forming apparatus and detachable therefrom.

2. Discussion of Background

Conventionally known representative aromatic polycarbonate resins are obtained by allowing 2,2-bis(4-hydroxyphenyl)propane (hereinafter referred to as bisphenol A) to react with phosgene or diphenylcarbonate. Such polycarbonate resins made from bisphenol A are used in many fields because of their excellent characteristics, such as high transparency, high heat resistance, high dimensional accuracy, and high mechanical strength.

For example, this kind of polycarbonate resin is intensively studied as a binder resin for use in an organic photoconductor in the electrophotographic field.

Recently organic photoconductors (OPC) are used in many copying machines and printers. These organic photoconductors have a layered structure comprising a charge generation layer (CGL) and a charge transport layer (CTL) which are successively overlaid on an electroconductive support. The charge transport layer (CTL) comprises a binder resin and a low-molecular-weight charge transport material (CTM). The addition of such a low-molecular-weight charge transport material (CTM) to the binder resin lowers the intrinsic mechanical strength of the binder resin, so that the CTL film becomes fragile. The result is that the abrasion resistance of the photoconductor is lowered, so that scratches and cracks are easily formed on the surface of the photoconductor. The durability of the photoconductor is thus impaired.

Although some vinyl polymers such as polyvinyl anthracene, polyvinyl pyrene and poly-N-vinylcarbazole have been studied as high-molecular weight photoconductive materials for forming a charge transport complex for use in the conventional organic photoconductor, such polymers are not satisfactory from the viewpoint of photosensitivity.

In addition, high-molecular weight materials having charge transporting properties have been also studied to eliminate the shortcomings of the above-mentioned layered photoconductor. For instance, there are proposed an acrylic resin having a triphenylamine structure as reported by M. Stolka et al., in "J. Polym. Sci., vol 21, 969 (1963)"; a vinyl polymer having a hydrazone structure as described in "Japan Hard Copy '89 p. 67"; and polycarbonate resins having a triarylamine structure as disclosed in U.S. Pat. Nos. 4,801,517, 4,806,443, 4,806,444, 4,937,165, 4,959,288, 5,030,532, 5,034,296, and 5,080,989, and Japanese Laid-Open Patent Applications Nos. 64-9964, 3-221522, 2-304456, 4-11627, 4-175337, 4-18371, 4-31404, and 4-133065. However, any materials have not yet been put to practical use.

According to the report of "Physical Review B46 6705 (1992)" by M. A. Abkowitz et al., it is confirmed that the drift mobility of a high-molecular weight charge transport material is lower than that of a low-molecular weight material by one figure. This report is based on the comparison between the photoconductor comprising a low-molecular weight tetraarylbenzidine derivative dispersed in the photoconductive layer and the one comprising a high-molecular polycarbonate having a tetraarylbenzidine structure in its molecule. The reason for this has not been clarified, but it is considered that the photoconductor employing the high-molecular weight charge transport material produces poor results in terms of the photosensitivity and the residual potential although the mechanical strength of the photoconductor is improved.

To solve the above-mentioned problem, various copolymers having a triarylamine structure were put forward as the high-molecular weight photoconductive materials. Most of these copolymers are in the form of a random copolymer or an alternating copolymer. Although each copolymer includes a charge transporting monomer and a monomer capable of improving the wear resistance, such charge transporting properties and wear resistance improving properties are leveled when those monomers are combined in the form of a random or alternating copolymer. The conventional photoconductors employing the above-mentioned random or alternating copolymers cannot meet the overall requirements.

SUMMARY OF THE INVENTION

It is therefore a first object of the present invention to provide an aromatic polycarbonate resin useful as the high-molecular weight material with charge transporting properties for use in the organic electrophotographic photoconductor.

A second object of the present invention is to provide a production process of the above-mentioned aromatic polycarbonate resin.

A third object of the present invention is to provide a diphenol compound serving to produce the above-mentioned aromatic polycarbonate resin.

A fourth object of the present invention is to provide a production process of the diphenol compound.

A fifth object of the present invention is to provide an electrophotographic photoconductor with high sensitivity and durability.

A sixth object of the present invention is to provide an electrophotographic process.

A seventh object of the present invention is to provide an electrophotographic image forming apparatus.

An eighth object of the present invention is to provide a process cartridge freely detachable from the image forming apparatus.

The above-mentioned first object of the present invention can be achieved by an aromatic block polycarbonate resin prepared by polymerizing a diphenol compound having a tertiary amine structure, a diol compound represented by formula (1), and a halogenated carbonyl compound,

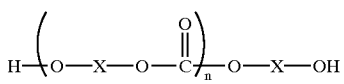
(1)

wherein n is an integer of 1 to 50, and X is a substituted or unsubstituted bivalent aliphatic group, a substituted or unsubstituted bivalent cyclic aliphatic group, a substituted or unsubstituted bivalent aromatic group, a bivalent group prepared by bonding the aforementioned bivalent groups, or a bivalent group represented by formula (1-a), (1-b), or (1-c):

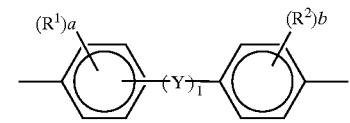
(1-a)

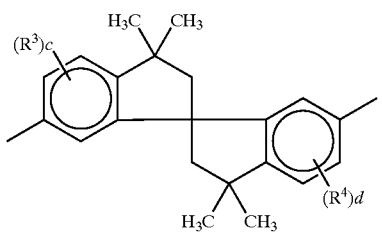
(1-b)

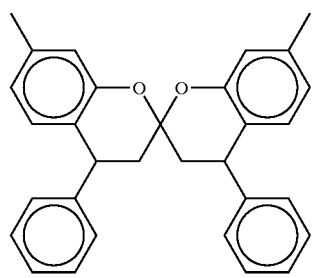
(1-c)

in which $R^1$, $R^2$, $R^3$, and $R^4$ are each independently an alkyl group which may have a substituent, an aryl group which may have a substituent, or a halogen atom; a and b are each independently an integer of 0 to 4; c and d are each independently an integer of 0 to 3; and l is an integer of 0 or 1, and when l=1, Y is a straight-chain alkylene group having 2 to 12 carbon atoms, a substituted or unsubstituted branched alkylene group having 3 to 12 carbon atoms, a bivalent group comprising at least one alkylene group having 1 to 10 carbon atoms, and at least one oxygen atom and/or one sulfur atom, —O—, —S—, —SO—, —SO$_2$—, —CO—, —COO—,

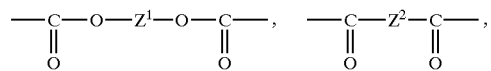

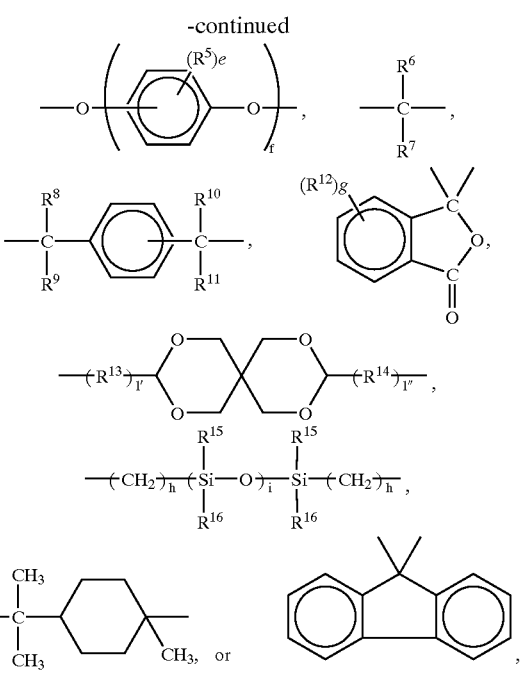

in which $Z^1$ and $Z^2$ are each a substituted or unsubstituted bivalent aliphatic group, or a substituted or unsubstituted arylene group; $R^5$, $R^6$, and $R^{12}$ are each independently a halogen atom, a substituted or unsubstituted alkyl group, a substituted or unsubstituted alkoxyl group, or a substituted or unsubstituted aryl group; $R^7$, $R^8$, $R^9$, $R^{10}$, and $R^{11}$ are each independently a hydrogen atom, a halogen atom, a substituted or unsubstituted alkyl group, a substituted or unsubstituted alkoxyl group, or a substituted or unsubstituted aryl group, and $R^6$ and $R^7$ may form together a carbon ring having 5 to 12 carbon atoms; l' and l" are each an integer of 0 or 1, and when l'=1 and l"=1, $R^{13}$ and $R^{14}$ are each an alkylene group having 1 to 4 carbon atoms, $R^{15}$ and $R^{16}$ are each independently a substituted or unsubstituted alkyl group or a substituted or unsubstituted aryl group; e and g are each independently an integer of 0 to 4; f is an integer of 1 or 2; h is an integer of 0 to 20; and i is an integer of 0 to 2000.

In the above-mentioned aromatic block polycarbonate resin, it is preferable that the diphenol compound be represented by formula (2):

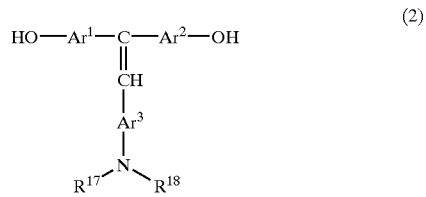
(2)

wherein $Ar^1$, $Ar^2$, and $Ar^3$ are each a substituted or unsubstituted arylene group; and $R^{17}$ and $R^{18}$, which may be the same or different, are each an acyl group, an alkyl group which may have a substituent, or an aryl group which may have a substituent.

The first object of the present invention can be achieved by an aromatic block polycarbonate resin of formula (3):

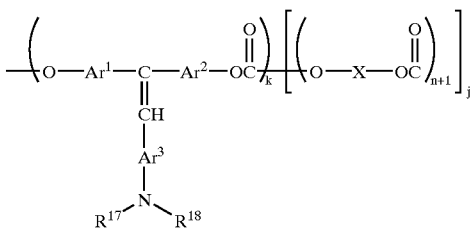

(3)

wherein $Ar^1$, $Ar^2$, $Ar^3$, $R^{17}$, $R^{18}$, X, and n are the same as those previously defined; and k and j represent the composition ratios, and $0<k/(k+j)<1$.

The first object of the present invention can also be achieved by an aromatic block polycarbonate resin of formula (6) prepared by polymerizing a diphenol compound represented by formula (4), a diol compound represented by formula (5), and a halogenated carbonyl compound,

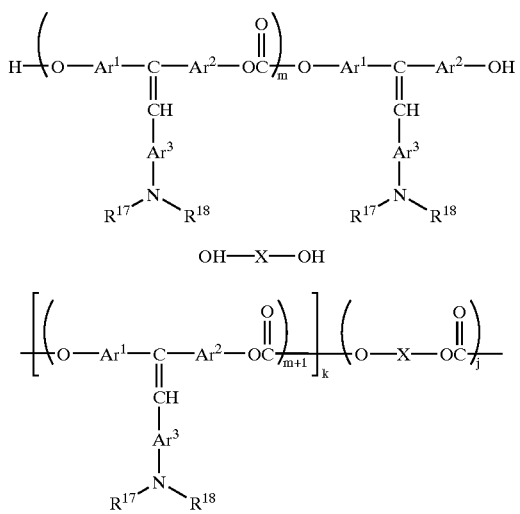

(4)

(5)

(6)

wherein $Ar^1$, $Ar^2$, $Ar^3$, $R^{17}$, $R^{18}$, X, m, k, and j are the same as those previously defined.

The first object can also be achieved by an aromatic block polycarbonate resin represented by the following formula (7), prepared by polymerizing the diphenol compound of formula (4), the diol compound of formula (1), and the halogenated carbonyl compound:

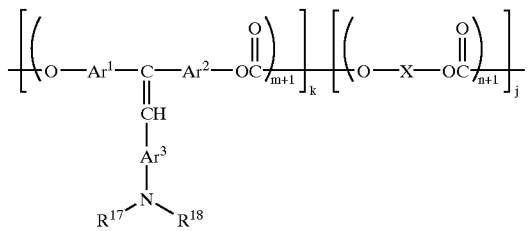

(7)

wherein $Ar^1$, $Ar^2$, $Ar^3$, $R^{17}$, $R^{18}$, and X are the same as those previously defined; n is an integer of 1 to 50; m is an integer of 1 to 30; and k and j represent the composition ratios, and $0<k/(k+j)<1$.

It is preferable that the diol compound of formula (1) used to produce the aromatic block polycarbonate resin have a number-average molecular weight of 500 to 100,000.

Further, it is preferable that the diphenol compound of formula (4) used to produce the aromatic block polycarbonate resin have a number-average molecular weight of 500 to 100,000.

The second object of the present invention can be achieved by a method of producing an aromatic block polycarbonate resin, comprising the steps of polymerizing a diol compound of formula (5) and a halogenated carbonyl compound by solution polymerization or interfacial polymerization, thereby preparing a diol compound of formula (1); polymerizing a diphenol compound of formula (2) and a halogenated carbonyl compound by solution polymerization or interfacial polymerization, thereby preparing a diphenol compound of formula (4); and polymerizing the diol compound of formula (1), the diphenol compound of formula (4), and a halogenated carbonyl compound, thereby preparing the aromatic block polycarbonate resin of formula (7).

The second object of the present invention can also be achieved by a method of producing an aromatic block polycarbonate resin, comprising the steps of polymerizing a dial compound of formula (5) and a halogenated carbonyl compound by solution polymerization or interfacial polymerization, thereby preparing a diol compound of formula (1); and polymerizing the dial compound of formula (1), a diphenol compound of formula (2), a halogenated carbonyl compound, with the addition thereto of a catalyst and a solvent, thereby preparing an aromatic block polycarbonate resin of formula (3).

Further, the second object can be achieved by a method of producing an aromatic block polycarbonate resin, comprising the steps of polymerizing a diphenol compound of formula (2) and a halogenated carbonyl compound by solution polymerization or interfacial polymerization, thereby preparing a diphenol compound of formula (4); and polymerizing the diphenol compound of formula (4), a diol compound of formula (5), a halogenated carbonyl compound, with the addition thereto of a catalyst and a solvent, thereby preparing an aromatic block polycarbonate resin of formula (6).

The third object of the present invention can be achieved by a diphenol compound of formula (4) comprising a tertiary amine structure:

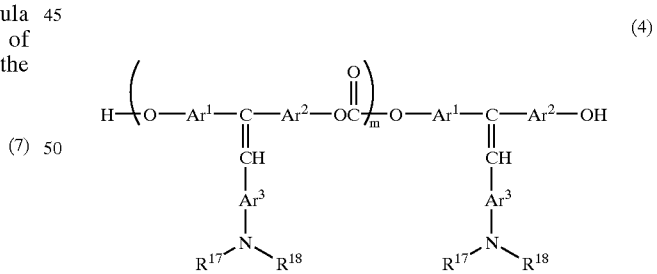

(4)

wherein $Ar^1$, $Ar^2$, and $Ar^3$ are each a substituted or unsubstituted arylene group; $R^{17}$ and $R^{18}$, which may be the same or different, are each an acyl group, an alkyl group which may have a substituent, or an aryl group which may have a substituent; and m is an integer of 1 to 30.

The above-mentioned fourth object of the present invention can be achieved by a method of producing the diphenol compound of formula (4) comprising the step of polymerizing a diphenol compound of formula (2) and a halogenated carbonyl compound by solution polymerization or interfacial polymerization:

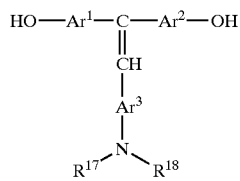

(2)

wherein $Ar^1$, $Ar^2$, $Ar^3$, $R^{17}$, and $R^{18}$ are the same as those previously defined.

The fifth object of the present invention can be achieved by an electrophotographic photoconductor comprising an electroconductive support, and a photoconductive layer formed thereon comprising as an effective component at least one of the above-mentioned aromatic block polycarbonate resins, such as the above-mentioned aromatic block polycarbonate resin of formula (3), (6), or (7).

In the electrophotographic photoconductor, the photoconductive layer may further comprise a charge generation material.

Further, the photoconductive layer may comprise a charge generation layer and a charge transport layer which are successively provided on the electroconductive support, the charge transport layer comprising the aromatic block polycarbonate resin.

In this case, the charge generation layer may be provided on the charge transport layer, or the charge transport layer may be provided on the charge generation layer.

When the charge generation layer is provided on the charge transport layer, a protective layer which comprises the aromatic block polycarbonate resin may be provided on the charge generation layer.

When the charge transport layer is provided on the charge generation layer, the charge transport layer may comprise a first charge transport layer and a second charge transport layer which are successively overlaid on the charge generation layer in this order, the second charge transport layer comprising the aromatic block polycarbonate resin.

When the electrophotographic photoconductor comprises a single-layered photoconductive layer, a protective layer which comprises the aromatic block polycarbonate resin is provided on the photoconductive layer.

The sixth object of the present invention can be achieved by an electrophotographic image forming method comprising the steps of charging the surface of an electrophotographic photoconductor, exposing the charged surface of the photoconductor to a light image, thereby forming a latent electrostatic image on the photoconductor, developing the latent electrostatic image to a visible image, transferring the visible image to an image receiving member, cleaning the surface of the photoconductor, and quenching the residual potential on the surface of the photoconductor, wherein any of the above-mentioned electrophotographic photoconductors employing the aromatic block polycarbonate resin is employed.

The seventh object of the present invention can be achieved by an electrophotographic image forming apparatus comprising an electrophotographic photoconductor capable of forming a latent electrostatic image thereon, charging means for charging the surface of the photoconductor, light exposure means for exposing the charged surface of the photoconductor to a light image, thereby forming a latent electrostatic image on the photoconductor, developing means for developing the latent electrostatic image to a visible image, and image transfer means for transferring the visible image to an image receiving member, wherein any of the above-mentioned electrophotographic photoconductors employing the aromatic block polycarbonate resin is employed.

The eighth object of the present invention can be achieved by a process cartridge which is freely attachable to an electrophotographic image forming apparatus and detachable therefrom, the process cartridge comprising an electrophotographic photoconductor, and at least one means selected from the group consisting of a charging means for charging the surface of the photoconductor, a light exposure means for exposing the photoconductor to a light image to form a latent electrostatic image on the photoconductor, a developing means for developing the latent electrostatic image to a visible image, an image transfer means for transferring the visible image formed on the photoconductor to an image receiving member s and a cleaning means for cleaning the surface of the photoconductor, wherein any of the above-mentioned electrophotographic photoconductors employing the aromatic block polycarbonate resin is employed.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 1:
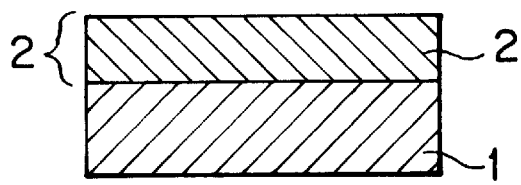
FIG. 1 is a schematic cross-sectional view of a first example of the electrophotographic photoconductor according to the present invention.

An aromatic block polycarbonate resin of the present invention is prepared by polymerizing a diphenol compound with a tertiary amine structure, a diol compound, and a halogenated carbonyl compound.

A block copolymer is obtained by stepwise polymerization. The block copolymer is therefore provided with the properties of each homopolymer prepared by polymerizing the monomers. In other words, it is possible for a block copolymer to have the properties of the respective monomers in combination. In the present invention, a high-molecular photoconductive material with the desired electrical, optical, and mechanical properties can be achieved by block copolymerization.

The aromatic polycarbonate resin of the present invention, in the form of a block copolymer, is prepared using the diphenol compound of formula (2) or (4) having charge transporting properties, and the diol compound of formula (1) or (5) capable of imparting mechanical strength to the obtained resin. The obtained aromatic block polycarbonate resin can meet the requirements of the electrical characteristics and the mechanical strength by controlling the length of the block having charge transporting properties derived from the diphenol compound and the length of the block having wear resistance derived from the diol compound. The aromatic block polycarbonate resin according to the present invention is therefore provided with excellent charge transporting properties and high mechanical strength, so that the photoconductor can exhibit high durability when the aromatic block polycarbonate resin is used as the photoconductive material.

The aromatic block polycarbonate resin of the present invention will now be explained in detail.

To produce the aromatic block polycarbonate resin of the present invention, the polymerization of the diol compound and the diphenol compound together with a halogenated carbonyl compound such as phosgene is carried out in accordance with solution polymerization or interfacial polymerization.

In addition to phosgene, trichloromethyl chloroformate, that is a dimer of phosgene, and bis(trichloromethyl) carbonate, that is a trimer of phosgene, are usable as the halogenated carbonyl compounds in the above-mentioned polymerization. Further, halogenated carbonyl compounds derived from halogen atoms other than chlorine, for example, carbonyl bromide, carbonyl iodide, and carbonyl fluoride can also be employed.

Such conventional synthesis methods are described in the reference, for example, "Handbook of Polycarbonate Resin" (issued by The Nikkan Kogyo Shimbun Ltd.).

The interfacial polymerization is carried out at the interface between two phases of (a) alkaline aqueous solutions of the diol compound and the diphenol compound and (b) an organic solvent which is substantially incompatible with water and capable of dissolving a polycarbonate therein, in the presence of the carbonic acid derivative and a catalyst. In this case, a polycarbonate resin with a narrow molecular-weight distribution can be speedily obtained by emulsifying the reactive medium through the high-speed stirring operation or addition of an emulsifying material. The diol compound or the diphenol compound is first synthesized to prepare a liquid of oligomer of the diol or diphenol compound, and thereafter the corresponding diphenol compound or diol compound may be added to the liquid of oligomer to carry out the polymerization, with the addition of a catalyst when necessary.

As a base for preparing the alkaline aqueous solutions of diol compound and diphenol compound, there can be employed an alkali metal and an alkaline earth metal. Specific examples of the base include hydroxides such as sodium hydroxide, potassium hydroxide, and calcium hydroxide; and carbonates such as sodium carbonate, potassium carbonate, calcium carbonate, and sodium hydrogencarbonate. Those bases may be used alone or in combination. Of those bases, sodium hydroxide and potassium hydroxide are preferable.

In addition, distilled water or deionized water are preferably employed for the preparation of the above-mentioned alkaline aqueous solutions.

Examples of the organic solvent used in the above-mentioned interfacial polymerization are aliphatic halogenated hydrocarbon solvents such as dichloromethane, 1,2-dichloroethane, 1,2-dichloroethylene, trichloroethane, tetrachloroethane, and dichloropropane; aromatic halogenated hydrocarbon solvents such as chlorobenzene and dichlorobenzene; and mixed solvents thereof. Further, aromatic hydrocarbon solvents such as toluene, xylene, and ethylbenzene, or aliphatic hydrocarbon solvents such as hexane and cyclohexane may be added to the above-mentioned solvents. The aliphatic halogenated hydrocarbon solvents and aromatic halogenated hydrocarbon solvents are preferable, and in particular, dichloromethane and chlorobenzene are preferably employed in the present invention.

Examples of the catalyst used in the preparation of the polycarbonate resin include a tertiary amine, a quaternary ammonium salt, a tertiary phosphine, a quaternary phosphonium salt, a nitrogen-containing heterocyclic compound and salts thereof, an iminoether and salts thereof, and an amide-group-containing compound.

Specific examples of such catalysts are trimethylamine, triethylamine, tri-n-propylamine, tri-n-hexylamine, N,N,N',N'-tetramethyl-1,4-tetramethylenediamine, 4-pyrrolidinopyridine, N,N'-dimethylpiperazine, N-ethylpiperidine, benzyltrimethylammonium chloride, benzyltriethylammonium chloride, tetramethylammonium chloride, tetraethylammonium bromide, phenyltriethylammonium chloride, triethylphosphine, triphenylphosphine, diphenylbutylphosphine, tetra(hydroxymethyl)phosphonium chloride, benzyltriethylphosphonium chloride, benzyltriphenylphosphonium chloride, 4-methylpyridine, 1-methylimidazole, 1,2-dimethylimidazole, 3-methylpyridazine, 4,6-dimethylpyrimidine, 1-cyclohexyl-3,5-dimethylpyrazole, and 2,3,5,6-tetramethylpyrazine.

Those catalysts may be used alone or in combination. Of the above-mentioned catalysts, the tertiary amine, in particular, a tertiary amine having 3 to 30 carbon atoms, such as triethylamine is preferably employed in the present invention. Before and/or after the carbonic acid derivatives such as phosgene and bischloroformate are placed in the reaction system, any of the above-mentioned catalysts may be added thereto.

To control the molecular weight of the obtained polycarbonate resin, it is desirable to employ a terminator as a molecular weight modifier in any of the above-mentioned polymerization reactions. Consequently, a substituent derived from the terminator may be bonded to the end of the molecule of the obtained polycarbonate resin.

As the terminator for use in the present invention, a monovalent aromatic hydroxy compound and haloformate derivatives thereof, and a monovalent carboxylic acid and halide derivatives thereof can be used alone or in combination.

Specific examples of the monovalent aromatic hydroxy compound are phenols such as phenol, p-cresol, o-ethylphenol, p-ethylphenol, p-isopropylphenol, p-tert-butylphenol, p-cumylphenol, p-cyclohexylphenol, p-octylphenol, p-nonylphenol, 2,4-xylenol, p-methoxyphenol, p-hexyloxyphenol, p-decyloxyphenol, o-chlorophenol, m-chlorophenol, p-chlorophenol, p-bromophenol, pentabromophenol, pentachlorophenol, p-phenylphenol, p-isopropenylphenol, 2,4-di(1'-methyl-1'-phenylethyl)phenol, β-naphthol, α-naphthol, p-(2',4',4'-trimethylchromanyl)phenol, and 2-(4'-methoxyphenyl)-2-(4'-hydroxyphenyl)propane. In addition, alkali metal salts and alkaline earth metal salts of the above phenols can also be employed. Various haloformate derivatives of the above-mentioned aromatic hydroxy compounds can be used as the terminators.

Specific examples of the monovalent carboxylic acid are aliphatic acids such as acetic acid, propionic acid, butyric acid, valeric acid, caproic acid, heptanic acid, caprylic acid, 2,2-dimethylpropionic acid, 3-methylbutyric acid, 3,3-dimethylbutyric acid, 4-methylvaleric acid, 3,3-dimethylvaleric acid, 4-methylcaproic acid, 3,5-dimethylcaproic acid, and phenoxyacetic acid; and benzoic acids such as benzoic acid, p-methylbenzoic acid, p-tert-butylbenzoic acid, p-butoxybenzoic acid, p-octyloxybenzoic acid, p-phenylbenzoic acid, p-benzylbenzoic acid, and p-chlorobenzoic acid. In addition, alkali metal salts and alkaline earth metal salts of the above-mentioned aliphatic acids and benzoic acids can also be employed. In addition, various halide derivatives of the above-mentioned monovalent carboxylic acids can be employed as the terminators.

The above-mentioned terminators may be used alone or in combination. Of those terminators, the monovalent aromatic hydroxy compound is preferable. Preferable examples of the terminators include phenol, p-tert-butylphenol, and p-cumylphenol.

In the present invention, it is preferable that the aromatic polycarbonate resin thus obtained have a number-average molecular weight of 1,000 to 500,000, and more preferably in the range of 10,000 to 200,000 when expressed by the styrene-reduced value.

Furthermore, a branching agent may be added in a small amount during the polymerization reaction in order to improve the mechanical properties of the obtained polycarbonate resin. Any compounds that have three or more reactive groups, which may be the same or different, selected from the group consisting of an aromatic hydroxyl group, a haloformate group, a carboxylic acid group, a carboxylic acid halide group, and an active halogen atom can be used as the branching agents for use in the present invention.

Specific examples of the branching agents for use in the present invention are as follows:

phloroglucinol,
4,6-dimethyl-2,4,6-tris(4'-hydroxyphenyl)-2-heptene,
4,6-dimethyl-2,4,6-tris(4'-hydroxyphenyl)heptane,
1,3,5-tris(4'-hydroxyphenyl)benzene,
1,1,1-tris(4'-hydroxyphenyl)ethane,
1,1,2-tris(4'-hydroxyphenyl)propane,
α,α,α'-tris(4'-hydroxyphenyl)-1-ethyl-4-isopropyl-benzene,
2,4-bis[α-methyl-α-(4'-hydroxyphenyl)ethyl]phenol,
2-(4'-hydroxyphenyl)-2-(2",4"-dihydroxyphenyl)-propane,
tris(4-hydroxyphenyl)phosphine,
1,1,4,4-tetrakis(4'-hydroxyphenyl)cyclohexane,
2,2-bis[4',4'-bis(4"-hydroxyphenyl)cyclohexyl]propane,
α,α,α',α'-tetrakis(4'-hydroxyphenyl)-1,4-diethylbenzene,
2,2,5, 5-tetrakis(4'-hydroxyphenyl)hexane,
1,1,2,3-tetrakis(4'-hydroxyphenyl)propane,
1,4-bis(4',4"-dihydroxytriphenylmethyl)benzene,
3,3',5,5'-tetrahydroxydiphenyl ether,
3,5-dihydroxybenzoic acid,
3,5-bis(chlorocarbonyloxy)benzoic acid,
4-hydroxyisophthalic acid,
4-chlorocarbonyloxyisophthalic acid,
5-hydroxyphthalic acid,
5-chlorocarbonyloxyphthalic acid,
trimesic trichloride, and
cyanuric chloride.

Those branching agents may be used alone or in combination.

To prevent oxidation of the diols in the alkaline aqueous solution in the course of the polymerization reaction, an antioxidant such as hydrosulfite may be used.

The interfacial polymerization reaction is generally carried out at temperature in the range of 0 to 40° C., and terminated in several minutes to 5 hours. It is desirable to maintain the reaction system to pH 10 or more.

In the case of the solution polymerization, the diol and diphenol compounds are dissolved in a proper solvent to prepare a reaction solution, and a deacidifying agent is added thereto. Then, the bischloroformate compound, or halophosgene or the dimer and trimer of phosgene is added to the above prepared mixture. In this case, tertiary amine compounds such as trimethylamine, triethylamine, and tripropylamine, and pyridine can be used as the deacidifying agents.

Examples of the solvent for use in the above-mentioned solution polymerization are halogenated hydrocarbon solvents such as dichloromethane, dichloroethane, trichloroethane, tetrachloroethane, trichloroethylene, and chloroform; cyclic ethers such as tetrahydrofuran and dioxane; and pyridine.

The same terminators and branching agents as used in the interfacial polymerization are usable in the solution polymerization. The reaction temperature is generally in the range of 0 to 40° C. In this case, the solution polymerization is generally terminated in several minutes to 5 hours.

The polycarbonate resin thus synthesized is purified by removing the catalyst and the antioxidant used in the polymerization; unreacted diol and terminator; and impurities such as an inorganic salt generated during the polymerization. The previously mentioned "Handbook of Polycarbonate Resin" (issued by Nikkan Kogyo Shimbun Ltd.) can be referred to for such a procedure for purifying the polycarbonate resin.

To the aromatic polycarbonate resin produced by the previously mentioned methods, various additives such as an antioxidant, a light stabilizer, a lubricant, and a plasticizer can be added when necessary.

When the block copolymerization is carried out to produce the block polycarbonate resin of the present invention, at least one of the diol compound or the diphenol compound is a high polymer. To be more specific, the previously mentioned diol compound of formula (1) or diphenol compound of formula (4) is employed for the block copolymerization. The polycarbonate resin is thus prepared in the form of a block copolymer.

As well known in the filed of polymer alloy, the block copolymer has not only the connectivity of segments as can be seen in the usual high polymer, but also the properties resulting from the connection between different types of molecule. Namely, there can be seen an intra molecular multiconstituent system in the block copolymer. Such a connection between different types of molecule causes microphase segregation. The phase separation of the block copolymer is determined by the kinds of constituents, molecular weights thereof, and the composition ratio, and the block copolymer has a thermodynamically stable structure, such as a spherical structure, rod-shaped structure, alternating layer structure, or cocontinuous phase structure.

In the block polycarbonate of the present invention, the tendency of phase separation becomes more conspicuous, and the block polycarbonate forms a phase separation structure more easily as the molecular weight of each composition is increased and the difference in solubility parameters of both components is extended. However, the block polycarbonate resin of the present invention does not necessarily cause the microphase segregation. When the molecular weight of each composition is relatively low, and the difference in solubility parameter is relatively small, the block polycarbonate exhibits compatibility without causing the phase separation.

In the present invention, the diphenol compound of formula (4) is prepared by polymerizing a diphenol compound of formula (2) and a halogenated carbonyl compound by solution polymerization or interfacial polymerization. Similarly, the diol compound of formula (1) is prepared by polymerizing a diol compound of formula (5) and a halogenated carbonyl compound by solution polymerization or interfacial polymerization.

The diol compound of formula (1) and the diphenol compound of formula (4) are isolated from the respective reaction mixtures, are subjected to solution polymerization of interfacial polymerization, with the amounts of catalyst and halogenated carbonyl compound being controlled. Thus, an aromatic block polycarbonate resin represented by formula (7) can be prepared.

Alternatively, a diol compound of formula (1) is prepared by polymerizing a diol compound of formula (5) and a halogenated carbonyl compound by solution polymerization or interfacial polymerization. To the reaction system of the thus obtained diol compound of formula (1), a diphenol compound having a tertiary amine structure and a halogenated carbonyl compound are added to carry out the polymerization, with the addition thereto of a catalyst and a solvent. Likewise, a diphenol compound of formula (4) is prepared by polymerizing a diphenol compound of formula (2) and a halogenated carbonyl compound by solution polymerization or interfacial polymerization. To the reaction system of the thus obtained diphenol compound of formula (4), a diol compound and a halogenated carbonyl compound are added to carry out the polymerization, with the addition thereto of a catalyst and a solvent.

It is preferable that the diol compound of formula (1) have a number-average molecular weight of 500 to 100,000, and that the diphenol compound have a number-average molecular weight of 500 to 100,000. In the case where the polymerization is carried out using the above-mentioned diol compound and diphenol compound, the obtained aromatic polycarbonate resin in the form of a block copolymer can exhibit excellent electrophotographic characteristics and mechanical strength when used in the photoconductor.

To regulate the molecular weights of the diol compound and the diphenol compound, for example, the amount of pyridine serving as a catalyst in the solution polymerization may be controlled. Thus, there can be obtained the diol compound and diphenol compound with desired molecular weights.

The diphenol compound having a tertiary amine structure represented by formula (4) is a novel compound.

The diphenol compound of formula (2), that is the starting material for the diphenol compound of formula (4), will now be explained in detail.

In formula (2), $R^{17}$ and $R^{18}$ are each an acyl group, an alkyl group which may have a substituent, or an aryl group which may have a substituent.

As the acyl group, there can be employed acyl groups having 1 to 10 carbon atoms.

The alkyl group represented by $R^{17}$ and $R^{18}$ is a straight-chain or branched alkyl group having 1 to 5 carbon atoms. The alkyl group may have a substituent such as a fluorine atom, cyano group, or a phenyl group which may have a substituent selected from the group consisting of a halogen atom, and a straight-chain or branched alkyl group having 1 to 5 carbon atoms.

Specific examples of such a substituted or unsubstituted alkyl group are methyl group, ethyl group, n-propyl group, i-propyl group, t-butyl group, s-butyl group, n-butyl group, i-butyl group, trifluoromethyl group, 2-cyanoethyl group, benzyl group, 4-chlorobenzyl group, and 4-methylbenzyl group.

Examples of the aryl group represented by $R^{17}$ and $R^{18}$ are phenyl group, naphthyl group, biphenylyl group, terphenylyl group, pyrenyl group, fluorenyl group, 9,9-dimethyl-2-fluorenyl group, azulenyl group, anthryl group, triphenylenyl group, chrysenyl group, fluorenylidene-phenyl group, 5H-dibenzo[a,d]cycloheptenylidenephenyl group, thienyl group, benzothienyl group, furyl group, benzofuranyl group, carbazolyl group, pyridinyl group, pyrrolidyl group, and oxazolyl group.

The above-mentioned aryl group may have a substituent such as the previously mentioned substituted or unsubstituted alkyl group, substituted or unsubstituted alkoxyl group having the above-mentioned alkyl group, a halogen atom such as fluorine atom, chlorine atom, bromine atom, or iodine atom, or an amino group represented by the following formula:

wherein $R^{19}$ and $R^{20}$ are each a substituted or unsubstituted alkyl group or a substituted or unsubstituted aryl group, and $R^{19}$ and $R^{20}$ may form a ring together or in combination with a carbon atom of the aryl group to constitute piperidino group, morpholino group, or julolidyl group.

The same examples of the substituted or unsubstituted alkyl groups and the same examples of the substituted or unsubstituted aryl group as explained in the definition of $R^{17}$ and $R^{18}$ are applicable to $R^{19}$ and $R^{20}$.

$Ar^1$, $Ar^2$, and $Ar^3$ in formula (2) are each a substituted or unsubstituted arylene group.

The above-mentioned definition is applicable to other formulas as long as the symbols are identical.

To produce aromatic block polycarbonate resins of the present invention, conventional diphenols other than the above-mentioned diphenol compounds of formulas (2) and (4) having a tertiary amine structure can be used to improve the electrical and mechanical characteristics of the obtained polycarbonate resins as long as the employed diphenol compound has charge transporting properties.

Examples of the above-mentioned conventional diphenol compounds with charge transporting properties are as follows: distyrylbenzene derivatives (Japanese Laid-Open Patent Application 9-71642), diphenetylbenzene derivatives (Japanese Laid-Open Patent Application 9-104746), α-phenylstilbene derivatives (Japanese Laid-Open Patent Application 11-5836), butadiene derivatives (Japanese Laid-Open Patent Application 9-235367), hydrogenated butadiene derivatives (Japanese Laid-Open Patent Application 9-87376), diphenylcyclohexane derivatives (Japanese Laid-Open Patent Application 9-110976), distyryltriphenylamine derivatives (Japanese Laid-Open Patent Application 9-268226), distyryldiamine derivatives (Japanese Laid-Open Patent Application 11-60718), diphenyldistyrylbenzene derivatives (Japanese Laid-Open Patent Applications 9-221544 and 9-227669), stilbene derivatives (Japanese Laid-Open Patent Applications 9-157378 and 11-71453), m-phenylenediamine derivatives (Japanese Laid-Open Patent Applications 9-302084 and 9-302085), and resorcin derivatives (Japanese Laid-Open Patent Application 9-328539).

The diphenol compound of formula (2) can be prepared by the conventional method which is disclosed in Japanese Laid-Open Patent Applications 7-258399, 8-269183, 9-151248, 9-241369, and 9-272735 as proposed by the inventors of the present invention.

The diol compound of formula (5) will now be explained in detail.

In the case where X in the diol of formula (5) represents a bivalent aliphatic group or a bivalent cyclic aliphatic group, the representative examples of the diol are as follows: ethylene glycol, diethylene glycol, triethylene glycol, polyethylene glycol, polytetramethylene ether glycol, 1,3-propanediol, 1,4-butanediol, 1,5-pentanediol, 3-methyl-1,5-pentanediol, 1,6-hexanediol, 1,5-hexanediol, 1,7-heptanediol, 1,8-octanediol, 1,9-nonanediol, 1,10-decanediol, 1,11-undecanediol, 1,12-dodecanediol, neopentyl glycol, 2-ethyl-1,6-hexanediol, 2-methyl-1,3-propanediol, 2-ethyl-1,3-propanediol, 2,2-dimethyl-1,3-propanediol, 1,3-cyclohexanediol, 1,4-cyclohexanediol, cyclohexane-1,4-dimethanol, 2,2-bis(4-hydroxycyclohexyl)propane, xylylenediol, 1,4-bis(2-hydroxyethyl)benzene, 1,4-bis(3-hydroxypropyl)benzene, 1,4-bis(4-hydroxybutyl)benzene, 1,4-bis (5-hydroxypentyl)benzene, 1,4-bis(6-hydroxyhexyl)benzene, and isophorone diol.

In the case where X in the diol of formula (5) represents a bivalent aromatic group, there can be employed any bivalent groups derived from the same substituted or unsubstituted aryl group represented by $R^{17}$ and $R^{18}$ as previously defined.

Further, X in formula (5) represents a bivalent group represented by formula (1-a), (1-b), or (1-c):

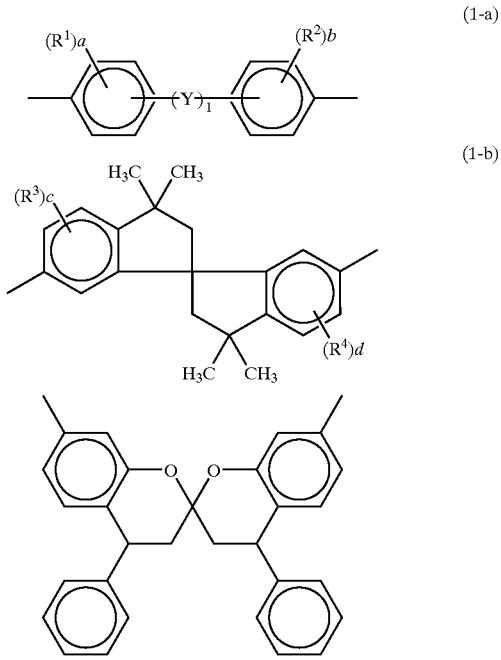

wherein $R^1$, $R^2$, $R^3$, and $R^4$ are each independently an alkyl group which may have a substituent, an aryl group which may have a substituent, or a halogen atom; a and b are each independently an integer of 0 to 4; c and d are each independently an integer of 0 to 3; and l is an integer of 0 or 1, and when l=1, Y is a straight-chain alkylene group having 2 to 12 carbon atoms, a substituted or unsubstituted branched alkylene group having 3 to 12 carbon atoms, a bivalent group comprising at least one alkylene group having 1 to 10 carbon atoms, and at least one oxygen atom and/or one sulfur atom, —O—, —S—, —SO—, —SO$_2$—, —CO—, —COO—,

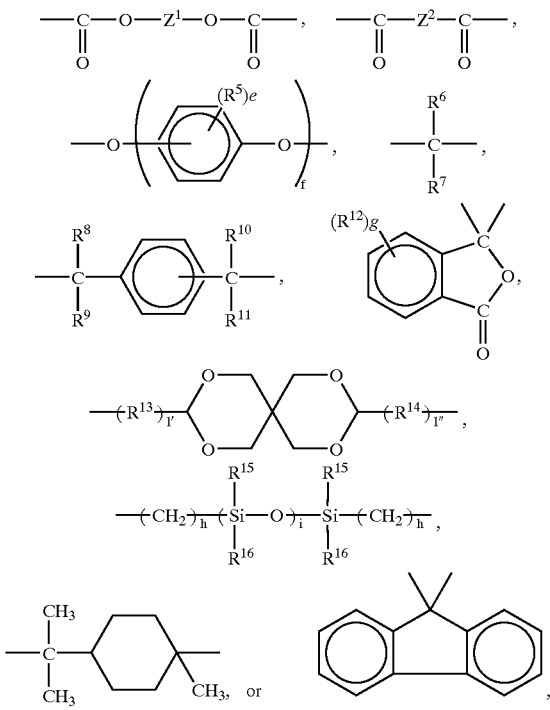

in which $Z^1$ and $Z^2$ are each a substituted or unsubstituted bivalent aliphatic group, or a substituted or unsubstituted arylene group; $R^5$, $R^6$, and $R^{12}$ are each independently a halogen atom, a substituted or unsubstituted alkyl group, a substituted or unsubstituted alkoxyl group, or a substituted or unsubstituted aryl group; $R^7$, $R^8$, $R^9$, $R^{10}$, and $R^{11}$ are each independently a hydrogen atom, a halogen atom, a substituted or unsubstituted alkyl group, a substituted or unsubstituted alkoxyl group, or a substituted or unsubstituted aryl group, and $R^6$ and $R^7$ may form together a carbon ring having 5 to 12 carbon atoms; l' and l" are each an integer of 0 or 1, and when l'=1 and l"=1, $R^{13}$ and $R^{14}$ are each an alkylene group having 1 to 4 carbon atoms; $R^{15}$ and $R^{16}$ are each independently a substituted or unsubstituted alkyl group or a substituted or unsubstituted aryl group; e and g are each independently an integer of 0 to 4; f is an integer of 1 or 2; h is an integer of 0 to 20; and i is an integer of 0 to 2000.

When Y in formula (1-a) is a bivalent group comprising at least one alkylene group having 1 to 10 carbon atoms and at least one oxygen atom and/or sulfur atom, as mentioned above, the following specific examples can be employed:

OCH$_2$CH$_2$O,
OCH$_2$CH$_2$OCH$_2$CH$_2$O,
OCH$_2$CH$_2$OCH$_2$CH$_2$OCH$_2$CH$_2$O,
OCH$_2$CH$_2$CH$_2$O,
OCH$_2$CH$_2$CH$_2$CH$_2$O,
OCH$_2$CH$_2$CH$_2$CH$_2$CH$_2$CH$_2$O,
OCH$_2$CH$_2$CH$_2$CH$_2$CH$_2$CH$_2$CH$_2$CH$_2$O,
CH$_2$O,
CH$_2$CH$_2$O,
CHE$_t$OCHE$_t$O (E$_t$=ethylene group),
CHCH$_3$O,
SCH$_2$OCH$_2$S,
CH$_2$OCH$_2$,
OCH$_2$OCH$_2$O,
SCH$_2$CH$_2$OCH$_2$OCH$_2$CH$_2$S$_1$,
OCH$_2$CHCH$_3$OCH$_2$CHCH$_3$O,
SCH$_2$S,
SCH$_2$CH$_2$S,
SCH$_2$CH$_2$CH$_2$S,
SCH$_2$CH$_2$CH$_2$CH$_2$S,
SCH$_2$CH$_2$CH$_2$CH$_2$CH$_2$CH$_2$S,
SCH$_2$CH$_2$SCH$_2$CH$_2$S, and
SCH$_2$CH$_2$OCH$_2$CH$_2$OCH$_2$CH$_2$S.

When Y in formula (1-a) represents a branched alkylene group having 3 to 12 carbon atoms, there can be employed as the substituent an aryl group which may have a substituent or a halogen atom.

The aforementioned substituted or unsubstituted alkyl group, and substituted or unsubstituted aryl group are the same as those defined in $R^{17}$ and $R^{18}$.

When $Z^1$ and $Z^2$ are each a substituted or unsubstituted bivalent aliphatic group, there can be employed any bivalent groups obtained by removing hydroxyl group from the diol where X represents a bivalent aliphatic group or bivalent cyclic aliphatic group.

When $Z^1$ and $Z^2$ are each a substituted or unsubstituted arylene group, there can be employed any bivalent groups derived from the above-mentioned substituted or unsubstituted aryl group represented by $R^{17}$ and $R^{18}$.

Preferable examples of the diol of formula (5) in which X represents a bivalent aromatic group are as follows:

bis(4-hydroxyphenyl)methane,
bis(2-methyl-4-hydroxyphenyl)methane,
bis(3-methyl-4-hydroxyphenyl)methane,
1,1-bis(4-hydroxyphenyl)ethane,
1,2-bis(4-hydroxyphenyl)ethane,
bis(4-hydroxyphenyl)phenylmethane,
bis(4-hydroxyphenyl)diphenylmethane,
1,1-bis(4-hydroxyphenyl)-1-phenylethane,
1,3-bis(4-hydroxyphenyl)-1,1-dimethylpropane,
2,2-bis(4-hydroxyphenyl)propane,
2-(4-hydroxyphenyl)-2-(3-hydroxyphenyl)propane,
1,1-bis(4-hydroxyphenyl)-2-methylpropane,
2,2-bis(4-hydroxyphenyl)butane,
1,1-bis(4-hydroxyphenyl)-3-methylbutane,
2,2-bis(4-hydroxyphenyl)pentane,
2,2-bis(4-hydroxyphenyl)-4-methylpentane,
2,2-bis(4-hydroxyphenyl)hexane,
4,4-bis(4-hydroxyphenyl)heptane,
2,2-bis(4-hydroxyphenyl)nonane,
bis(3,5-dimethyl-4-hydroxyphenyl)methane,
2,2-bis(3-methyl-4-hydroxyphenyl)propane,
2,2-bis(3-isopropyl-4-hydroxyphenyl)propane,
2,2-bis(3-sec-butyl-4-hydroxyphenyl)propane,
2,2-bis(3-tert-butyl-4-hydroxyphenyl)propane,
2,2-bis(3-cyclohexyl-4-hydroxyphenyl)propane,
2,2-bis(3-allyl-4-hydroxyphenyl)propane,
2,2-bis(3-phenyl-4-hydroxyphenyl)propane, 2,2-bis(3,5-dimethyl-4-hydroxyphenyl)propane,
2,2-bis(3-chloro-4-hydroxyphenyl)propane,
2,2-bis(3,5-dichloro-4-hydroxyphenyl)propane,
2,2-bis(3-bromo-4-hydroxyphenyl)propane,
2,2-bis(3,5-dibromo-4-hydroxyphenyl)propane,
2,2-bis(4-hydroxyphenyl)hexafluoropropane,
1,1-bis(4-hydroxyphenyl)cyclopentane,
1,1-bis(4-hydroxyphenyl)cyclohexane,
1,1-bis(3-methyl-4-hydroxyphenyl)cyclohexane,
1,1-bis(3,5-dimethyl-4-hydroxyphenyl)cyclohexane,
1,1-bis(3,5-dichloro-4-hydroxyphenyl)cyclohexane,
1,1-bis(4-hydroxyphenyl)-3,3,5-trimethylcyclohexane,
1,1-bis(4-hydroxyphenyl)cycloheptane,
2,2-bis(4-hydroxyphenyl)norbornane,
2,2-bis(4-hydroxyphenyl)adamantane,
4,4'-dihydroxydiphenyl ether,
4,4'-dihydroxy-3,3'-dimethyldiphenyl ether,
ethylene glycol bis(4-hydroxyphenyl)ether,
1,3-bis(4-hydroxyphenoxy)benzene,
1,4-bis(3-hydroxyphenoxy)benzene,
4,4'-dihydroxydiphenylsulfide,
3,3'-dimethyl-4,4'-dihydroxydiphenylsulfide,
3,3',5,5'-tetramethyl-4,4'-dihydroxydiphenylsulfide,
4,4'-dihydroxydiphenylsulfoxide,
3,3'-dimethyl-4,4'-dihydroxydiphenylsulfoxide,
4,4'-dihydroxydiphenylsulfone,
3,3'-dimethyl-4,4'-dihydroxydiphenylsulfone,
3,3'-diphenyl-4,4'-dihydroxydiphenylsulfone,
3,3'-dichloro-4,4'-dihydroxydiphenylsulfone,
bis(4-hydroxyphenyl)ketone,
bis(3-methyl-4-hydroxyphenyl)ketone,
3,3,3',3'-tetramethyl-6,6'-dihydroxyspiro(bis)indane,
3,3',4,4'-tetrahydro-4,4,4',4'-tetramethyl-2,2'-spirobi(2H-1-benzopyran)-7,7'-diol,
trans-2,3-bis(4-hydroxyphenyl)-2-butene,
9,9-bis(4-hydroxyphenyl)fluorene,
9,9-bis(4-hydroxyphenyl)xanthene,
1,6-bis(4-hydroxyphenyl)-1,6-hexanedione,
α,α,α',α'-tetramethyl-α,α'-bis(4-hydroxyphenyl)-p-xylene,
α,α,α',α'-tetramethyl-α,α'-bis(4-hydroxyphenyl)-m-xylene,
2,6-dihydroxybenzo-p-dioxane,
2,6-dihydroxythianthrene,
2,7-dihydroxyphenoxathine,
9,10-dimethyl-2,7-dihydroxyphenazine,
3,6-dihydroxydibenzofuran,
3,6-dihydroxydibenzothiophene,
4,4'-dihydroxybiphenyl,
1,4-dihydroxynaphthalene,
2,7-dihydroxypyrene,
hydroquinone,
resorcin,
4-hydroxyphenyl-4-hydroxybenzoate,
ethylene glycol-bis(4-hydroxybenzoate),
diethylene glycol-bis(4-hydroxybenzoate),
triethylene glycol-bis(4-hydroxybenzoate),
p-phenylene-bis(4-hydroxybenzoate),
1,6-bis(4-hydroxybenzoyloxy)-1H,1H,6H,6H-perfluorohexane,
1,4-bis(4-hydroxybenzoyloxy)-1H,1H,4H,4H-perfluorobutane,
1,3-bis(4-hydroxyphenyl)tetramethyldisiloxane, and
phenol-modified silicone oil.

Further, an aromatic diol having an ester linkage produced by the reaction between 2 moles of a diol and one mole of isophthaloyl chloride or terephthaloyl chloride is also usable.

The same symbol as in formula (5) has the previously mentioned definition even in other formulas.

In the block polycarbonate resin comprising the block derived from the diol of formula (1) or (5), and the block derived from the diphenol of formula (2) or (4), the composition ratios of the blocks may be freely determined. Since the charge transporting properties of the polycarbonate resin are determined by the composition ratio of the block derived from the diphenol of formula (2) or (4), it is preferable that the composition ratio of the block derived from the diphenol of formula (2) or (4) be 5 mol % or more.

According to the present invention, at least one of the previously mentioned aromatic block polycarbonate resins is contained in different ways, for example, in photoconductive layers 2, 2a, 2b, 2c, 2d, and 2e, as shown in FIG. 1 through FIG. 6.

In the photoconductor shown in FIG. 1, a photoconductive layer 2 is formed on an electroconductive support 1, which photoconductive layer 2 comprises the previously mentioned aromatic block polycarbonate resin and a sensitizing dye, with the addition thereto of a binder agent (binder resin) when necessary. In this photoconductor, the aromatic block polycarbonate resin works as a photoconductive material, through which charge carriers necessary for the light decay of the photoconductor are generated and transported. However, the aromatic block polycarbonate resin itself scarcely absorbs light in the visible light range, and therefore, it is necessary to add a sensitizing dye which absorbs light in the visible light range in order to form latent electrostatic images by use of visible light.

Figure 2:
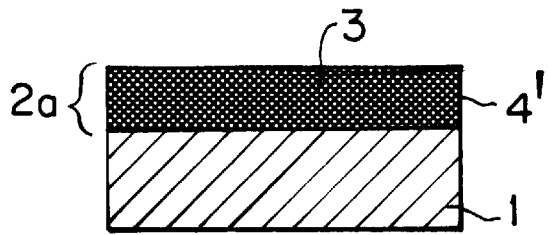
FIG. 2 is a schematic cross-sectional view of a second example of the electrophotographic photoconductor according to the present invention.

Referring to FIG. 2, there is shown an enlarged cross-sectional view of another embodiment of an electrophotographic photoconductor according to the present invention. In this photoconductor, there is formed a photoconductive layer 2a on an electroconductive support 1. The photoconductive layer 2a comprises (i) a charge transport medium 4' comprising an aromatic block polycarbonate resin having charge transporting properties according to the present invention, optionally in combination with a binder agent, and (ii) a charge generation material 3 dispersed in the charge transport medium 4'. In this embodiment, the aromatic block polycarbonate resin (or a mixture of the aromatic block polycarbonate resin and the binder agent) constitutes the charge transport medium 4'. The charge generation material 3, which is, for example, an inorganic or organic pigment, generates charge carriers. The charge transport medium 4' accepts the charge carriers generated by the charge generation material 3 and transports those charge carriers.

In this electrophotographic photoconductor of FIG. 2, it is basically necessary that the light-absorption wavelength regions of the charge generation material 3 and the aromatic block polycarbonate resin not overlap in the visible light range. This is because, in order that the charge generation material 3 produce charge carriers efficiently, it is necessary that light pass through the charge transport medium 4' and reach the surface of the charge generation material 3. Since the aromatic block polycarbonate resin of the present invention prepared using the diol compound of formula (1) do not substantially absorb light with a wavelength of 600 nm or more, it can work effectively as a charge transport material when used with the charge generation material 3 which absorbs the light in the visible region to the near infrared region and generates charge carriers. The charge transport medium 4' may further comprise a low-molecular charge transport material.

Figure 3:
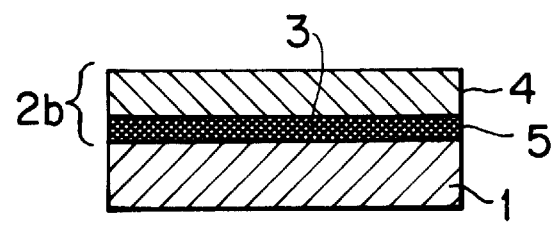
FIG. 3 is a schematic cross-sectional view of a third example of the electrophotographic photoconductor according to the present invention.

Referring to FIG. 3, there is shown an enlarged cross-sectional view of a further embodiment of an electrophotographic photoconductor according to the present invention. In the figure, there is formed on an electroconductive support 1 a two-layered photoconductive layer 2b comprising a charge generation layer 5 containing a charge generation material 3, and a charge transport layer 4 comprising an aromatic block polycarbonate resin with the charge transporting properties according to the present invention.

In this photoconductor, light which has passed through the charge transport layer 4 reaches the charge generation layer 5, and charge carriers are generated within the charge generation layer 5. The charge carriers which are necessary for the light decay for latent electrostatic image formation are generated by the charge generation material 3, and accepted and transported by the charge transport layer 4. The generation and transportation of the charge carriers are performed by the same mechanism as that in the photoconductor shown in FIG. 2.

In this case, the charge transport layer 4 comprises the aromatic block polycarbonate resin of the present invention, optionally in combination with a binder agent. Furthermore, in order to increase the efficiency of generating the charge carriers, the charge generation layer 5 may further comprise the above-mentioned aromatic block polycarbonate resin. For the same purpose, the photoconductive layer 2b including the charge generation layer 5 and the charge transport layer 4 may further comprise the previously mentioned low-molecular charge transport material. This can be applied to the embodiments of FIG. 4 to FIG. 6 to be described later.

Figure 4:
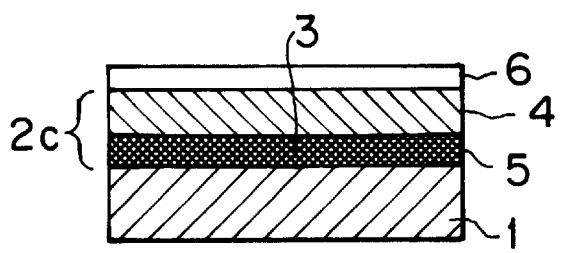
FIG. 4 is a schematic cross-sectional view of a fourth example of the electrophotographic photoconductor according to the present invention.

In the electrophotographic photoconductor of FIG. 3, a protective layer 6 may be provided on the charge transport layer 4 as shown in FIG. 4. The protective layer 6 may comprise the aromatic block polycarbonate resin of the present invention, optionally in combination with a binder agent. The provision of the protective layer 6 is particularly effective when the protective layer 6 is provided on a charge transport layer of conventional low-molecular charge transport material dispersed type. The protective layer 6 may be provided on the photoconductive layer 2a of the photoconductor shown in FIG, 2.

Figure 5:
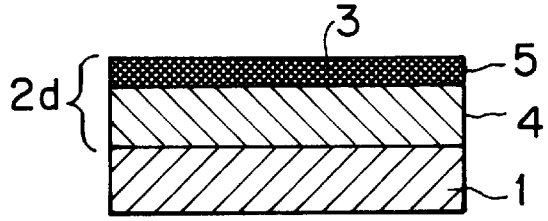
FIG. 5 is a schematic cross-sectional view of a fifth example of the electrophotographic photoconductor according to the present invention.

Referring to FIG. 5, there is shown still another embodiment of an electrophotographic photoconductor according to the present invention. In this figure, the overlaying order of the charge generation layer 5 and the charge transport layer 4 comprising the aromatic block polycarbonate resin is reversed in view of the electrophotographic photoconductor shown in FIG. 3. The mechanism of generation and transportation of the charge carriers is substantially the same as that of the photoconductor shown in FIG. 3.

Figure 6:
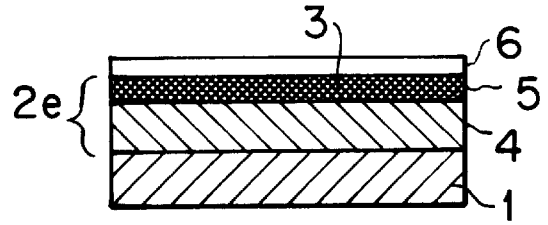
FIG. 6 is a schematic cross-sectional view of a sixth example of the electrophotographic photoconductor according to the present invention.

In the above photoconductor of FIG. 5, a protective layer 6 may be formed on the charge generation layer 5 as shown in FIG. 6 in light of the mechanical strength of the photoconductor.

In the present invention, when the charge generation material comprises a phthalocyanine pigment, the sensitivity and durability of the obtained photoconductor are remarkably improved. In such a case, there can be employed a phthalocyanine pigment having a phthalocyanine skeleton as indicated by the following formula:

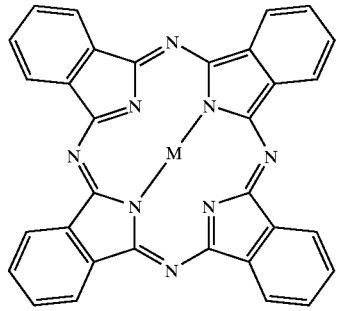

In the above formula, M (central atom) is a metal atom or hydrogen atom.

To be more specific, as the central atom (M) in the above formula, there can be employed an atom of H, Li, Be, Na, Mg, Al, Si, K, Ca, Sc, Ti, V, Cr, Mn, Fe, Co, Ni, Cu, Zn, Ga, Ge, Y, Zr, Nb, Mo, Tc, Ru, Rh, Pd, Ag, Cd, In, Sn, Sb, Ba, Hf, Ta, W, Re, Os, Ir, Pt, Au, Hg, Tl, La, Ce, Pr, Nd, Pm, Sm, Eu, Gd, Tb, Dy, Ho, Er, Tm, Yb, Lu, Th, Pa, U, Np, or Am; and the combination of atoms forming an oxide, chloride, fluoride, hydroxide, or bromide. The central atom is not limited to the above-mentioned atoms.

The above-mentioned charge generation material with a phthalocyanine structure for use in the present invention may have at least the basic structure as indicated by the above-mentioned formula. Therefore, the charge generation material may have a dimer structure or trimer structure, and further, a polymeric structure. Further, the above-mentioned basic structure of the above formula may have a substituent.

Of such phthalocyanine compounds, an oxotitanium phthalocyanine compound which has the central atom (M) of TiO in the above-mentioned formula, and a metal-free phthalocyanine compound which has a hydrogen atom as the central atom (M) are particularly preferred in light of the photoconductive properties of the obtained photoconductor.

In addition, it is known that each phthalocyanine compound has a variety of crystal systems. For example, the above-mentioned oxotitanium phthalocyanine has crystal systems of α-type, β-type, γ-type, m-type, and y-type. In the case of copper phthalocyanine, there are crystal systems of α-type, β-type, and γ-type. The properties of the phthalocyanine compound vary depending on the crystal system thereof although the central metal atom is the same. According to "Electrophotography—the Society Journal—Vol. 29, No. 4 (1990)", it is reported that the properties of the photoconductor vary depending on the crystal system of a phthalocyanine contained in the photoconductor. It is therefore important to select the optimal crystal system of each phthalocyanine compound to obtain the desired photoconductive properties. The oxotitanium phthalocyanine with the y-type crystal system is particularly advantageous.

A plurality of charge generation materials with phthalocyanine skeleton may be used in combination in the charge generation layer. Further, such charge generation materials with phthalocyanine skeleton may be used in combination with other charge generation materials not having phthalocyanine skeleton. In this case, inorganic and organic conventional charge generation materials are usable.

Specific examples of the inorganic charge generation materials are crystalline selenium, amorphous selenium, selenium-tellurium, selenium-tellurium-halogen, seleniumarsenic compound, and a-silicon (amorphous silicon). In particular, when the above-mentioned a-silicon is employed as the charge generation material, it is preferable that the dangling bond be terminated with hydrogen atom or a halogen atom, or be doped with boron atom or phosphorus atom.

Specific examples of the organic charge generation materials that can be used in combination with the phthalocyanine compound include an azulenium salt pigment, a squaric acid methine pigment, an azo pigment having a carbazole skeleton, an azo pigment having a triphenyl-amine skeleton, an azo pigment having a diphenylamine skeleton, an azo pigment having a dibenzothiophene skeleton, an azo pigment having a fluorenone skeleton, an azo pigment having an oxadiazole skeleton, an azo pigment having a bisstilbene skeleton, an azo pigment having a distyryl oxadiazole skeleton, an azo pigment having a distyryl carbazole skeleton, a perylene pigment, an anthraquinone pigment, a polycyclic quinone pigment, a quinone imine pigment, a diphenylmethane pigment, a triphenylmethane pigment, a benzoquinone pigment, a naphthoquinone pigment, a cyanine pigment, an azomethine pigment, an indigoid pigment, and a bisbenzimidazole pigment.

When the electrophotographic photoconductor as shown in FIG. 1 is fabricated, at least one aromatic block polycarbonate resin with charge transporting properties is dissolved in a solvent, with the addition thereto of a binder agent when necessary. To the thus prepared solution, a sensitizing dye is added, so that a coating liquid for photoconductive layer 2 is prepared. The thus prepared photoconductive layer coating liquid is coated on an electroconductive support 1 and dried, so that a photoconductive layer 2 is formed on the electroconductive support 1.

It is preferable that the thickness of the photoconductive layer 2 be in the range of 3 to 50 $\mu$m, more preferably in the range of 5 to 40 $\mu$m. It is preferable that the amount of the aromatic block polycarbonate resin be in the range of 30 to 100 wt. % of the total weight of the photoconductive layer 2. It is preferable that the amount of sensitizing dye for use in the photoconductive layer 2 be in the range of 0.1 to 5 wt. %, more preferably in the range of 0.5 to 3 wt. % of the total weight of the photoconductive layer 2.

Specific examples of the sensitizing dye for use in the present invention are triarylmethane dyes such as Brilliant Green, Victoria Blue B, Methyl Violet, Crystal Violet, and Acid Violet 6B; xanthene dyes such as Rhodamine B, Rhodamine 6G, Rhodamine G Extra, Eosin S, Erythrosin, Rose Bengale, and Fluoresceine; thiazine dyes such as Methylene Blue; and cyanine dyes such as cyanin.

The electrophotographic photoconductor shown in FIG. 2 can be produced by the following method. The finely-divided particles of the charge generation material 3 are dispersed in a solution in which at least one aromatic block polycarbonate resin of the present invention, or a mixture of the aromatic block polycarbonate resin and the binder agent is dissolved, so that a coating liquid for photoconductive layer 2a is prepared. The coating liquid thus prepared is coated on the electroconductive support 1 and then dried, whereby the photoconductive layer 2a is provided on the electroconductive support 1.

It is preferable that the thickness of the photoconductive layer 2a be in the range of 3 to 50 $\mu$m, more preferably in the range of 5 to 40 $\mu$m. It is preferable that the amount of the aromatic block polycarbonate resin be in the range of 40 to 100 wt. % of the total weight of the photoconductive layer 2a. It is preferable that the amount of the charge generation material 3 for use in the photoconductive layer 2a be in the range of 0.1 to 50 wt. %, more preferably in the range of 1 to 20 wt. % of the total weight of the photoconductive layer 2a.

Specific examples of the charge generation material 3 for use in the present invention are as follows: inorganic materials such as selenium, selenium-tellurium, cadmium sulfide, cadmium sulfide-selenium, and $\alpha$-silicon (amorphous silicon); and organic materials, for example, azo pigments, such as C.I. Pigment Blue 25 (C.I. 21180), C.I. Pigment Red 41 (C.I. 21200), C.I. Acid Red 52 (C.I. 45100), C.I. Basic Red 3 (C.I. 45210), an azo pigment having a carbazole skeleton (Japanese Laid-Open Patent Application 53-95033), an azo pigment having a distyryl benzene skeleton (Japanese Laid-Open Patent Application 53-133445), an azo pigment having a triphenylamine skeleton (Japanese Laid-Open Patent Application 53-132347), an azo pigment having a dibenzothiophene skeleton (Japanese Laid-Open Patent Application 54-21728), an azo pigment having an oxadiazole skeleton (Japanese Laid-Open Patent Application 54-12742), an azo pigment having a fluorenone skeleton (Japanese Laid-Open Patent Application 54-22834), an azo pigment having a bisstilbene skeleton (Japanese Laid-Open Patent Application 54-17733), an azo pigment having a distyryl oxadiazole skeleton (Japanese Laid-Open Patent Application 54-2129), and an azo pigment having a distyryl carbazole skeleton (Japanese Laid-Open Patent Application 54-14967); phthalocyanine pigments such as C.I. Pigment Blue 16 (C.I. 74100); indigo pigments such as C.I. Vat Brown 5 (C.I. 73410) and C.I. Vat Dye (C.I. 73030); and perylene pigments such as Algol Scarlet B and Indanthrene Scarlet R (made by Bayer Co., Ltd.). These charge generation materials may be used alone or in combination.

The electrophotographic photoconductor shown in FIG. 3 can be produced by the following method. To provide the charge generation layer 5 on the electroconductive support 1, the charge generation material is vacuum-deposited on the electroconductive support 1. Alternatively, the finely-divided particles of the charge generation material 3 are dispersed in an appropriate solvent, together with the binder agent when necessary, so that a coating liquid for charge generation layer 5 is prepared. The thus prepared coating liquid is coated on the electroconductive support 1 and dried, whereby a charge generation layer 5 is formed on the electroconductive support 1. The charge generation layer 5 may be subjected to surface treatment by buffing and adjustment of the thickness thereof if required. On the thus formed charge generation layer 5, a coating liquid in which at least one aromatic block polycarbonate resin with charge transporting properties, optionally in combination with a binder agent, is dissolved is coated and dried, so that a charge transport layer 4 is formed on the charge generation layer 5. In the charge generation layer 5, the same charge generation materials as employed in the above-mentioned photoconductive layer 2a can be used.

The thickness of the charge generation layer 5 is 5 $\mu$m or less, preferably 2 $\mu$m or less. It is preferable that the thickness of the charge transport layer 4 be in the range of 3 to 50 $\mu$m, more preferably in the range of 5 to 40 $\mu$m.

When the charge generation layer 5 is provided on the electroconductive support 1 by coating the dispersion of finely-divided particles of the charge generation material 3, it is preferable that the amount of finely-divided particles of the charge generation material 3 for use in the charge generation layer 5 be in the range of 10 to 100 wt. %, more preferably in the range of about 50 to 100 wt. %, of the total weight of the charge generation layer 5. It is preferable that the amount of the aromatic block polycarbonate resin of the present invention be in the range of 40 to 100 wt. % of the total weight of the charge transport layer 4.

As previously mentioned, the photoconductive layer 2b in FIG. 3 may further comprise a low-molecular-weight charge transport material.

Specific examples of the above-mentioned low-molecular charge transport material are as follows: oxazole derivatives, oxadiazole derivatives (Japanese Laid-Open Patent Applications 52-139065 and 52-139066), imidazole derivatives, triphenylamine derivatives (Japanese Laid-Open Patent Application 3-285960), benzidine derivatives (Japanese Patent Publication 58-32372), α-phenylstilbene derivatives (Japanese Laid-Open Patent Application 57-73075), hydrazone derivatives (Japanese Laid-Open Patent Applications 55-154955, 55-156954, 55-52063, and 56-81850), triphenylmethane derivatives (Japanese Patent Publication 51-10983), anthracene derivatives (Japanese Laid-Open Patent Application 51-94829), styryl derivatives (Japanese Laid-Open Patent Applications 56-29245 and 58-198043), carbazole derivatives (Japanese Laid-Open Patent Application 58-58552), and pyrene derivatives (Japanese Laid-Open Patent Application 2-94812).

To produce the photoconductor shown in FIG. 4, a coating liquid for protective layer 6 is prepared by dissolving the previously mentioned aromatic block polycarbonate resin, optionally in combination with the binder agent, in a solvent, and the thus obtained coating liquid is coated on the charge transport layer 4 of the photoconductor shown in FIG. 3, and dried.

It is preferable that the thickness of the protective layer 6 be in the range of 0.15 to 10 $\mu$m. It is preferable that the amount of the aromatic block polycarbonate resin for use in the protective layer 6 be in the range of 40 to 100 wt. % of the total weight of the protective layer 6.

The electrophotographic photoconductor shown in FIG. 5 can be produced by the following method. The aromatic block polycarbonate resin of the present invention, optionally in combination with the binder agent, is dissolved in a solvent to prepare a coating liquid for charge transport layer 4. The thus prepared coating liquid is coated on the electroconductive support 1 and dried, whereby a charge transport layer 4 is provided on the electroconductive support 1. On the thus formed charge transport layer 4, a coating liquid prepared by dispersing the finely-divided particles of the charge generation material 3 in a solvent in which the binder agent may be dissolved when necessary, is coated, for example, by spray coating, and dried, so that a charge generation layer 5 is provided on the charge transport layer 4. The amount ratios of the components contained in the charge generation layer 5 and charge transport layer 4 are the same as those previously mentioned in the description of FIG. 3.

When the previously mentioned protective layer 6 is formed on the above prepared charge generation layer 5, the electrophotographic photoconductor shown in FIG. 6 can be fabricated.

To fabricate any of the aforementioned photoconductors of the present invention, a metallic plate or foil made of aluminum, a plastic film on which a metal such as aluminum is deposited, and a sheet of paper which has been treated so as to be electroconductive can be employed as the electroconductive support 1.

Specific examples of the binder agent used in the preparation of the above-mentioned coating liquids are condensation resins such as polyamide, polyurethane, polyester, epoxy resin, polyketone, and polycarbonate; and vinyl polymers such as polyvinylketone, polystyrene, poly-N-vinylcarbazole, and polyacrylamide. All the resins that have electrically insulating properties and adhesion properties can be employed.

Some plasticizers may be added to the above-mentioned binder agents, when necessary. Examples of the plasticizer for use in the present invention are halogenated paraffin, dimethylnaphthalene, and dibutyl phthalate. Further, a variety of additives such as an antioxidant, a light stabilizer, a thermal stabilizer, and a lubricant may also be added to the binder agents when necessary.

Furthermore, in the electrophotographic photo-conductor according to the present invention, an undercoat layer such as an adhesive layer or a barrier layer may be interposed between the electroconductive support and the photoconductive layer when necessary.

Examples of the material for the undercoat layer are polyamide, nitrocellulose, aluminum oxide, and titanium oxide. It is preferable that the thickness of the undercoat layer be 1 $\mu$m or less.

When copying is performed by use of the photoconductor according to the present invention, the surface of the photoconductor is uniformly charged to a predetermined polarity in the dark. The uniformly charged photoconductor is exposed to a light image so that a latent electrostatic image is formed on the surface of the photoconductor. The thus formed latent electrostatic image is developed to a visible image by a developer, and the developed image can be transferred to a sheet of paper when necessary.

The photosensitivity and the durability of the electrophotographic photoconductor according to the present invention are remarkably improved.

The electrophotographic image forming apparatus and method, and the process cartridge according to the present invention will now be explained in detail with reference to FIG. 7 to FIG. 9.

Figure 7:
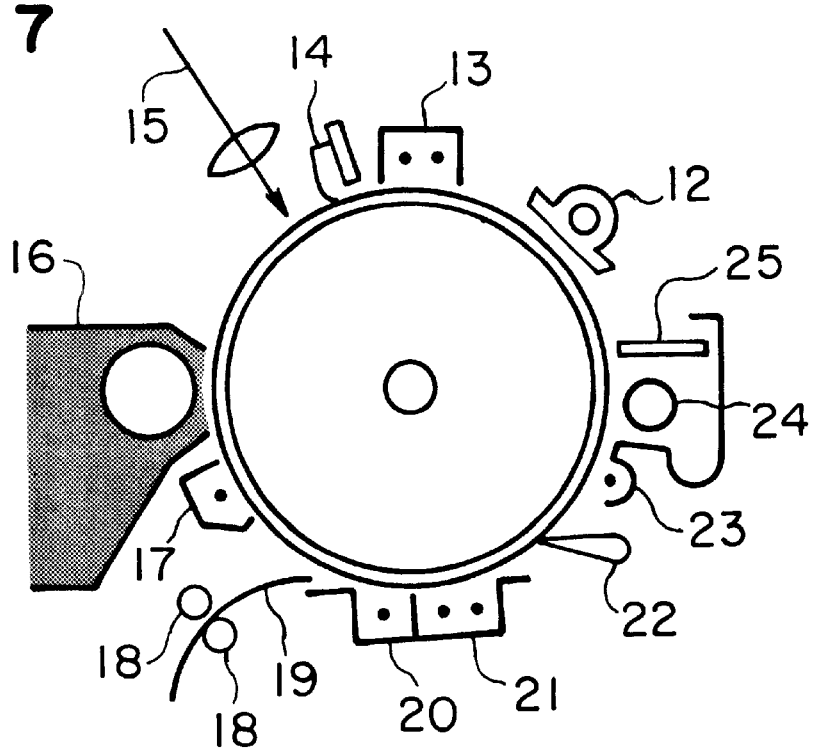
FIG. 7 is a schematic diagram in explanation of an embodiment of the electrophotographic image forming method and apparatus according to the present invention.

FIG. 7 is a schematic view which shows one embodiment of the electrophotographic image forming method and apparatus employing the electrophotographic photoconductor according to the present invention.

In FIG. 7, an electrophotographic photoconductor 11 in the form of a drum comprises an electroconductive support, and a photoconductive layer formed thereon comprising the previously mentioned aromatic block polycarbonate resin.

The photoconductor may be in the form of a drum as shown in FIG. 7, a sheet, or an endless belt.

Around the drum-shaped electrophotographic photoconductor 11, as shown in FIG. 7, there are disposed a charger 13, an eraser 14, a light exposing unit 15, a developing unit 16, a pre-transfer charger 17, an image transfer charger 20, a separating charger 21, a separator 22, a pre-cleaning charger 23, a fur brush 24, a cleaning blade 25, and a quenching lamp 12. Reference numeral 8 indicates resist rollers.

The charger 13, the pre-transfer charger 17, the image transfer charger 20, the separating charger 21, and the pre-cleaning charger 23 may employ the conventional means such as a corotron charger, a scorotron charger, a solid state charger, and a charging roller. For the image transfer means, it is effective to employ both the image transfer charger 20 and the separating charger 21 as illustrated in FIG. 7.

As the light source for the light exposing unit 15 and the quenching lamp 12, there can be employed, for example, a fluorescent tube, tungsten lamp, halogen lamp, mercury vapor lamp, sodium light source, light emitting diode (LED), semiconductor laser (LD), and electroluminescence (EL). Further, a desired wavelength region can be obtained by use of various filters such as a sharp-cut filter, bandpass filter, a near infrared cut filter, dichroic filter, interference filter, and color conversion filter.

The photoconductor may be irradiated with light in the course of the image transfer step, quenching step, cleaning step, or pre-light exposure step. In such a case, the above-mentioned light sources are usable.

The toner image formed on the photoconductor 11 using the developing unit 16 is transferred to a transfer sheet 19. At the step of image transfer, all the toner particles deposited on the photoconductor 11 are not transferred to the transfer sheet 19. Some toner particles remain on the surface of the photoconductor 11. The remaining toner particles are removed from the photoconductor 11 using the fur brush 24 and the cleaning blade 25. The cleaning of the photoconductor may be carried out only by use of a cleaning brush. As the cleaning brush, there can be employed a conventional fur brush and magnetic fur brush.

When the photoconductor 11 is positively charged, and exposed to light images, positive electrostatic latent images are formed on the photoconductor. In the similar manner as in above, when a negatively charged photoconductor is exposed to light images, negative electrostatic latent images are formed. A negative toner and a positive toner are respectively used for the development of the positive electrostatic images and the negative electrostatic images, thereby obtaining positive images. In contrast to this, when the positive electrostatic images and the negative electrostatic images are respectively developed using a positive toner and a negative toner, negative images can be obtained on the surface of the photoconductor 11. Not only such developing means, but also the quenching means may employ the conventional manner.

Figure 8:
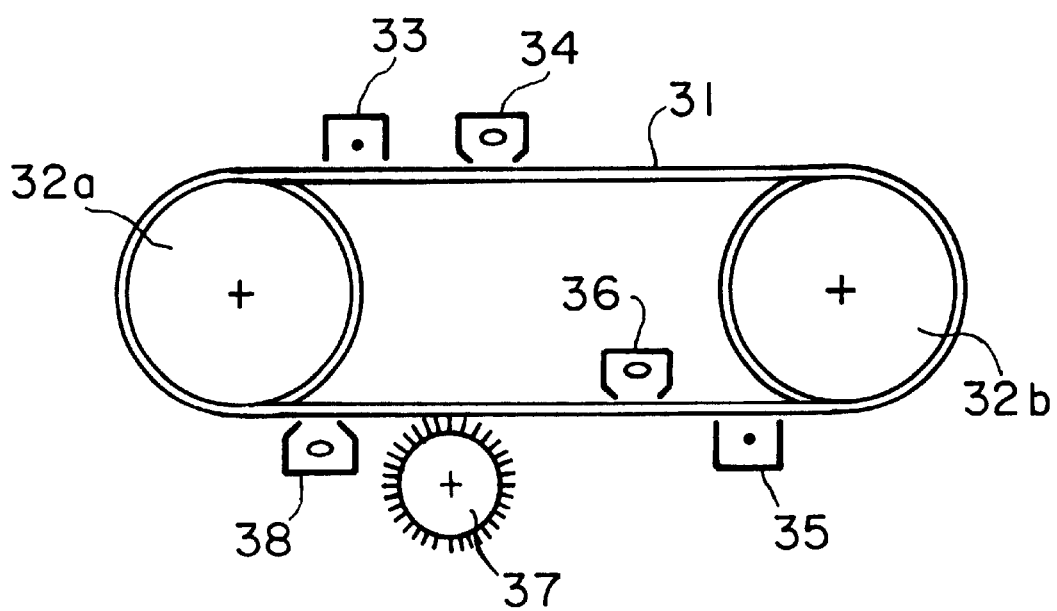
FIG. 8 is a schematic diagram in explanation of another embodiment of the electrophotographic image forming method and apparatus according to the present invention.

FIG. 8 is a schematic view which shows another embodiment of the electrophotographic image forming method and apparatus according to the present invention.

A photoconductor 31 shown in FIG. 8, which comprises an electroconductive support and the previously mentioned photoconductive layer formed thereon, is driven by driving rollers 32a and 32b. Charging of the photoconductor 31 is carried out by use of a charger 33, and the charged photoconductor 31 is exposed to light images using an image exposure light source 34. Thereafter, latent electrostatic images formed on the photoconductor 31 are developed to toner images using a developing unit (not shown), and the toner images are transferred to a transfer sheet with the aid of a transfer charger 35. After the toner images are transferred to the transfer sheet, the photoconductor 31 is subjected to pre-cleaning light exposure using a pre-cleaning light source 36, and physically cleaned by use of a cleaning brush 37. Finally, quenching is carried out using a quenching lamp 38. In FIG. 8, the electroconductive support of the photoconductor 31 has light transmission properties, so that it is possible to arrange the pre-cleaning light source 36 so that the electroconductive support side of the photoconductor 31 is irradiated with light. As a matter of course, the photoconductive layer side of the photoconductor 31 may be exposed to the pre-cleaning light. Similarly, the image exposure light source 34 and the quenching lamp 38 may be disposed in such a manner that light is directed toward the electroconductive support side of the photoconductor 31.

Figure 9:
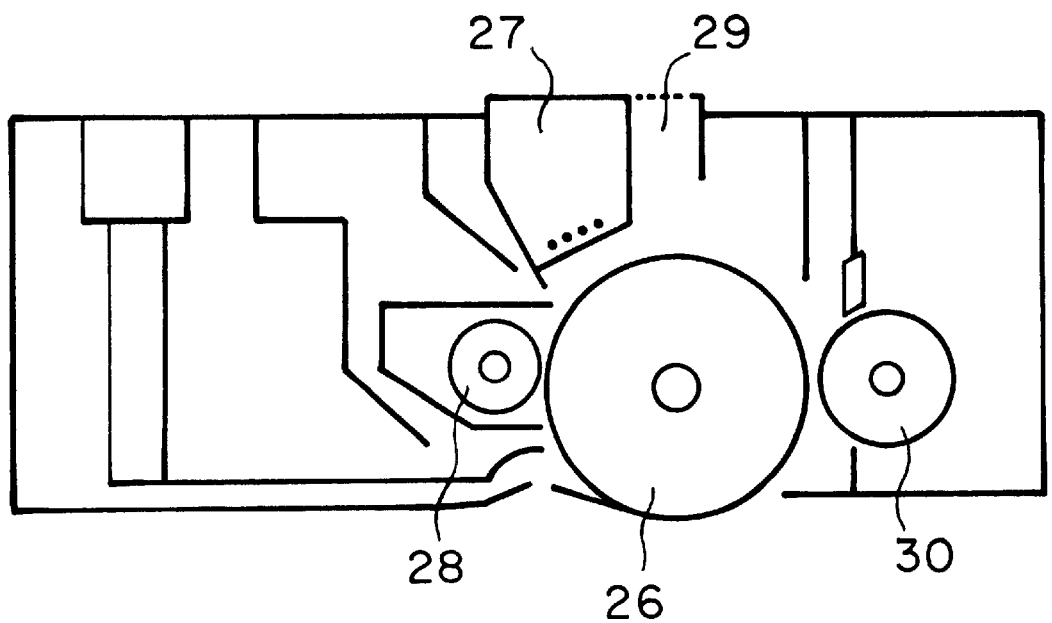
FIG. 9 is a schematic diagram in explanation of an example of the process cartridge according to the present invention.

The photoconductor 31 is exposed to light using the image exposure light source 34, the pre-cleaning light source 36, and the quenching lamp 38, as illustrated in FIG. 9. In addition to the above, light exposure may be carried out before image transfer, and before image exposure.

The above-discussed units, such as the charging unit, light-exposing unit, developing unit, image transfer unit, cleaning unit, and quenching unit may be fixedly incorporated in the copying machine, facsimile machine, or printer. Alternatively, at least one of those units may be held in a process cartridge together with the photoconductor of the present invention. To be more specific, the process cartridge may hold therein a photoconductor, and at least one of the charging unit, light exposing unit, developing unit, image transfer unit, cleaning unit, or quenching unit, and the process cartridge may by detachably set in the above-mentioned electrophotographic image forming apparatus.

FIG. 9 is a schematic view which shows one example of the process cartridge according to the present invention. In this embodiment of FIG. 9, there are disposed a charger 27, a light exposing unit 29, a development roller 30, and a cleaning brush 28 around a photoconductor 26.

Other features of this invention will become apparent in the course of the following description of exemplary embodiments, which are given for illustration of the invention and are not intended to be limiting thereof.

Preparation Example 1

[Synthesis of Diphenol Compound (Compound No. 1)]

9.96 g (0.02 mol) of N-{4-[2,2-bis(4-hydroxyphenyl)vinyl]phenyl}-N,N-bis(4-tolyl)amine, 2.5 ml of dehydrated pyridine, and 40 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 1.48 g (5.0 mmol) of bis(trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a yellow product was precipitated.

The thus precipitated product was dried, thereby obtaining a diphenol compound (Compound No. 1) according to the present invention, as shown in TABLE 1.

The polystyrene-reduced number-average molecular weight (Mn) and weight-average molecular weight (Mw) of the Compound No. 1, which were measured by the gel permeation chromatography (GPC), were respectively 2,500 and 3,600.

The average repetition number of the structural unit for use in the diphenol compound (Compound No. 1), calculated from NMR and GPC is put beside the structural unit in TABLE 1.

TABLE 1 also shows the results of the elemental analysis of the obtained diphenol compound.

Figure 10:
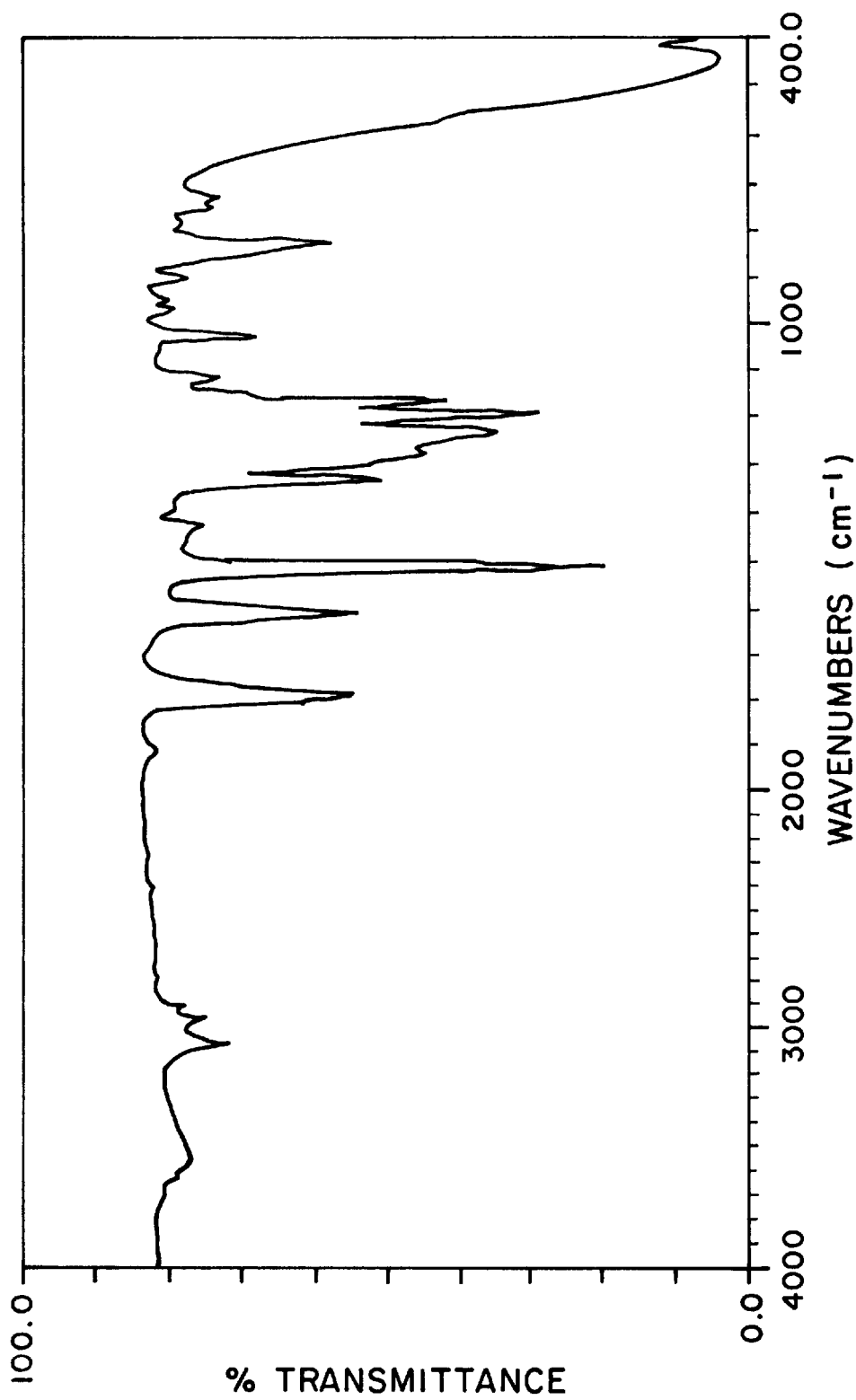
FIG. 10 is an IR spectrum of a diphenol compound (Compound No. 1) prepared in Preparation Example 1.

FIG. 10 is an infrared spectrum of the diphenol compound (Compound No. 1).

Figure 11:
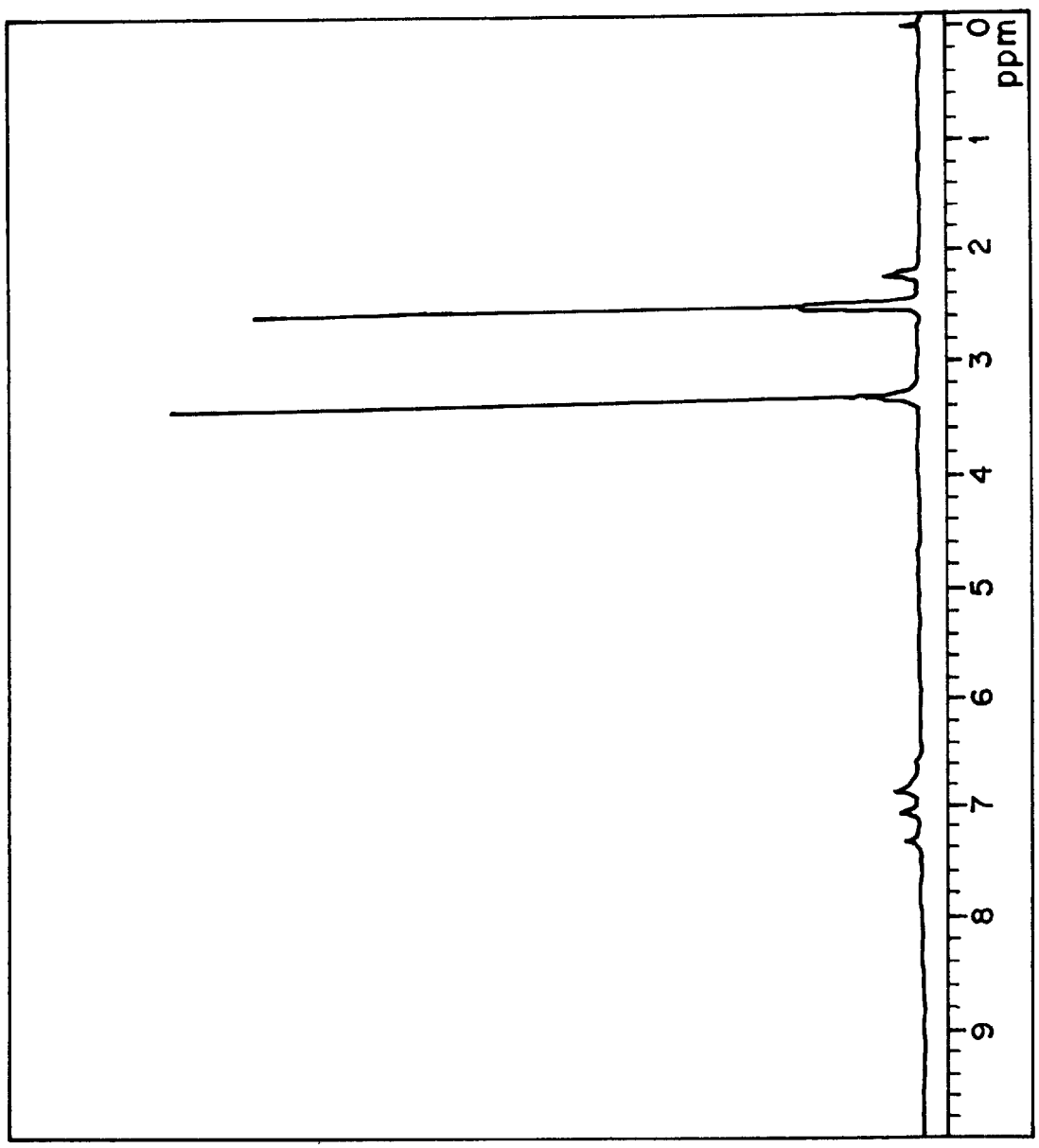
FIG. 11 is $^1$H-NMR spectrum of a diphenol compound (Compound No. 1) prepared in Preparation Example 1.

FIG. 11 is $^1$H-NMR spectrum of the diphenol compound, using a solvent of $d_6$-DMSO.

Preparation Example 2

[Synthesis of Diol Compound (Compound No. 2)]

9.13 g (0.04 mol) of 2,2-bis(4-hydroxyphenyl)propane, 6.2 ml of dehydrated pyridine, and 30 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 3.44 g (11.6 mmol) of bis (trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a white product was precipitated.

The thus precipitated product was dried, thereby obtaining a diol compound (Compound No. 2), as shown in TABLE 1.

The polystyrene-reduced number-average molecular weight (Mn) and weight-average molecular weight (Mw) of the Compound No. 2, which were measured by the gel permeation chromatography (GPC), were respectively 3,600 and 6,100.

The average repetition number of the structural unit for use in the diol compound (Compound No. 2), calculated from NMR and GPC is put beside the structural unit in TABLE 1.

TABLE 1 also shows the results of the elemental analysis of the obtained diol compound.

Figure 12:
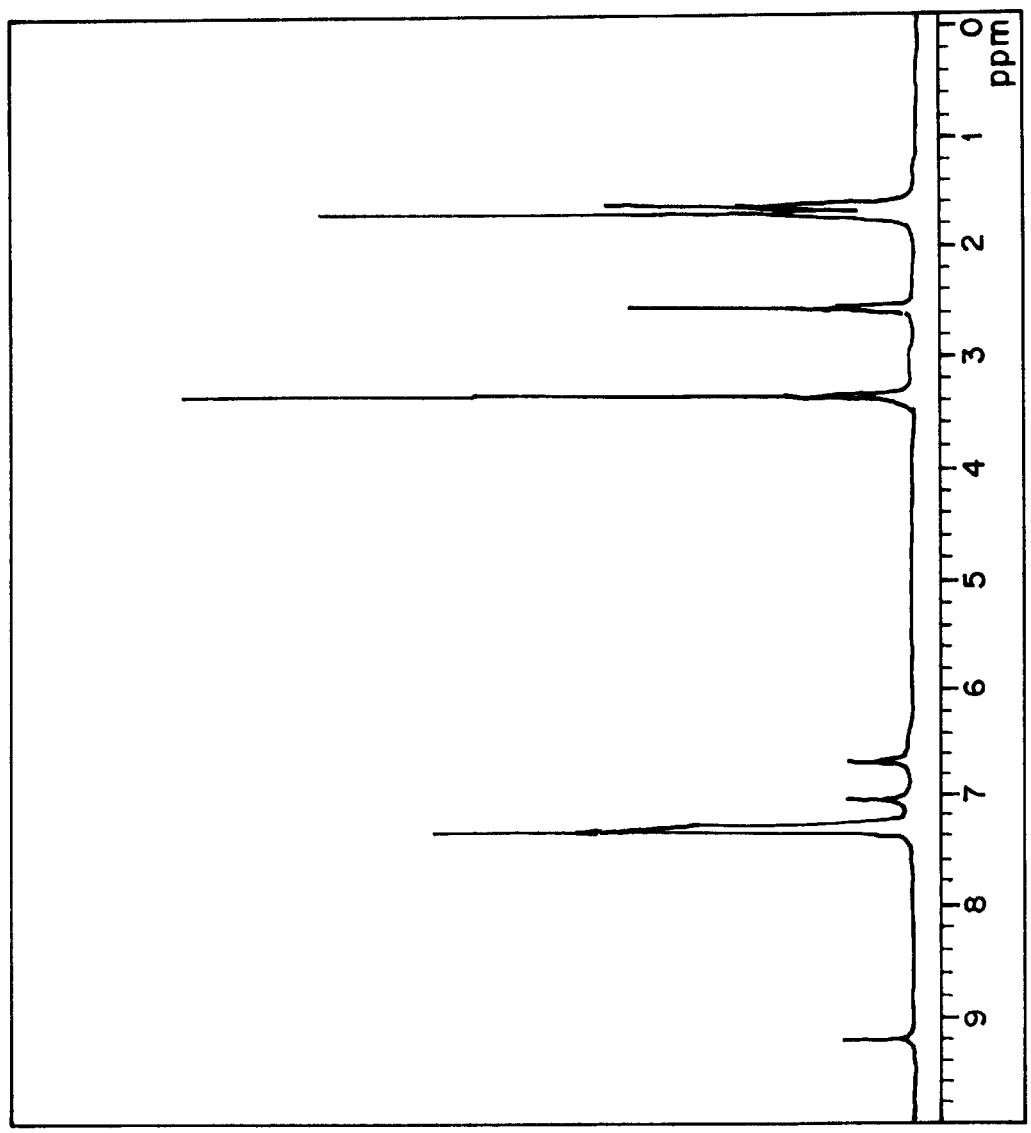
FIG. 12 is $^1$H-NMR spectrum of a diol compound (Compound No. 2) prepared in Preparation Example 2.

FIG. 12 is $^1$H-NMR spectrum of the diol compound, using a solvent of $d_6$-DMSO.

Preparation Example 3
[Synthesis of Diol Compound (Compound No. 3)]

9.13 g (0.04 mol) of 2,2-bis(4-hydroxyphenyl)propane, 5.0 ml of dehydrated pyridine, and 60 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 2.97 g (10 mmol) of bis (trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a white product was precipitated.

The thus precipitated product was dried, thereby obtaining a diol compound (Compound No. 3), as shown in TABLE 1.

The polystyrene-reduced number-average molecular weight (Mn) and weight-average molecular weight (Mw) of the Compound No. 3, which were measured by the gel permeation chromatography (GPC), were respectively 2,200 and 2,800.

The average repetition number of the structural unit for use in the diol compound (Compound No. 3), calculated from NMR and GPC is put beside the structural unit in TABLE 1.

TABLE 1 also shows the results of the elemental analysis of the obtained diol compound.

Figure 13:
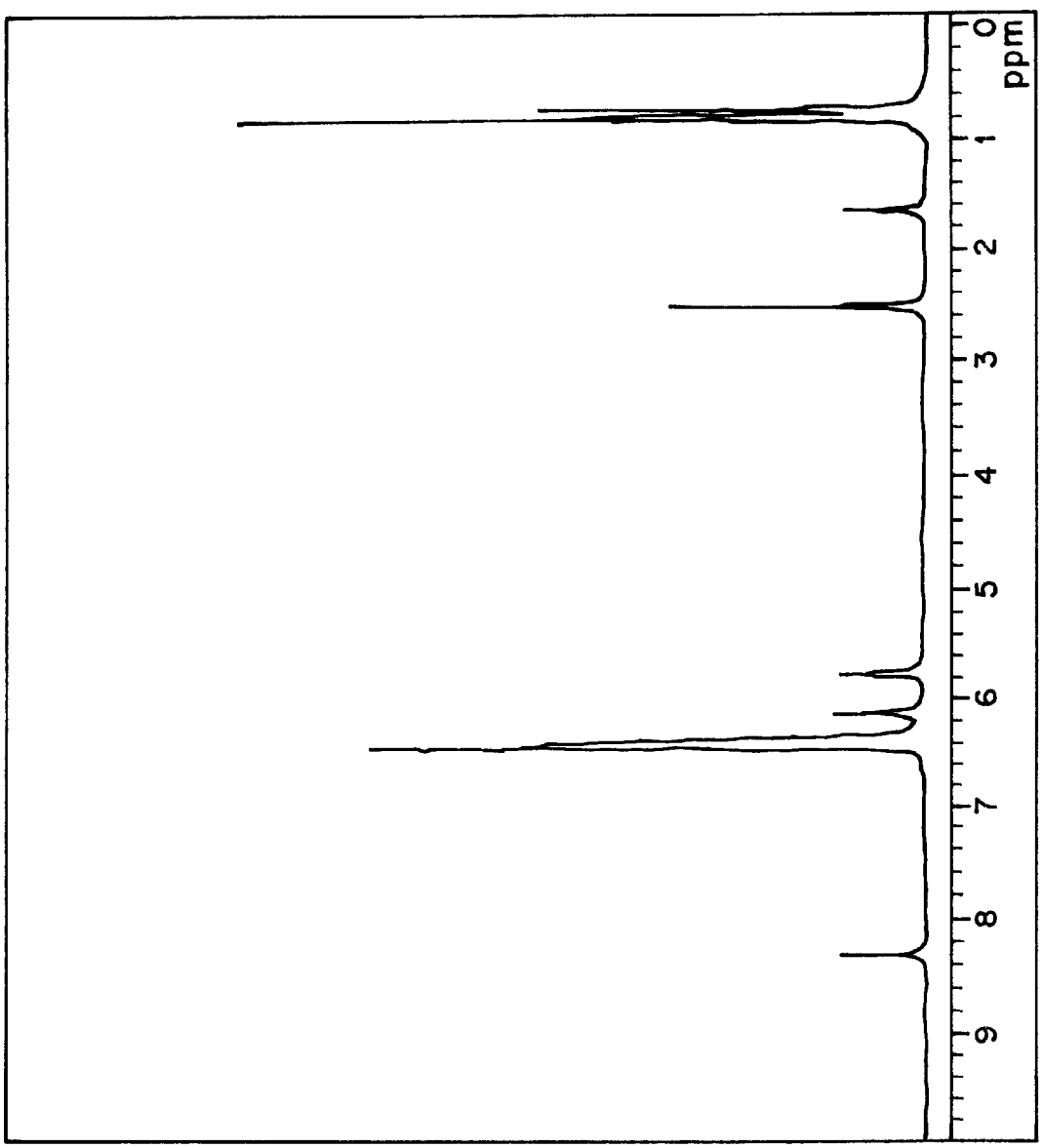
FIG. 13 is $^1$H-NMR spectrum of a diol compound (Compound No. 3) prepared in Preparation Example 3.

FIG. 13 is $^1$H-NMR spectrum of the diol compound, using a solvent of $d_6$-DMSO.

Preparation Example 4
[Synthesis of Diol Compound (Compound No. 4)]

12 g (0.053 mol) of 2,2-bis(4-hydroxyphenyl)propane, 4.85 ml of dehydrated pyridine, and 70 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 2.97 g (10 mmol) of bis (trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a white product was precipitated.

The thus precipitated product was dried, thereby obtaining a diol compound (Compound No. 4), as shown in TABLE 1.

The polystyrene-reduced number-average molecular weight (Mn) and weight-average molecular weight (Mw) of the Compound No. 4, which were measured by the gel permeation chromatography (GPC), were respectively 1,700 and 2,000.

The average repetition number of the structural unit for use in the diol compound (Compound No. 4), calculated from NMR and GPC is put beside the structural unit in TABLE 1.

TABLE 1 also shows the results of the elemental analysis of the obtained diol compound.

Figure 14:
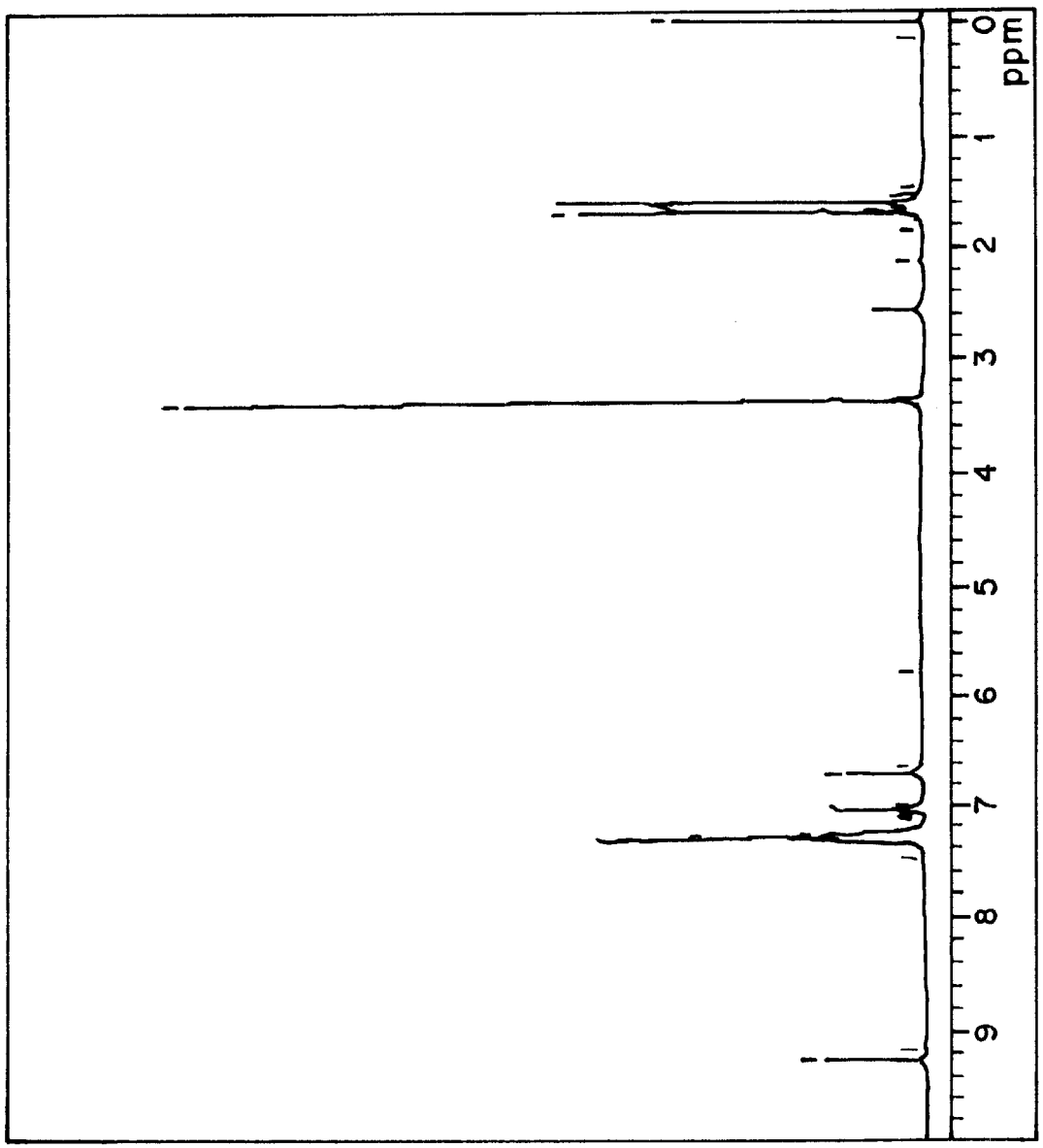
FIG. 14 is $^1$H-NMR spectrum of a diol compound (Compound No. 4) prepared in Preparation Example 4.
Figure 15:
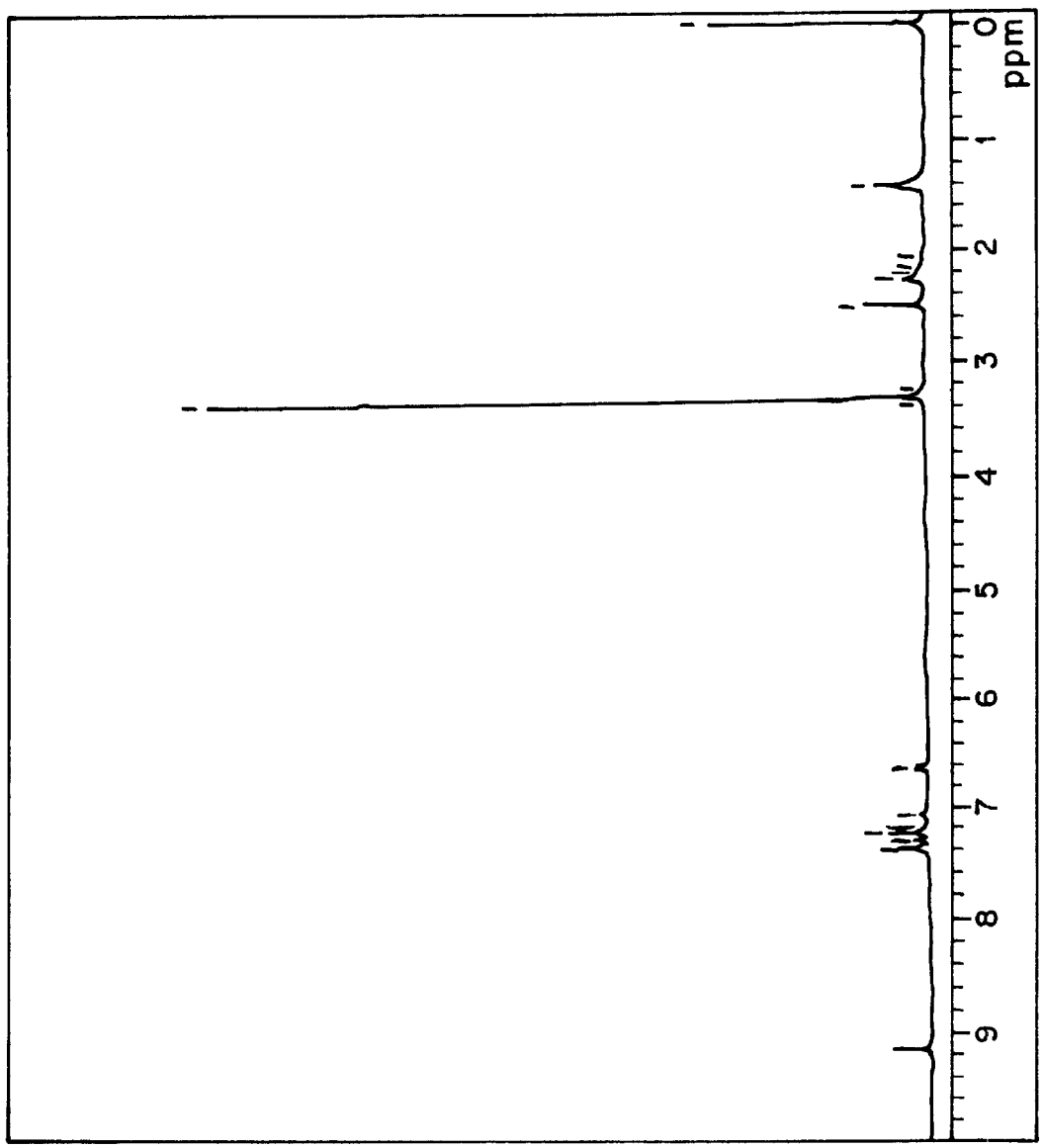
FIG. 15 is $^1$H-NMR spectrum of a diol compound (Compound No. 5) prepared in Preparation Example 5.

FIG. 14 is $^1$H-NMR spectrum of the diol compound, using a solvent of $d_6$-DMSO.

Preparation Example 5
[Synthesis of Diol Compound (Compound No. 5)]

14.2 g (0.053 mol) of 1,1-bis(4-hydroxyphenyl) cyclohexane, 4.85 ml of dehydrated pyridine, and 70 ml of dry tetrahydrofuran were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 2.97 g (10 mmol) of bis (trichloromethyl)carbonate, namely, a trimer of phosgene, in 20 ml of dry tetrahydrofuran was dropwise added to the reaction mixture over a period of 20 minutes. After completion of the addition, the polymerization reaction was carried out with stirring for 3 hours with the reaction mixture being maintained at 4° C.

Thereafter, the reaction mixture was added dropwise to 1.5 l of methanol, whereby a white product was precipitated. The precipitated product was dissolved in dichloromethane, and successively washed with a 2% aqueous solution of hydrochloric acid, and deionized water.

The thus obtained reaction mixture was again added dropwise to 1.5 l of methanol, and the precipitated product was dried, thereby obtaining a diol compound (Compound No. 5), as shown in TABLE 1.

The polystyrene-reduced number-average molecular weight (Mn) and weight-average molecular weight (Mw) of the Compound No. 5, which were measured by the gel permeation chromatography (GPC), were respectively 1,700 and 2,000.

The average repetition number of the structural unit for use in the diol compound (Compound No. 5), calculated from NMR and GPC is put beside the structural unit in TABLE 1.

Preparation Example 6
[Synthesis of Diol Compound (Compound No. 6)]

10.3 g (0.04 mol) of 2,2-bis(4-hydroxy-3-methylphenyl) propane, 4.85 ml of dehydrated pyridine, and 70 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 2.97 g (10 mmol) of bis(trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a white product was precipitated.

The thus precipitated product was dried, thereby obtaining a diol compound (Compound No. 6), as shown in TABLE 1.

The polystyrene-reduced number-average molecular weight (Mn) and weight-average molecular weight (Mw) of the Compound No. 6, which were measured by the gel permeation chromatography (GPC), were respectively 2,200 and 2,600.

The average repetition number of the structural unit for use in the diol compound (Compound No. 6), calculated from NMR and GPC is put beside the structural unit in TABLE 1.

Figure 16:
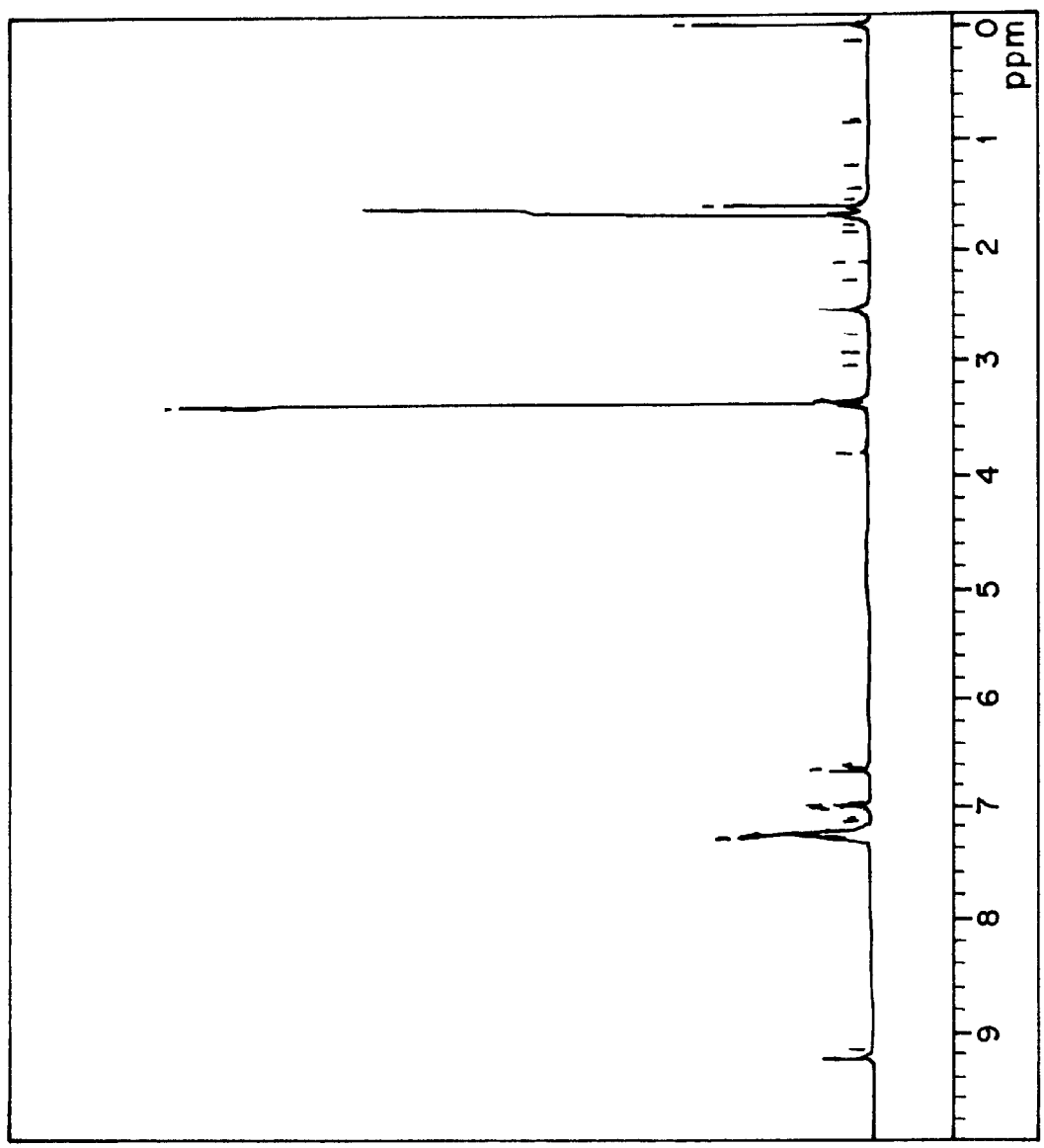
FIG. 16 is $^1$H-NMR spectrum of a diol compound (Compound No. 6) prepared in Preparation Example 6.

TABLE 1 also shows the results of the elemental analysis of the obtained diol compound. FIG. 16 is $^1$H-NMR spectrum of the diol compound, using a solvent of d6-DMSO.

Preparation Example 7
[Synthesis of Diol Compound (Compound No. 7)]

12.82 g (0.05 mol) of 2,2-bis(4-hydroxy-3-methylphenyl) propane, 7.55 ml of dehydrated pyridine, and 50 ml of dried dichloromethane were placed in a 200-ml four-necked flask equipped with a stirrer, a thermometer, a silica gel tube, and a dropping funnel.

The above prepared reaction mixture was dissolved with stirring in a stream of nitrogen. Thereafter, with vigorously stirring the reaction mixture as maintaining the temperature of the reaction mixture at 3° C. on a water bath, a solution prepared by dissolving 4.62 g (15.5 mmol) of bis(trichloromethyl)carbonate, namely, a trimer of phosgene, in 20 ml of dried dichloromethane was dropwise added to the reaction mixture over a period of 20 minutes. After completion of the addition, the polymerization reaction was carried out with stirring for 3 hours with the reaction mixture being maintained at 4° C.

Thereafter, the reaction mixture was successively washed with a 2% aqueous solution of hydrochloric acid, and deionized water.

The thus obtained reaction mixture was added dropwise to 1.5 l of methanol, whereby a white product was precipitated.

The thus precipitated product was dried, thereby obtaining a diol compound (Compound No. 7), as shown in TABLE 1.

The polystyrene-reduced number-average molecular weight (Mn) and weight-average molecular weight (Mw) of the Compound No. 7, which were measured by the gel permeation chromatography (GPC), were respectively 6,300 and 11,400.

The average repetition number of the structural unit for use in the diol compound (Compound No. 7), calculated from NMR and GPC is put beside the structural unit in TABLE 1.

TABLE 1 also shows the results of the elemental analysis of the obtained diol compound.

Figure 17:
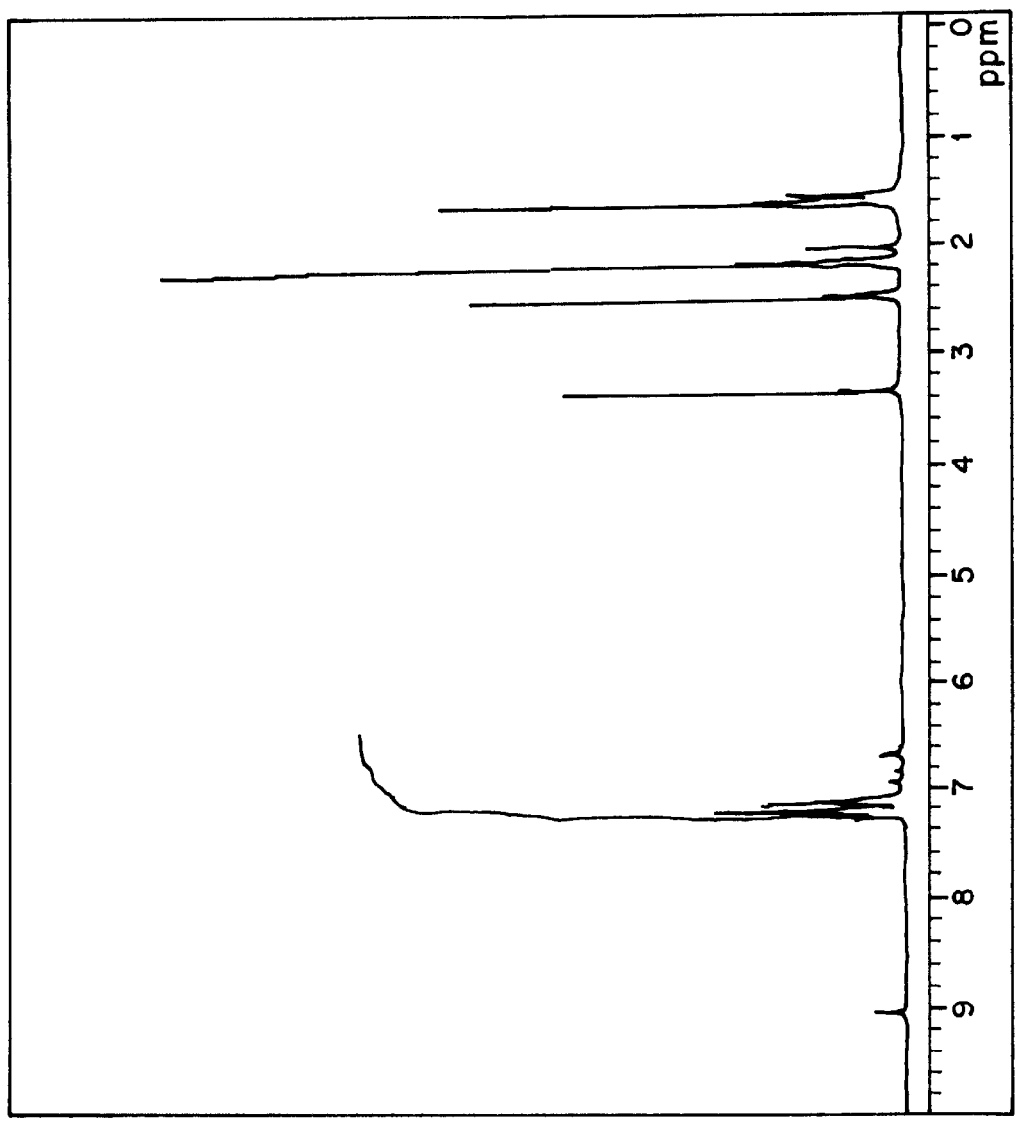
FIG. 17 is $^1$H-NMR spectrum of a diol compound (Compound No. 7) prepared in Preparation Example 7.

FIG. 17 is $^1$H-NMR spectrum of the diol compound, using a solvent of $d_6$-DMSO.

TABLE 1

| Preparation Ex. No. | Compound No. | Structural of Formula | Molecular Weight | | Elemental Analysis | | |
|---|---|---|---|---|---|---|---|
| | | | | | % C | % H | % N |
| | | | Mn | Mw | Found (Calcd.) | Found (Calcd.) | Found (Calcd.) |
| 1 | 1 | | 2500 | 3600 | 83.10 (82.87) | 5.40 (5.48) | 2.70 (2.78) |

TABLE 1-continued

| Preparation Ex. No. | Compound No. | Structural of Formula | Molecular Weight Mn | Mw | % C Found (Calcd.) | % H Found (Calcd.) | % N Found (Calcd.) |
|---|---|---|---|---|---|---|---|
| 2 | 2 | H−[O−C₆H₄−C(CH₃)₂−C₆H₄−OC(O)]₁₃.₅−O−C₆H₄−C(CH₃)₂−C₆H₄−OH | 3600 | 6100 | 75.64 (75.78) | 5.68 (5.66) | — |
| 3 | 3 | H−[O−C₆H₄−C(CH₃)₂−C₆H₄−OC(O)]₇.₈−O−C₆H₄−C(CH₃)₂−C₆H₄−OH | 2200 | 2800 | 75.65 (75.91) | 5.75 (5.72) | — |
| 4 | 4 | H−[O−C₆H₄−C(CH₃)₂−C₆H₄−OC(O)]₅.₈₅−O−C₆H₄−C(CH₃)₂−C₆H₄−OH | 1700 | 2000 | 75.84 (76.01) | 5.43 (5.70) | — |
| 5 | 5 | H−[O−C₆H₄−C(cyclohexyl)(H)−C₆H₄−OC(O)]₄.₈−O−C₆H₄−C(cyclohexyl)(H)−C₆H₄−OH | 1700 | 2000 | 77.91 (78.00) | 6.37 (6.39) | — |
| 6 | 6 | H−[O−(3-CH₃,5-CH₃-C₆H₂)−C(CH₃)₂−(3-CH₃-C₆H₃)−OC(O)]₇−O−(3-CH₃,5-CH₃-C₆H₂)−C(CH₃)₂−(3-CH₃-C₆H₃)−OH | 2200 | 2600 | 76.80 (76.92) | 6.80 (6.60) | — |
| 7 | 7 | H−[O−(3-CH₃,5-CH₃-C₆H₂)−C(CH₃)₂−(3-CH₃-C₆H₃)−OC(O)]₂₁.₅−O−(3-CH₃,5-CH₃-C₆H₂)−C(CH₃)₂−(3-CH₃-C₆H₃)−OH | 6300 | 11400 | 76.30 (76.69) | 6.57 (6.50) | — |

Preparation Example 8

[Synthesis of Aromatic Block Polycarbonate Resin No. 1]

2.15 g (4.45 mmol) of a diphenol compound with charge transporting properties, that is, N-{4-[2,2-bis(4-hydroxyphenyl)vinyl]phenyl}-N,N-bis(4-tolyl)amine, 1.71 g (0.76 mmol) of the diol compound (Compound No. 2) prepared in Preparation Example 2, serving as a comonomer component, and 19 mg of 4-tert-butylphenol (molecular weight modifier) were placed in a reaction container with stirrer.

The above prepared reaction mixture was dispersed with stirring in a stream of nitrogen, with the addition thereto of an aqueous solution prepared by dissolving 1.04 g of sodium hydroxide and 66 mg of sodium hydrosulfite in 26.6 ml of water.

Thereafter, the reaction mixture was cooled to 20° C., and vigorously stirred with the addition thereto of a solution prepared by dissolving 0.82 g of bis(trichloromethyl) carbonate, namely, a trimer of phosgene, in 22.1 ml of dichloromethane. The reaction mixture was further stirred for 30 minutes, thereby forming a uniform emulsion.

With the addition of one drop of triethylamine serving as a catalyst, the polymerization reaction was carried out at room temperature for 60 minutes, with stirring. Thereafter, a solution prepared by dissolving 41 mg of phenyl chloroformate serving as a terminator in 3 ml of dichloromethane was added to the reaction mixture, and the resultant mixture was stirred for 60 minutes at room temperature in order to continue the reaction.

By the addition of 20 ml of dichloromethane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow aromatic polycarbonate resin No. 1 (in the form of a block copolymer) according to the present invention was obtained.

The structural formula of the aromatic block polycarbonate resin No. 1 is shown in TABLE 2, and the composition ratios of the structural units are put beside the respective structural units, on the supposition that the total number of structural units is 1.

The polystyrene-reduced number-average molecular weight (Mn) and weight-average molecular weight (Mw) of the polycarbonate resin No. 1, which were measured by gel permeation chromatography, were respectively 46,000 and 141,000.

Figure 18:
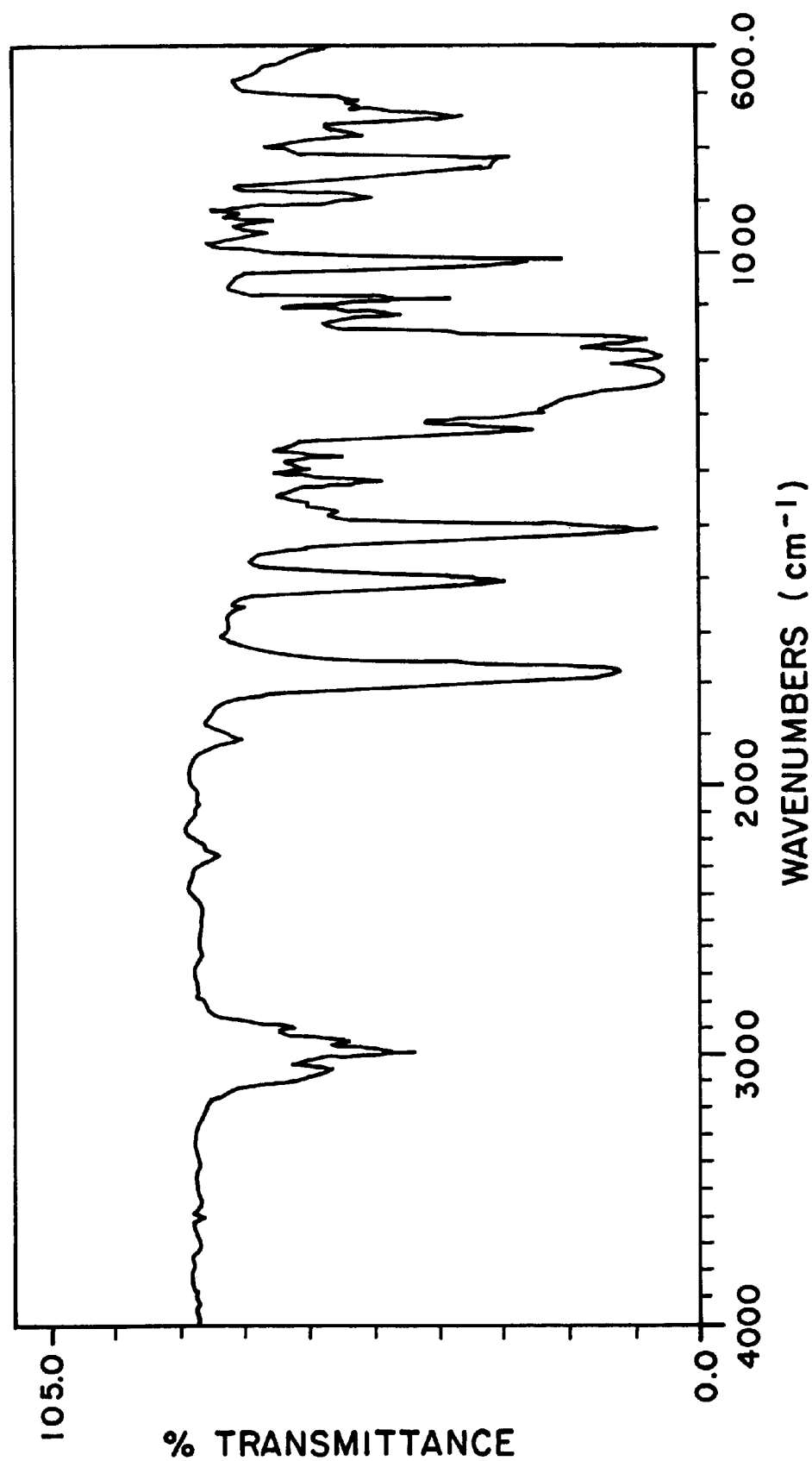
FIG. 18 is an IR spectrum of an aromatic block polycarbonate resin No. 1 obtained in Preparation Example 8.

FIG. 18 is an infrared spectrum of the aromatic block polycarbonate resin No. 1.

Figure 19:
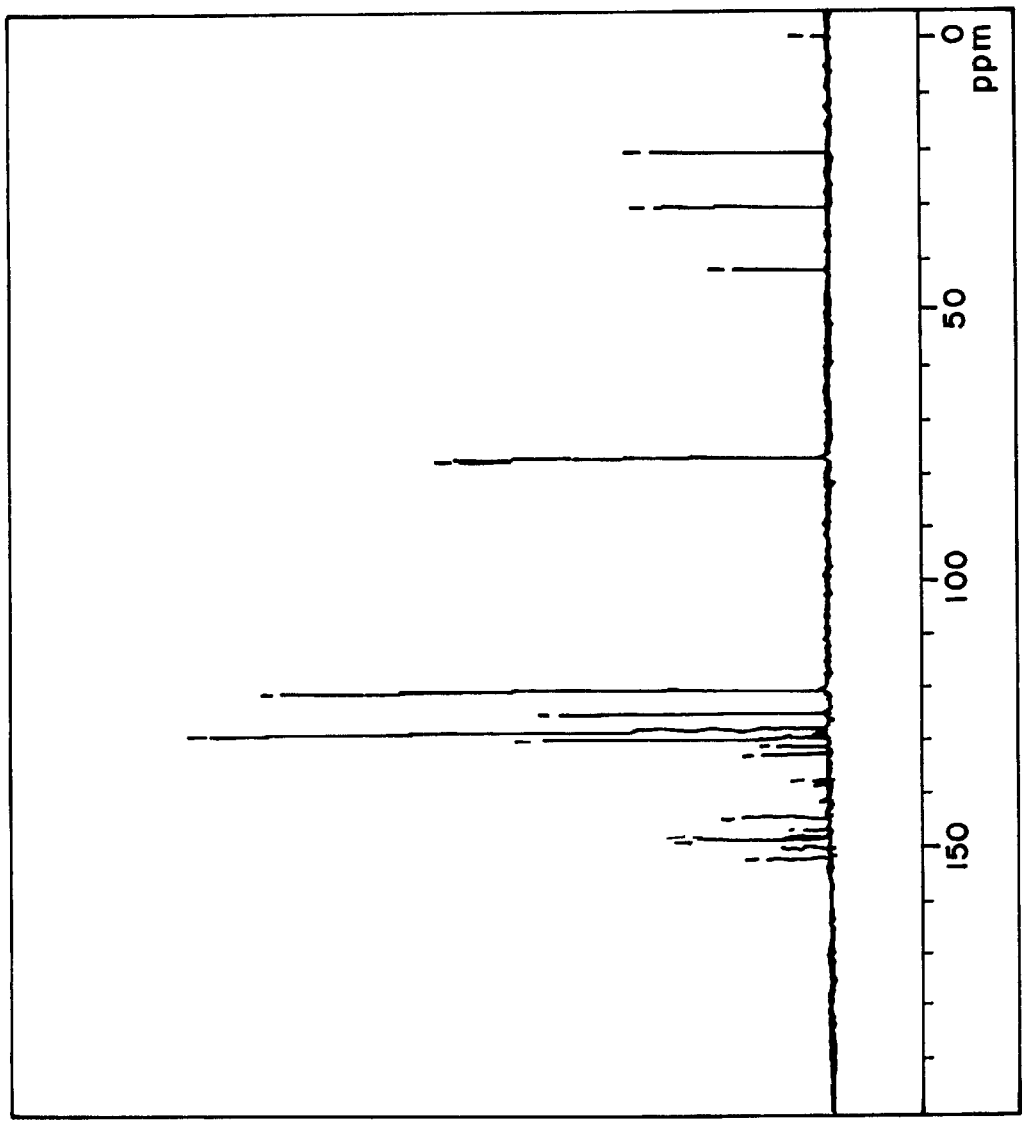
FIG. 19 is $^{13}$C-NMR spectrum of an aromatic block polycarbonate resin No. 1 obtained in Preparation Example 8.
Figure 20:
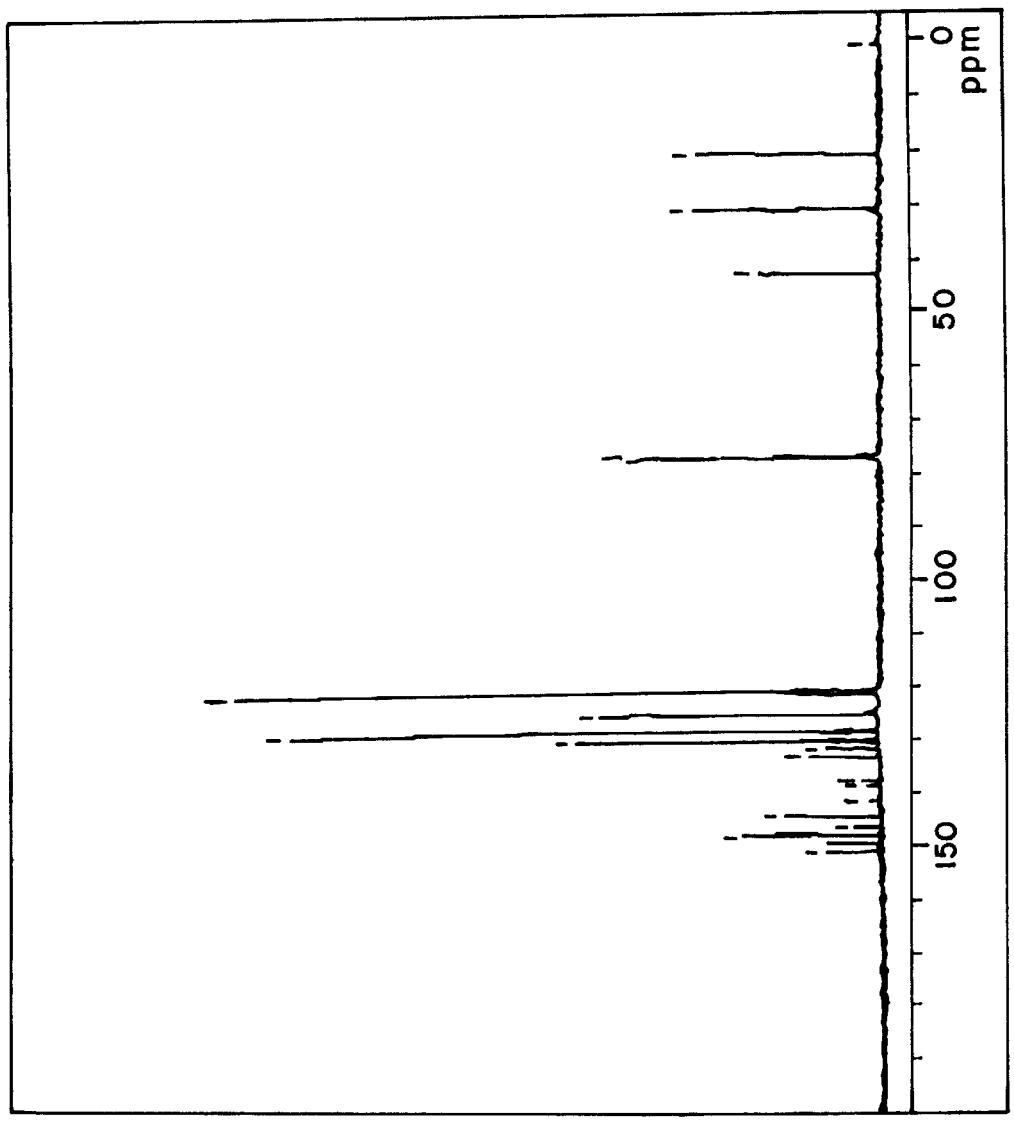
FIG. 20 is $^{13}$C-NMR spectrum of an aromatic block polycarbonate resin No. 2 obtained in Preparation Example 9.
Figure 21:
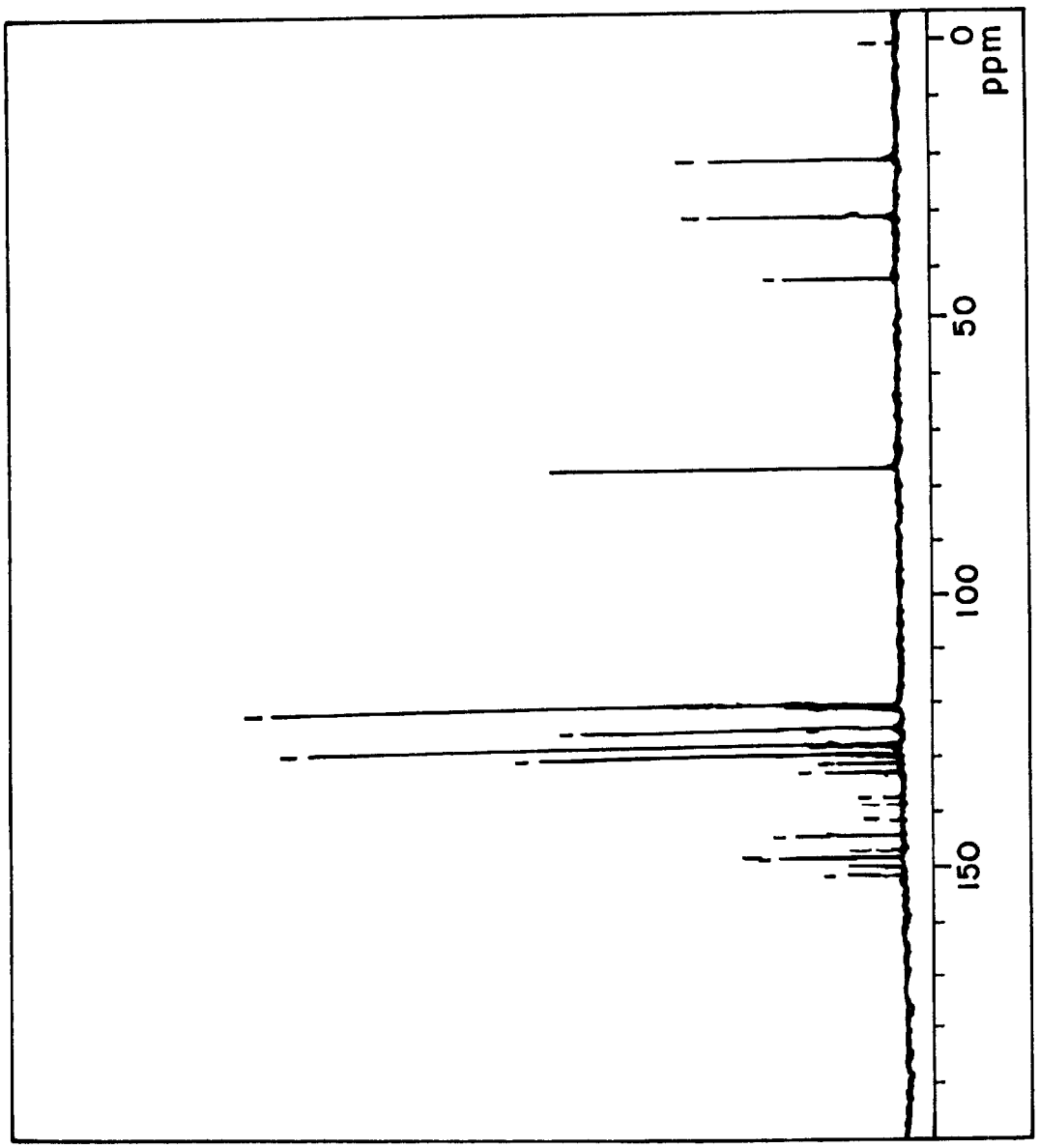
FIG. 21 is $^{13}$C-NMR spectrum of an aromatic block polycarbonate resin No. 3 obtained in Preparation Example 10.

FIG. 19 is $^{13}$C-NMR spectrum of the aromatic block polycarbonate resin No. 1, using a solvent of CDCl$_3$.

TABLE 2 also shows the results of the elemental analysis of the obtained polycarbonate resin.

The glass transition temperature (Tg) of the above obtained aromatic block polycarbonate resin No. 1 was obtained by differential scanning calorimetry (DSC) under the conditions that the temperature increasing rate was 10° C./min, and the scanning scope was set in the range of 20 to 22° C. The results are shown in TABLE 3.

Preparation Examples 9 to 13

The procedure for preparation of the aromatic block polycarbonate resin No. 1 in Preparation Example 8 was repeated except that the comonomer component of the diol compound (Compound No. 2) used in Preparation Example 8 was replaced by each of the respective diol compounds No. 3 to No. 7 shown in TABLE 1.

Thus, aromatic block polycarbonate resins No. 2 to No. 6 according to the present invention were obtained.

FIG. 20 to FIG. 24 are $^{13}$C-NMR spectra of the aromatic block polycarbonate resins No. 2 to No. 6, respectively, by use of a solvent of CDCl$_3$, TABLE 2 shows the structural formula, the results of the elemental analysis, and the number-average molecular weight and the weight-average molecular weight of each of the obtained aromatic block polycarbonate resins No. 2 to No. 6.

The glass transition temperature (Tg) of each aromatic block polycarbonate resin was obtained in the same manner as in Preparation Example 8. The results are shown in TABLE 3.

Figure 29:
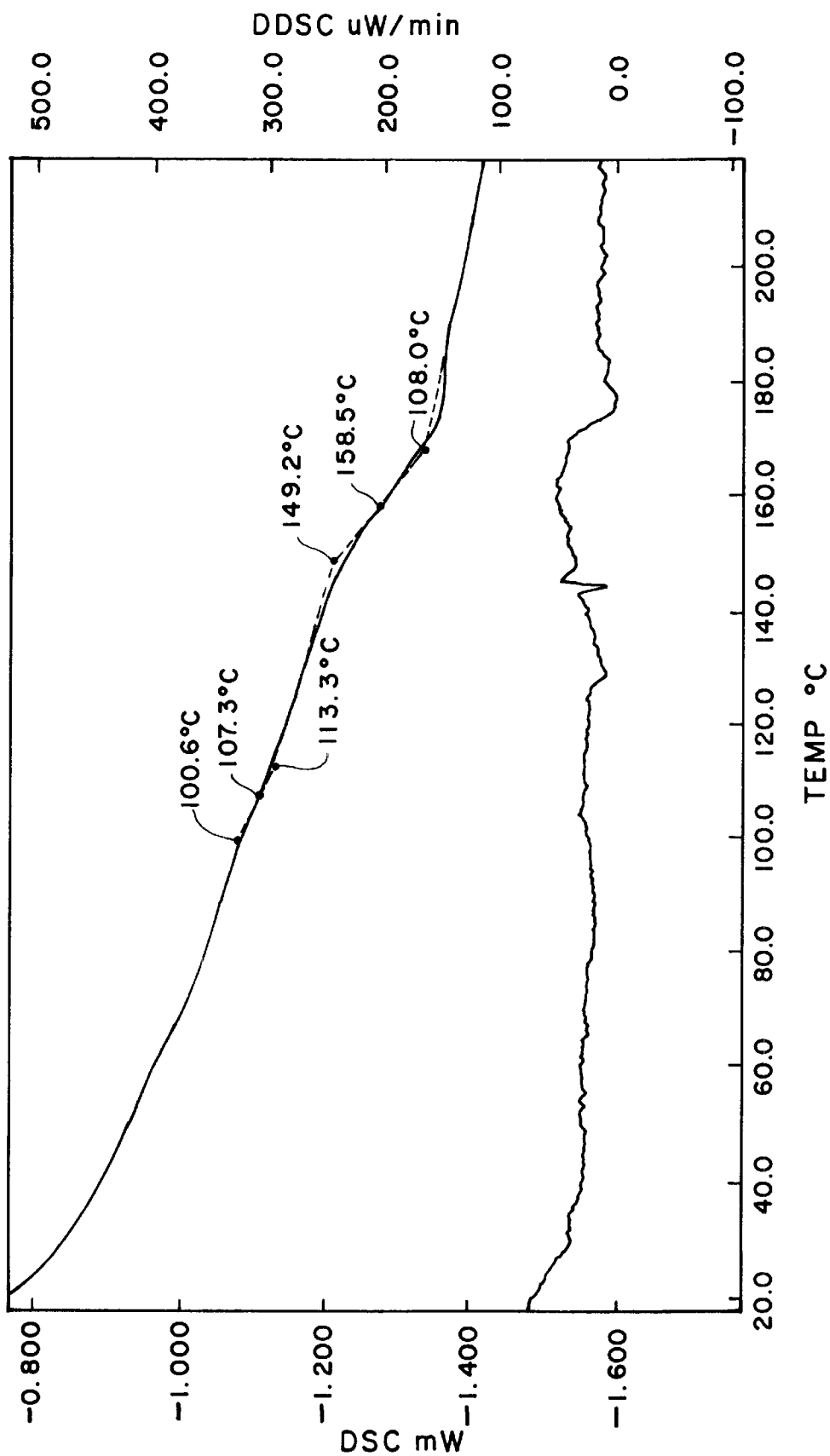
FIG. 29 is differential scanning calorimetry (DSC) profile of an aromatic block polycarbonate resin No. 6 obtained in Preparation Example 13.

FIG. 29 is a DSC profile of the aromatic block polycarbonate resin No. 6 prepared in Preparation Example 13.

Preparation Example 14

[Synthesis of Aromatic Block Polycarbonate Resin No. 7]

2.03 g (0.8 mmol) of the diphenol compound (Compound No. 1 prepared in Preparation Example 1) with charge transporting properties, and 1.75 g (7.68 mmol) of 2,2-bis(4-hydroxyphenyl)propane, serving as a comonomer component, and 21 mg of 4-tert-butylphenol (molecular weight modifier) were placed in a reaction container with stirrer.

The above prepared reaction mixture was dispersed with stirring in a stream of nitrogen, with the addition thereto of an aqueous solution prepared by dissolving 1.85 g of sodium hydroxide and 66 mg of sodium hydrosulfite in 26.6 ml of water.

Thereafter, the reaction mixture was cooled to 20° C., and vigorously stirred with the addition thereto of a solution prepared by dissolving 1.17 g of bis(trichloromethyl) carbonate, namely, a trimer of phosgene, in 22.1 ml of dichloromethane. The reaction mixture was further stirred for 30 minutes, thereby forming a uniform emulsion.

With the addition of one drop of triethylamine serving as a catalyst, the polymerization reaction was carried out at room temperature for 60 minutes, with stirring. Thereafter, a solution prepared by dissolving 66 mg of phenyl chloroformate serving as a terminator in 3 ml of dichloromethane was added to the reaction mixture, and the resultant mixture was stirred for 60 minutes at room temperature in order to continue the reaction.

By the addition of 20 ml of dichloro methane to the reaction mixture, an organic layer was separated. The resultant organic layer was successively washed with a 3% aqueous solution of sodium hydroxide, a 2% aqueous solution of hydrochloric acid, and water.

The thus obtained organic layer was added dropwise to large quantities of methanol, whereby a yellow aromatic polycarbonate resin No. 7 (in the form of a block copolymer) according to the present invention was obtained.

The structural formula of the aromatic block polycarbonate resin No. 7 is shown in TABLE 2, and the composition ratios of the structural units are put beside the respective structural units, on the supposition that the total number of structural units is 1.

The polystyrene-reduced number-average molecular weight (Mn) and weight-average molecular weight (Mw) of the polycarbonate resin No. 7, which were measured by gel permeation chromatography, were respectively 44,000 and 112,000.

Figure 25:
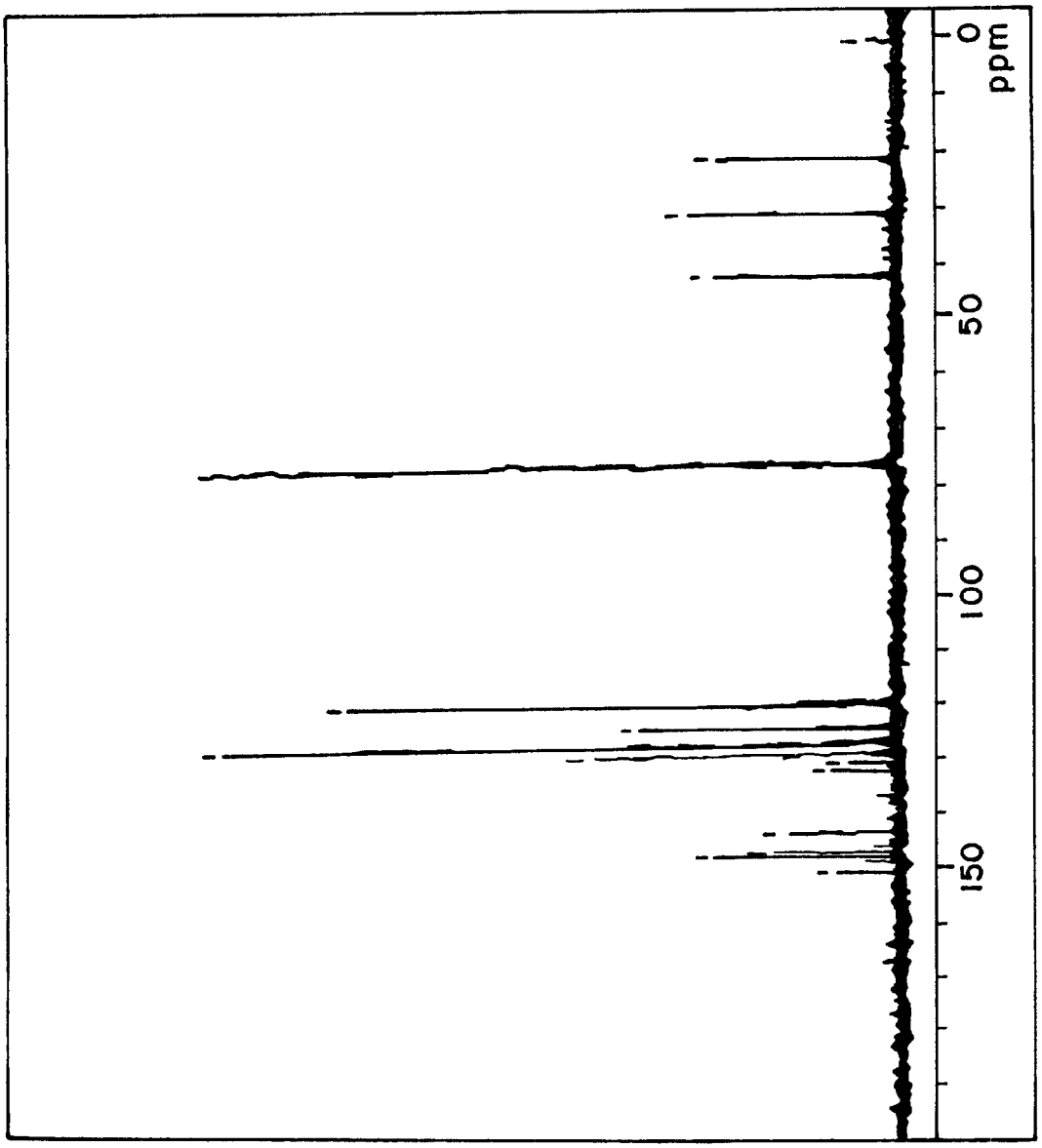
FIG. 25 is $^{13}$C-NMR spectrum of an aromatic block polycarbonate resin No. 7 obtained in Preparation Example 14.

FIG. 25 is $^{13}$C-NMR spectrum of the aromatic block polycarbonate resin No. 7, using a solvent of CDCl$_3$.

TABLE 2 also shows the results of the elemental analysis of the obtained polycarbonate resin.

The glass transition temperature (Tg) of the above obtained aromatic block polycarbonate resin No. 7 was obtained in the same manner as in Preparation Example 8. The results are shown in TABLE 3.

Preparation Examples 15 and 16

The procedure for preparation of the aromatic block polycarbonate resin No. 7 in Preparation Example 14 was repeated except that 2,2-bis(4-hydroxyphenyl)propane serving as the comonomer component used in Preparation Example 14 was replaced by 1,1-bis(4-hydroxyphenyl) cyclohexane and 2,2-bis(4-hydroxy-3-methylphenyl) propane, respectively in Preparation Examples 15 and 16.

Thus, aromatic block polycarbonate resins No. 8 and No. 9 according to the present invention were obtained.

Figure 26:
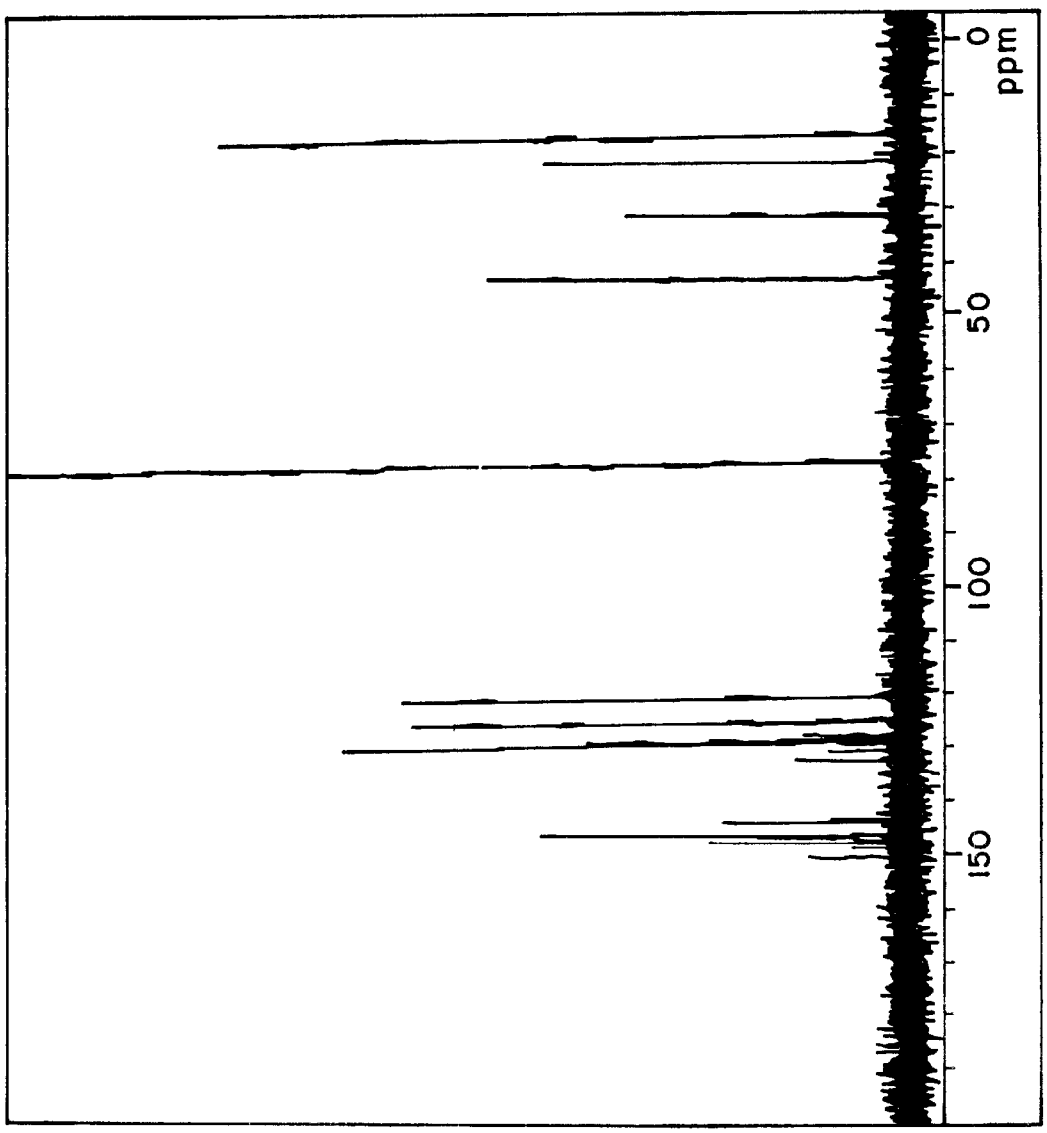
FIG. 26 is $^{13}$C-NMR spectrum of an aromatic block polycarbonate resin No. 8 obtained in Preparation Example 15.
Figure 27:
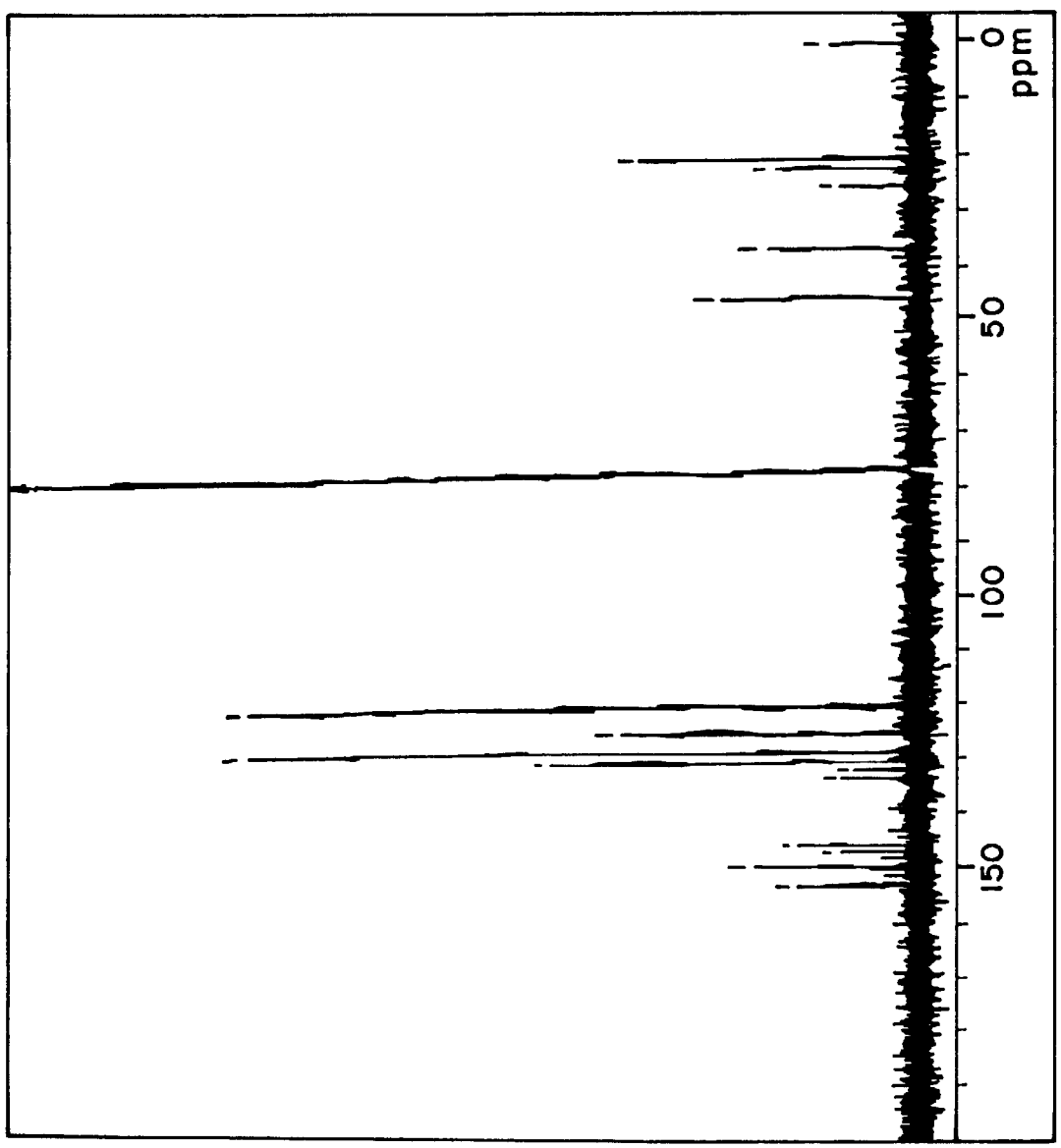
FIG. 27 is $^{13}$C-NMR spectrum of an aromatic block polycarbonate resin No. 9 obtained in Preparation Example 16.

FIG. 26 and FIG. 27 are $^{13}$C-NMR spectra of the aromatic block polycarbonate resins No. 8 and No. 9, respectively, by use of a solvent of CDCl$_3$.

TABLE 2 shows the structural formula, the results of the elemental analysis, and the number-average molecular weight and the weight-average molecular weight of each of the obtained aromatic block polycarbonate resins No. 8 and No. 9.

The glass transition temperature (Tg) of each aromatic block polycarbonate resin was obtained in the same manner as in Preparation Example 8. The results are shown in TABLE 3.

Preparation Example 17

The procedure for preparation of the aromatic block polycarbonate resin No. 1 in Preparation Example 8 was repeated except that the diol compound (Compound No. 2 prepared in Preparation Example 2) serving as the comonomer component used in Preparation Example 8 was replaced by the diol compound (Compound No. 7 prepared in Preparation Example 7).

Thus, an aromatic block polycarbonate resin No. 10 according to the present invention was obtained.

TABLE 2 shows the structural formula, the results of the elemental analysis, and the number-average molecular weight and the weight-average molecular weight of the obtained aromatic block polycarbonate resin No. 10.

TABLE 2

| Preparation Example No. | Aromatic Block Polycarbonate Resin No. | Structural of Formula Aromatic Block Polycarbonate Resin | Molecular Weight Mn | Molecular Weight Mw | Elemental Analysis % C Found (Calcd.) | % H Found (Calcd.) | % N Found (Calcd.) |
|---|---|---|---|---|---|---|---|
| 8 | 1 | 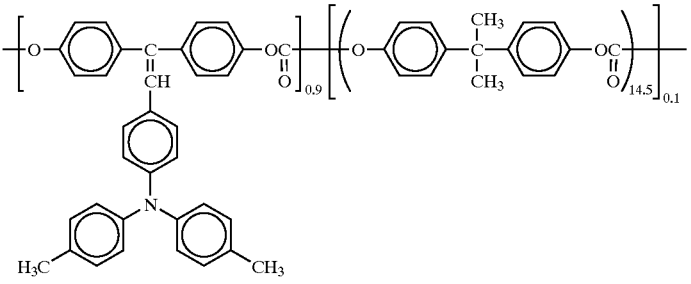 | 46000 | 141000 | 79.38 (79.50) | 5.30 (5.43) | 1.38 (1.56) |
| 9 | 2 | 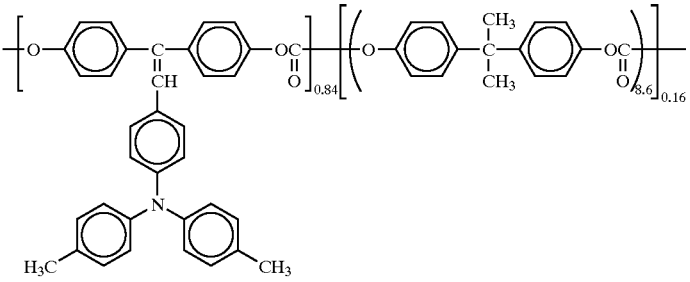 | 43000 | 144000 | 79.58 (79.50) | 5.31 (5.43) | 1.26 (1.56) |
| 10 | 3 | 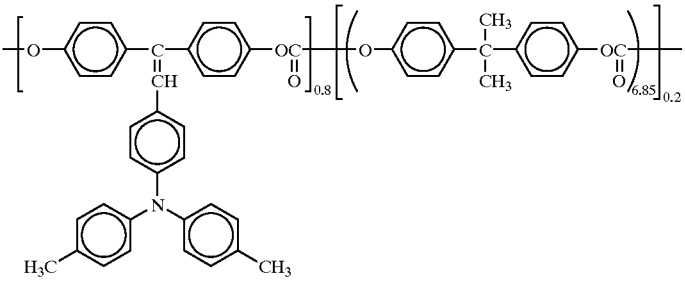 | 44000 | 151000 | 79.58 (79.50) | 5.33 (5.43) | 1.25 (1.56) |
| 11 | 4 | 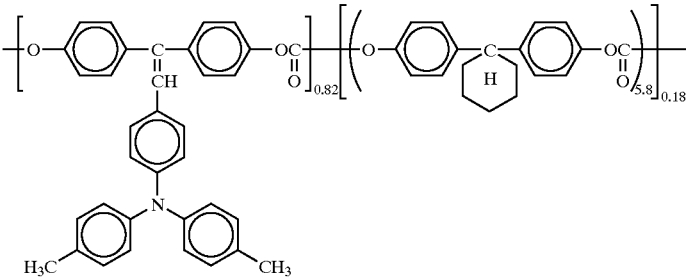 | 33000 | 112000 | 80.53 (80.34) | 5.64 (5.70) | 1.63 (1.56) |

TABLE 2-continued

| Preparation Example No. | Aromatic Block Polycarbonate Resin No. | Structural of Formula Aromatic Block Polycarbonate Resin | Molecular Weight Mn | Mw | Elemental Analysis % C Found (Calcd.) | % H Found (Calcd.) | % N Found (Calcd.) |
|---|---|---|---|---|---|---|---|
| 12 | 5 | (structure) | 45000 | 149000 | 80.13 (79.93) | 5.79 (5.81) | 1.59 (1.56) |
| 13 | 6 | (structure) | 38000 | 131000 | 79.76 (79.93) | 5.78 (5.81) | 1.39 (1.56) |
| 14 | 7 | (structure) | 44000 | 112000 | 79.83 (79.12) | 5.35 (5.44) | 1.45 (1.41) |

TABLE 2-continued

| Preparation Example No. | Aromatic Block Polycarbonate Resin No. | Structural of Formula Aromatic Block Polycarbonate Resin | Molecular Weight Mn | Mw | Elemental Analysis % C Found (Calcd.) | % H Found (Calcd.) | % N Found (Calcd.) |
|---|---|---|---|---|---|---|---|
| 15 | 8 | (structure) | 41000 | 108000 | 80.15 (80.07) | 5.68 (5.74) | 1.30 (1.41) |
| 16 | 9 | (structure) | 44000 | 131000 | 79.88 (79.60) | 5.80 (5.87) | 1.47 (1.41) |
| 17 | 10 | (structure) | 36000 | 123000 | 79.12 (79.26) | 5.97 (5.93) | 1.10 (1.25) |

TABLE 3

| Preparation Example | Block Polycarbonate Resin | Tg (° C.) |
|---|---|---|
| Ex. 8 | No. 1 | 175.9 |
| Ex. 9 | No. 2 | 175.1 |
| Ex. 10 | No. 3 | 175.9 |
| Ex. 11 | No. 4 | 187.3 |
| Ex. 12 | No. 5 | 159.1 |
| Ex. 13 | No. 6 | 107.3, 158.5 |
| Ex. 14 | No. 7 | 173.3 |
| Ex. 15 | No. 8 | 188.1 |
| Ex. 16 | No. 9 | 158.1 |

EXAMPLE 1

[Fabrication of Electrophotographic Photoconductor No. 1]

(Formation of Undercoat Layer)

A commercially available polyamide resin (Trademark "CM-8000", made by Toray Industries, Inc.) was dissolved in a mixed solvent of methanol and butanol, so that a coating liquid for undercoat layer was prepared. The thus prepared coating liquid was coated on an aluminum plate by a doctor blade, and dried at room temperature, so that an undercoat layer with a thickness of 0.3 µm was provided on the aluminum plate.

(Formation of Charge Generation Layer)

A coating liquid for charge generation layer was prepared by pulverizing and dispersing a bisazo compound of the following formula (A), serving as a charge generation material, in a mixed solvent of cyclohexanone and 2-butanone using a ball mill. The thus obtained coating liquid was coated on the above prepared undercoat layer by a doctor blade, and dried at room temperature. Thus, a charge generation layer with a thickness of 0.5 µm was formed on the undercoat layer.

[Bisazo compound]

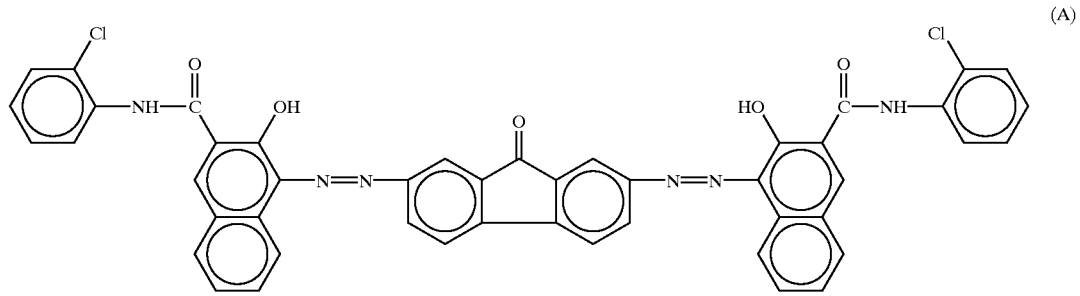

(A)

(Formation of Charge Transport Layer)

The aromatic block polycarbonate resin No. 1 prepared in Preparation Example 8, serving as a charge transport material, was dissolved in dichloromethane to prepare a coating liquid for charge transport layer. The thus obtained coating liquid was coated on the above prepared charge generation layer by a doctor blade, and dried at room temperature and then at 120° C. for 20 minutes, so that a charge transport layer with a thickness of 20 μm was provided on the charge generation layer.

Thus, an electrophotographic photoconductor No. 1 according to the present invention was fabricated.

EXAMPLES 2 TO 9

The procedure for fabrication of the electrophotographic photoconductor No. 1 in Example 1 was repeated except that the aromatic block polycarbonate resin No. 1 for use in the charge transport layer coating liquid in Example 1 was replaced by the aromatic polycarbonate resins No. 2 to No. 9, respectively in Examples 2 to 9.

Thus, electrophotographic photoconductors No. 2 to No. 9 according to the present invention were fabricated.

Each of the electrophotographic photoconductors No. 1 to No. 9 according to the present invention respectively fabricated in Examples 1 to 9 was charged negatively in the dark under application of −6 kV of corona charge for 20 seconds, using a commercially available electrostatic copying sheet testing apparatus ("Paper Analyzer Model SP-42825" made by Kawaguchi Electro Works Co., Ltd.). The surface potential (Vm) of each photoconductor was measured.

Then, each electrophotographic photoconductor was allowed to stand in the dark for 20 seconds without applying any charge thereto, and the surface potential (Vo) of the photoconductor was measured.

Each photoconductor was then illuminated by a tungsten lamp in such a manner that the illuminance on the illuminated surface of the photoconductor was 5.3 lux, and the exposure $E_{1/2}$ (lux·sec) required to reduce the initial surface potential Vo (V) to ½ the initial surface potential Vo (V) was measured.

The results are shown in TABLE 4.

TABLE 4

| Example No. | Block Polycarbonate Resin No. | Vm (V) | VO (V) | $E_{1/2}$ (lux · sec) |
|---|---|---|---|---|
| 1 | No. 1 | −1407 | −1261 | 1.15 |
| 2 | No. 2 | −1550 | −1406 | 1.1 |
| 3 | No. 3 | −1519 | −1372 | 1.07 |
| 4 | No. 4 | −1446 | −1322 | 1.04 |
| 5 | No. 5 | −1495 | −1378 | 1.12 |
| 6 | No. 6 | −1473 | −1339 | 1.04 |
| 7 | No. 7 | −1477 | −1326 | 0.99 |
| 8 | No. 8 | −1545 | −1415 | 1.02 |
| 9 | No. 9 | −1464 | −1320 | 0.88 |

Further, each of the electrophotographic conductors No. 1 to No. 9 according to the present invention was set in a commercially available electrophotographic copying machine, and the photoconductor was charged and exposed to light images via original images to form latent electrostatic images thereon. Then, the latent electrostatic images formed on the photoconductor were developed into visible toner images by a dry developer, and the visible toner images were transferred to a sheet of plain paper and fixed thereon. As a result, clear toner images were obtained on the paper. When a wet developer was employed for the image formation, clear images were formed on the paper similarly.

EXAMPLE 10

The undercoat layer and the charge generation layer were provided on the aluminum plate in the same manner as in Example 1.

[Formation of First Charge Transport Layer]

The following components were mixed to prepare a coating liquid for first charge transport layer of low-molecular charge transport material dispersed type:

| | Parts by Weight |
|---|---|
| Charge transport material of formula (B): | 8.4 |

(B)

| Polycarbonate (Trademark "Panlite TS2050", made by Teijin Chemicals Ltd. | 9.3 |
|---|---|
| Dichloromethane | 100 |

The thus prepared coating liquid was coated on the charge generation layer by a doctor blade, and dried at room temperature, so that a first charge transport layer of a low-molecular charge transport material dispersed type with a thickness of 10 μm was provided on the charge generation layer.

[Formation of Second Charge Transport Layer]

The aromatic block polycarbonate resin No. 10 synthesized in Preparation Example 17 was dissolved in dichloromethane to prepare a coating liquid for second charge transport layer.

The thus prepared coating liquid was coated on the first charge transport layer of low-molecular charge transport material dispersed type by a doctor blade, and dried at room temperature and thereafter dried at 120° C. for 20 minutes. Thus, a second charge transport layer of high-molecular charge transport material type with a thickness of 10 μm was provided on the first charge transport layer of low-molecular charge transport material dispersed type.

Thus, an electrophotographic photoconductor No. 10 according to the present invention was fabricated.

EXAMPLE 11

The procedure for fabrication of the electrophotographic photoconductor No. 10 in Example 10 was repeated except that the charge transport material of formula (B) for use in the coating liquid for first charge transport layer used in Example 10 was replaced by the following charge transport material of formula (C):

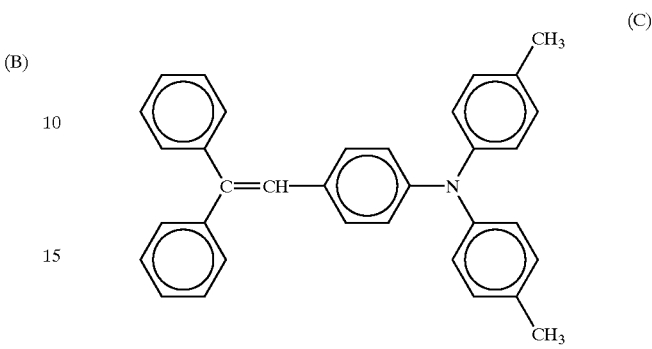

Thus, an electrophotographic photoconductor No. 11 according to the present invention was fabricated.

The photoconductive properties of the photoconductors No. 10 and No. 11 respectively fabricated in Examples 10 and 11 were evaluated in the same manner as in Example 1. The results are shown in TABLE 5.

TABLE 5

| Example No. | Block Polycarbonate Resin No. | Low-molecular CTM | Vm (V) | VO (V) | $E_{1/2}$ (lux · sec) |
|---|---|---|---|---|---|
| 10 | No. 10 | (B) | −1556 | −1356 | 0.80 |
| 11 | No. 10 | (C) | −1516 | −1281 | 0.64 |

Comparative Example 1

The procedure for fabrication of the electrophotographic photoconductor No. 5 in Example 5 was repeated except that the aromatic block polycarbonate resin No. 5 for use in the coating liquid for charge transport layer used in Example 5 was replaced by the following random polycarbonate resin of formula (D), which was proposed in Japanese Laid-Open Patent Application 9-297419 by the inventors of the present invention:

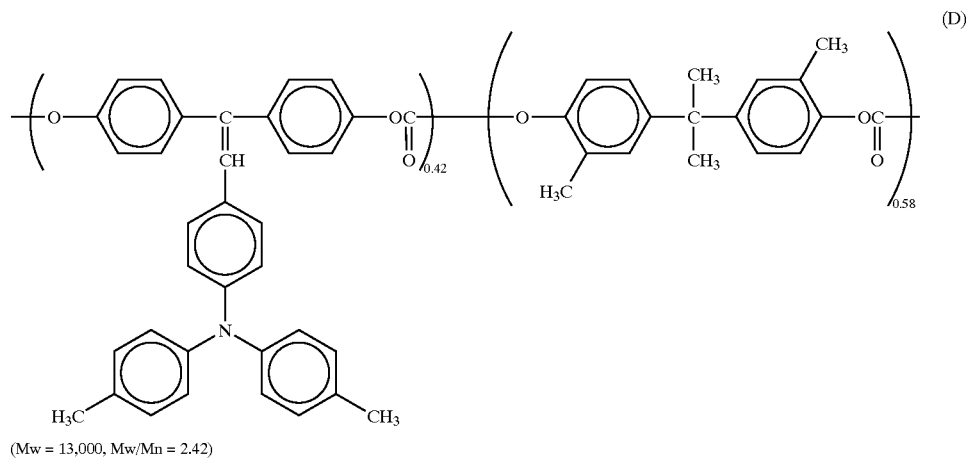

(Mw = 13,000, Mw/Mn = 2.42)

Thus, a comparative electrophotographic photo-conductor No. 1 was fabricated.

The photoconductive properties of the comparative photoconductor No. 1 were evaluated in the same manner as in Example 1. The results are as follows:

Vm=−1489 V
Vo=−1390 V
$E_{1/2}$=1.04 lux · sec

Comparative Example 2

The procedure for fabrication of the electrophotographic photoconductor No. 4 in Example 4 was repeated except that the aromatic block polycarbonate resin No. 4 for use in the coating liquid for charge transport layer in Example 4 was replaced by a random polycarbonate resin equivalent to the above-mentioned block polycarbonate resin No. 4.

Thus, a comparative electrophotographic photoconductor No. 2 was fabricated.

Figure 28:
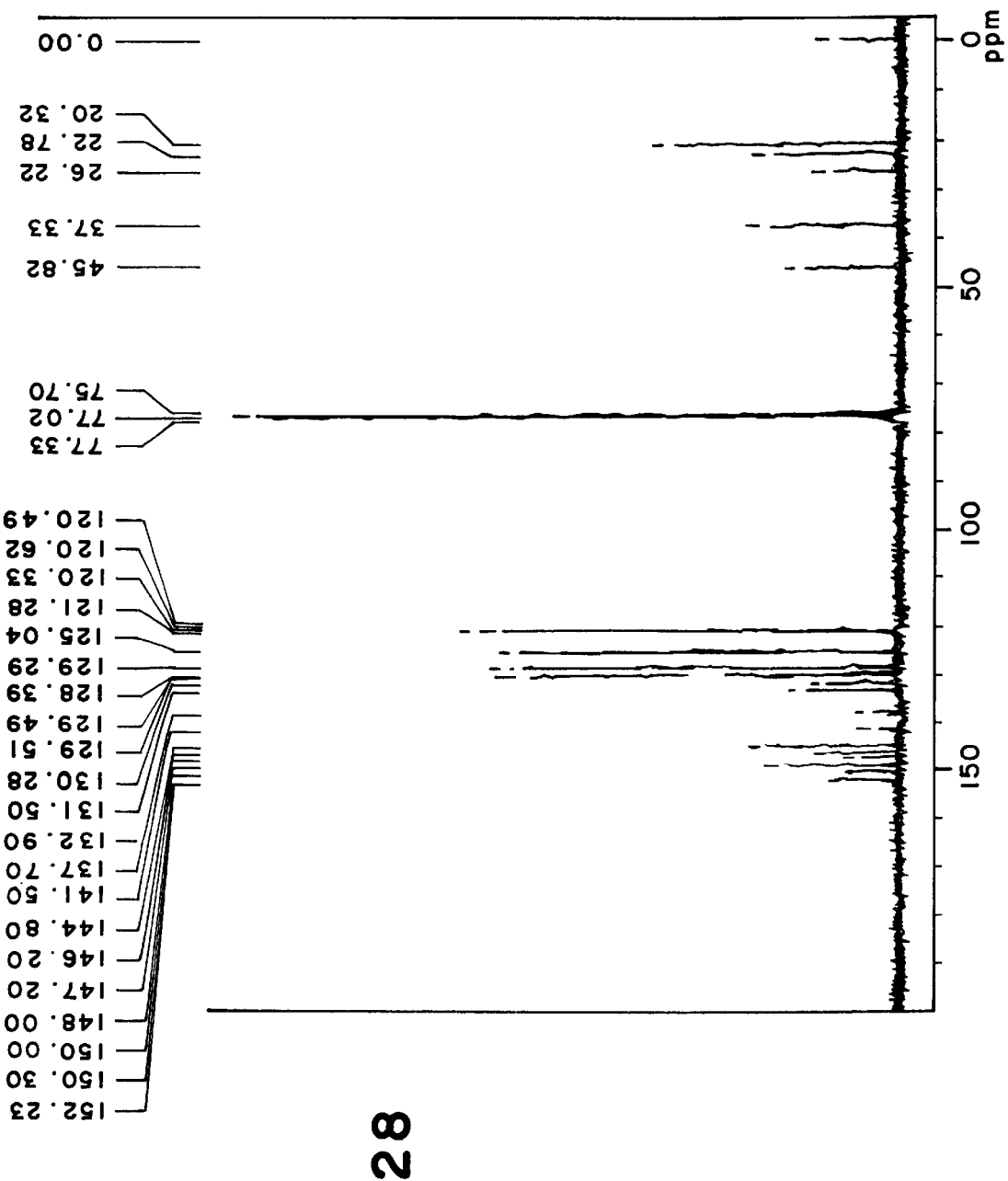
FIG. 28 is 13C-NMR spectrum of a random copolymer of polycarbonate resin with the same composition as in the block polycarbonate resin No. 4 obtained in Preparation Example 11.

FIG. 28 is $^{13}$C-NMR spectrum (by use of a solvent of $CDCl_3$) of the above-mentioned random copolymer polycarbonate resin with the same composition as in the block polycarbonate resin No. 4 obtained in Preparation Example 11.

Figure 22:
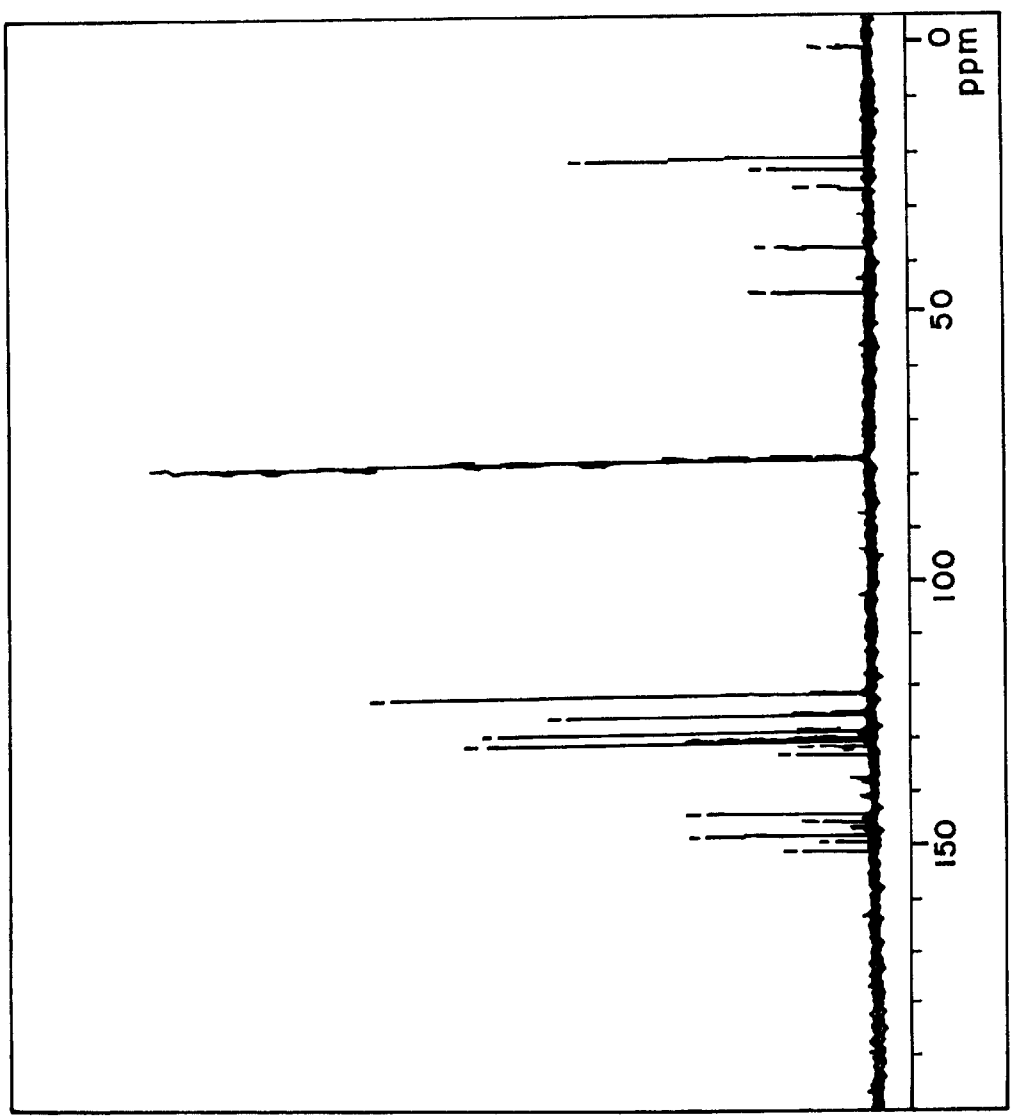
FIG. 22 is $^{13}$C-NMR spectrum of an aromatic block polycarbonate resin No. 4 obtained in Preparation Example 11.
Figure 23:
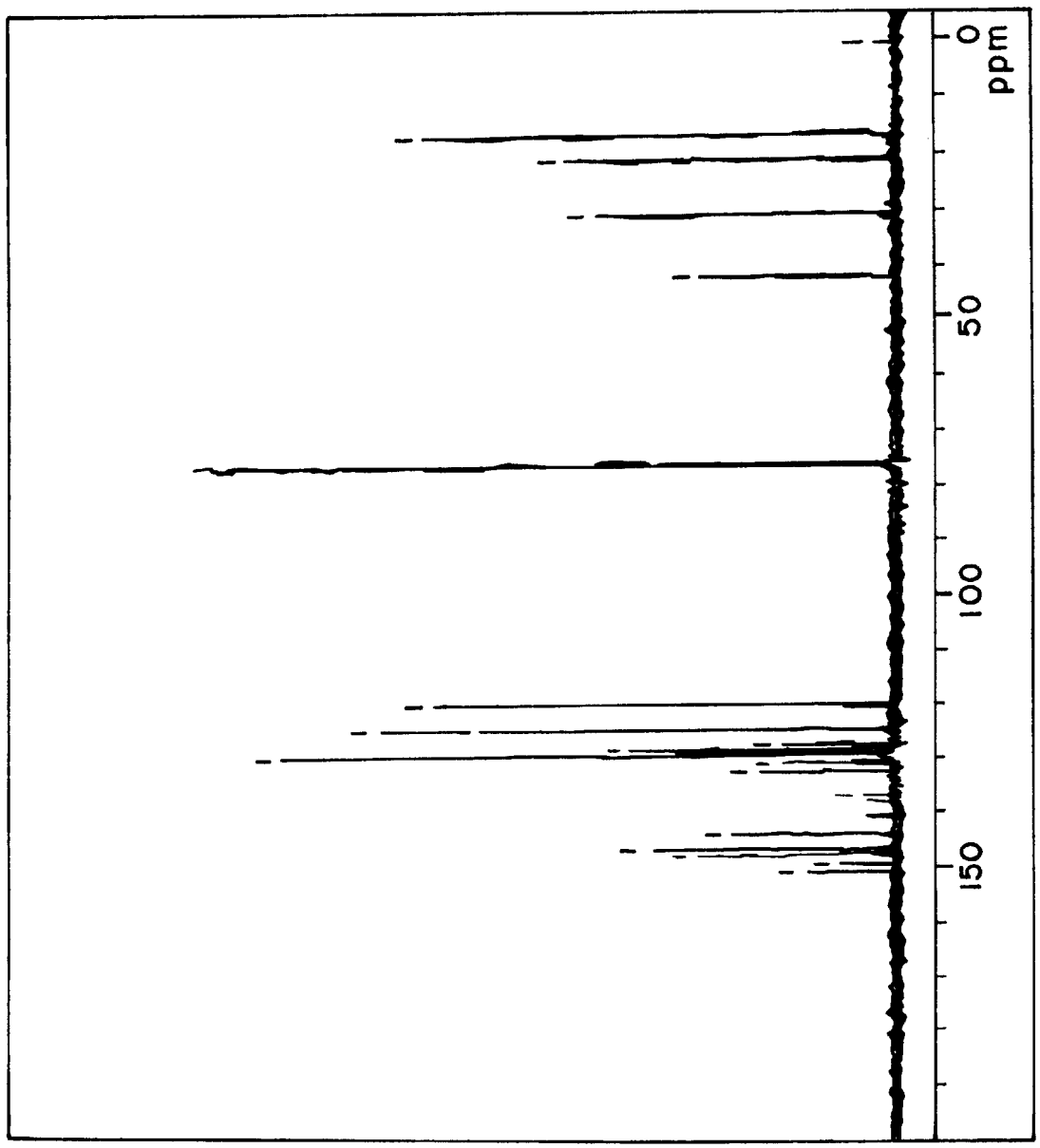
FIG. 23 is $^{13}$C-NMR spectrum of an aromatic block polycarbonate resin No. 5 obtained in Preparation Example 12.
Figure 24:
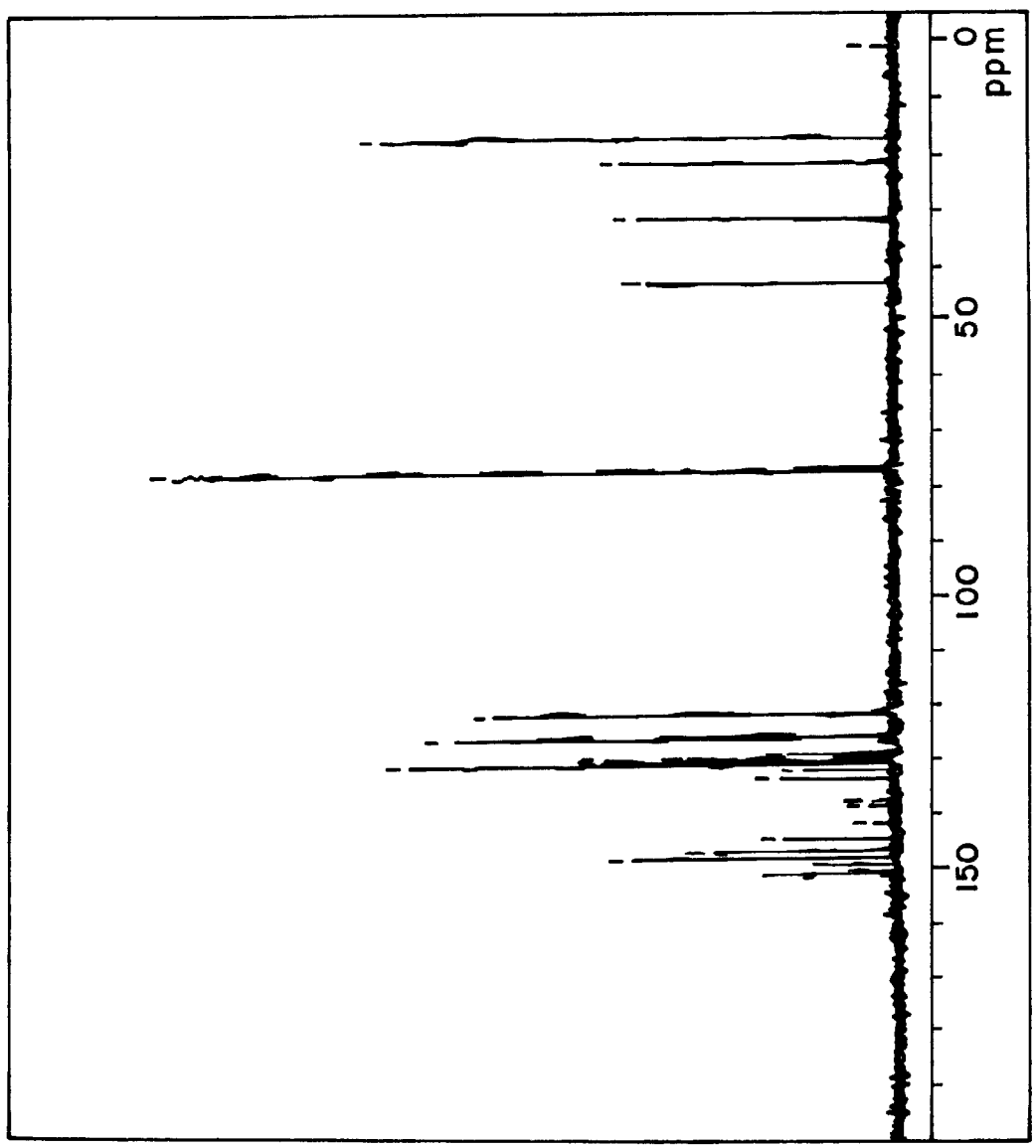
FIG. 24 is $^{13}$C-NMR spectrum of an aromatic block polycarbonate resin No. 6 obtained in Preparation Example 13.

With respect to the methyl group and methylene group in the block polycarbonate resin and the random polycarbonate resin, the chemical shifts in parts per million were obtained from FIG. 22 and FIG. 28.

The results are shown in TABLE 6.

TABLE 6

| FIG. 22 | 45.80 ppm | 37.29 ppm | 26.20 ppm | 22.74 ppm |
| FIG. 28 | 45.82 ppm | 37.32 ppm | 26.22 ppm | 22.76 ppm |

Comparative Example 3

The procedure for fabrication of the electrophotographic photoconductor No. 5 in Example 6 was repeated except that the aromatic block polycarbonate resin No. 6 for use in the coating liquid for charge transport layer in Example 6 was replaced by a random polycarbonate resin equivalent to the above-mentioned block polycarbonate resin No. 6.

Thus, a comparative electrophotographic photoconductor No. 3 was fabricated.

With respect to the photoconductors No. 4 to No. 6 according to the present invention, respectively fabricated in Examples 4 to 6, and the comparative photoconductors No. 1 to No. 3, the surface potential $V_{30}$ (V) of each photoconductor was measured after the surface of the photoconductor was exposed to tungsten lamp for 30 seconds. The results are shown in TABLE 7.

TABLE 7

|  | Charge Transport Material | $V_{30}$ (V) |
| --- | --- | --- |
| Ex. 4 | Block polycarbonate resin No. 4 | −4 |
| Comp. Ex. 2 | Random polycarbonate resin equivalent to the above | −14 |
| Ex. 5 | Block polycarbonate resin No. 5 | −3 |
| Comp Ex. 1 | Random polycarbonate resin equivalent to the above (formula D) | −16 |
| Ex. 6 | Block polycarbonate resin No. 6 | −2 |
| Comp. Ex. 3 | Random polycarbonate resin equivalent to the above | −16 |

As can be seen from TABLE 7, when the photoconductors employ the block polycarbonate resins according to the present invention, the increase of residual potential can be reduced as compared with the comparative photoconductors employing the random polycarbonate resins.

Comparative Examples 4 to 6

The procedure for fabrication of the electrophotographic photoconductor No. 1 in Example 1 was repeated except that the aromatic block polycarbonate resin No. 1 for use in the coating liquid for charge transport layer in Example 1 was replaced by each of the following random polycarbonate resins with formulas (E), (F), and (G), disclosed in Japanese Laid-Open Patent Application 9-297419, respectively in Comparative Examples 4, 5 and 6.

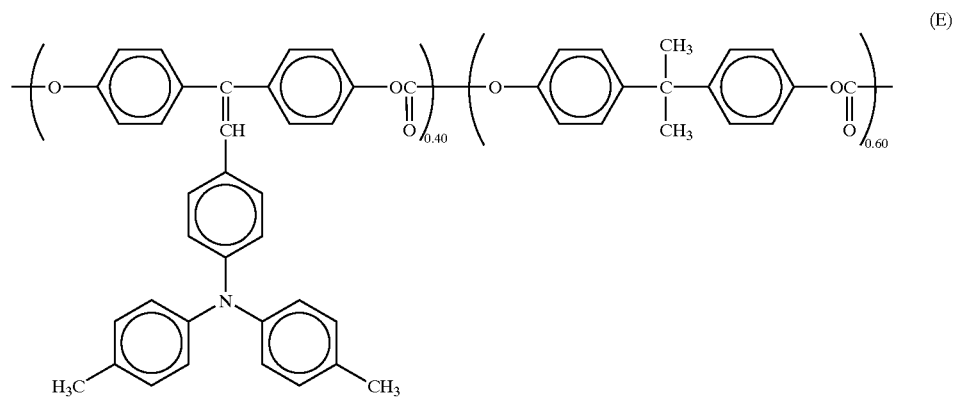

(E)

(Mw = 171,100, Mw/Mn = 2.81, Tg = 172.5°)

-continued

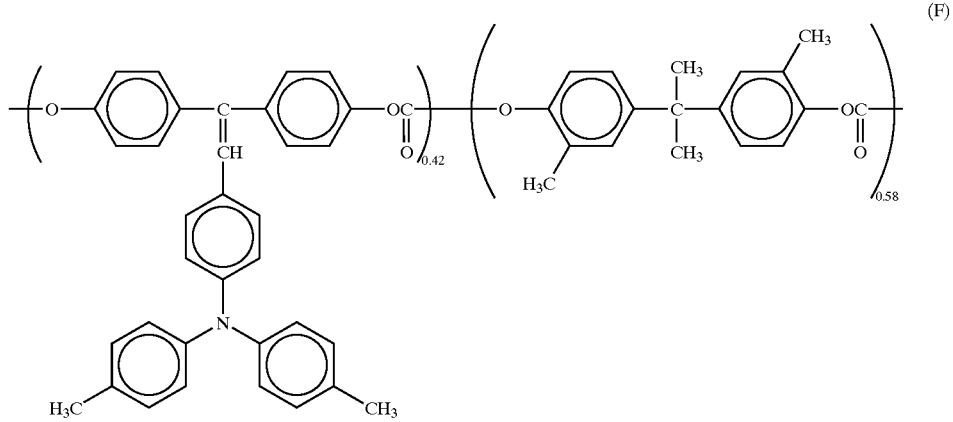

(Mw = 130,000 Mw/Mn = 2.42, Tg = 155.9°)

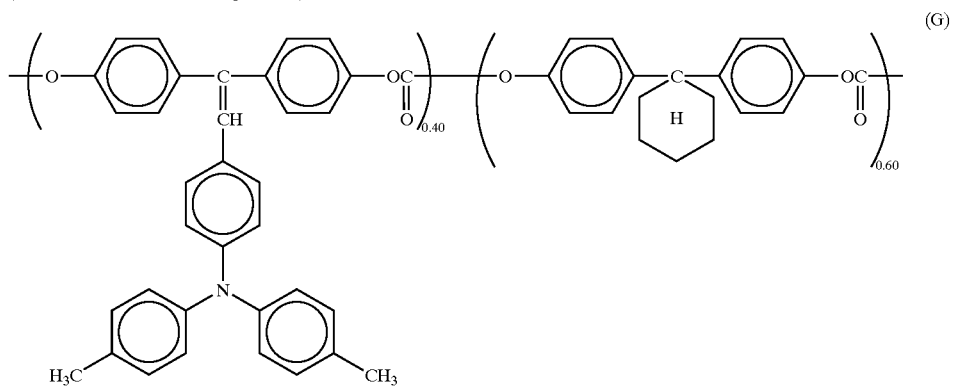

(Mw = 138,500 Mw/Mn = 2.91, Tg = 184.0°)

Thus, comparative electrophotographic photoconductors No. 4 to No. 6 were fabricated.

The electrophotographic photoconductors Nos. 1 to 9 according to the present invention respectively fabricated in Examples 1 to 9, and the comparative electrophotographic photoconductors Nos. 4 to 6 respectively fabricated in Comparative Examples 4 to 6 were subjected to an abrasion test in accordance with JIS K 7204(1995), using a commercially available Taber abrader with truck wheels (CS-5), made by Toyo Seiki Seisaku-sho, Ltd.

The abrasion amount of each photoconductor was measured under the application of a load of 1 kg after 3000 rotations.

The results are shown in TABLE 8.

TABLE 8

| Example No. | Abrasion Amount (mg) |
| --- | --- |
| Example 1 | 3.78 |
| Example 2 | 3.78 |
| Example 3 | 3.88 |
| Example 4 | 3.67 |
| Example 5 | 3.46 |
| Example 6 | 3.47 |
| Example 7 | 3.84 |
| Example 8 | 3.50 |
| Example 9 | 3.87 |
| Comparative Example 4 | 4.20 |

TABLE 8-continued

| Example No. | Abrasion Amount (mg) |
| --- | --- |
| Comparative Example 5 | 4.18 |
| Comparative Example 6 | 5.40 |

As is apparent from the results shown in TABLE 8, the abrasion resistance of the photoconductor employing a block polycarbonate resin is considered to be superior to that of the photoconductor employing the random polycarbonate resin with the same composition as in the above block polycarbonate resin.

As previously explained, the aromatic block polycarbonate resins of the present invention can effectively function as the photoconductive materials in the electrophotographic photoconductor. Such block polycarbonate resins are optically or chemically sensitized with a sensitizer such as a dye or a Lewis acid.

When the electrophotographic photoconductor of the present invention comprises a photoconductive layer comprising the block polycarbonate resin of formula (3), (6), or (7) as the effective component, the obtained photoconductor shows high sensitivity and high durability because any block polycarbonate resin is provided with high charge transporting properties and high mechanical strength.

Japanese Patent Application No. 11-281648 filed Oct. 1, 1999, Japanese Patent Application No. 11-226521 filed Aug.

10, 1999, and Japanese Patent Application No. 2000-224229 filed Jul. 25, 2000 are hereby incorporated by reference.

What is claimed is:

1. An aromatic block polycarbonate resin prepared by polymerizing:
   a diphenol compound having a tertiary amine structure,
   a diol compound represented by formula (1), and
   a halogenated carbonyl compound

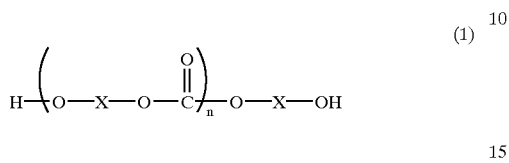

(1)

wherein n is an integer of 1 to 50; and X is a bivalent group represented by formulae (1-b) or (1-c):

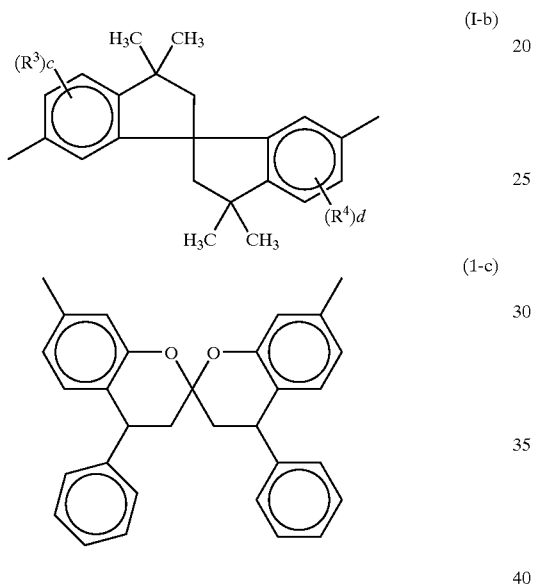

in which $R^3$ and $R^4$ are each independently an alkyl group which may have a substituent, an aryl group which may have a substituent, or a halogen atom; c and d are each independently an integer of 0 to 3;

wherein said aromatic block polycarbonate resin is represented by formula (3):

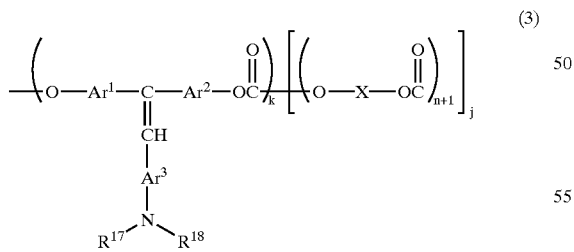

(3)

wherein $Ar^1$, $Ar^2$, and $Ar^3$ are each a substituted or unsubstituted arylene group, and $R^{17}$ and $R^{18}$, which may be the same or different, are each an acyl group, an alkyl group which may have a substituent, or an aryl group which may have a substituent;
wherein X and n are the same as those previously defined; and
wherein k and j represent the compositions ratios, and $0<k/(k+j)<1$.

2. The aromatic block polycarbonate resin as claimed in claim 1, wherein said diol compound of formula (1) has a number-average molecular weight of 500 to 100,000.

3. An electrophotographic photoconductor, comprising:
   an electroconductive support, and a photoconductive layer formed thereon comprising an aromatic block polycarbonate resin of formula (3):

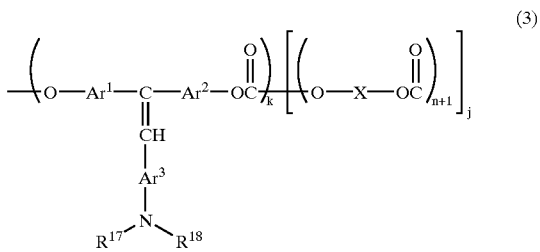

(3)

wherein $Ar^1$, $Ar^2$, and $Ar^3$ are each a substituted or unsubstituted arylene group, and $R^{17}$ and $R^{18}$, which may be the same or different, are each an acyl group, an alkyl group which may have a substituent, or an aryl group which may have a substituent; n is an integer of 1 to 50; k and j represent the composition ratios, and $0<k/(k+j)<1$; and X is a substituted or unsubstituted bivalent aliphatic group, a substituted or unsubstituted bivalent cyclic aliphatic group, a substituted or unsubstituted bivalent aromatic group, a bivalent group prepared by bonding the bivalent groups, or a bivalent group represented by formulae (1-a), (1-b), or (1-c):

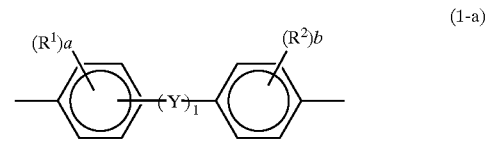

(1-a)

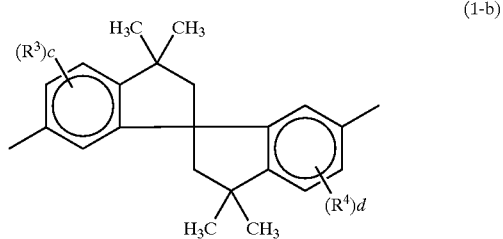

(1-b)

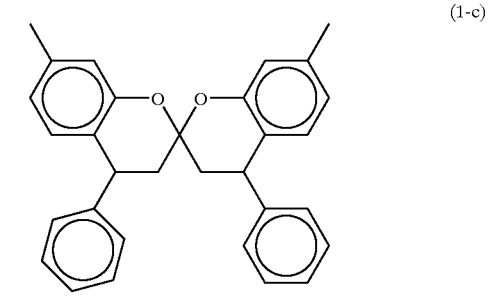

(1-c)

in which $R^1$, $R^2$, $R^3$, and $R^4$ are each independently an alkyl group which may have a substituent, an aryl group which may have a substituent, or a halogen atom; a and b are each independently an integer of 0 to 4; c and d are each independently an integer of 0 to 3; and l is an integer of 0 or 1, and when l=1, Y is a straight-chain alkylene group having 2 to 12 carbon atoms, a substituted or unsubstituted branched alkylene group having 3 to 12 carbon atoms, a bivalent group comprising (1) at least one alkylene group having 1 to 10 carbon atoms and (2) at least one oxygen atom and/or one sulfur atom, —O—, —S—, —SO—, —SO$_2$—, —CO—, —COO—,

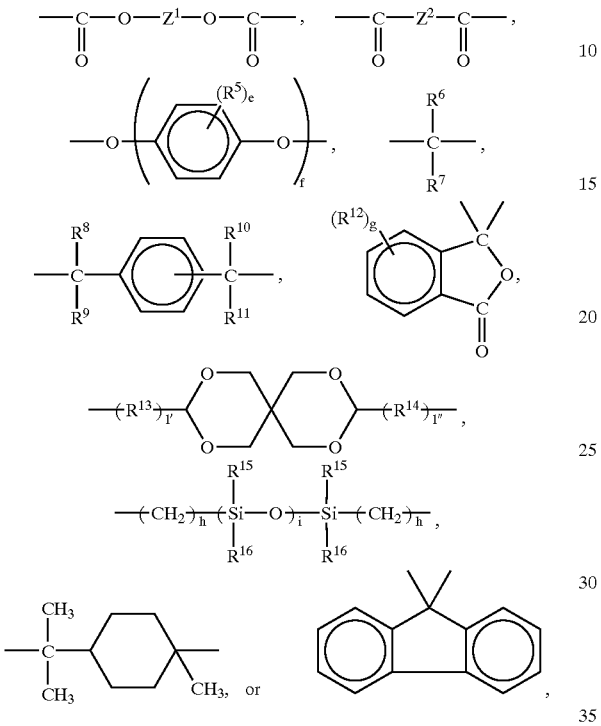

in which $Z^1$ and $Z^2$ are each a substituted or unsubstituted bivalent aliphatic group, or a substituted or unsubstituted arylene group; $R^5$, $R^6$, and $R^{12}$ are each independently a halogen atom, a substituted or unsubstituted alkyl group, a substituted or unsubstituted alkoxyl group, or a substituted or unsubstituted aryl group, $R^7$, $R^8$, $R^9$, $R^{10}$, and $R^{11}$ are each independently a hydrogen atom, a halogen atom, a substituted or unsubstituted alkyl group, a substituted or unsubstituted alkoxy group, or a substituted or unsubstituted aryl group, and $R^6$ and $R^7$ may form together a carbon ring having 5 to 12 carbon atoms; l' and l'' are each an integer of 0 or 1, and when l'=1 and l''=1, $R^{13}$ and $R^{14}$ are each an alkylene group having 1 to 4 carbon atoms; $R^{15}$ and $R^{16}$ are each independently a substituted or unsubstituted alkyl group or a substituted or unsubstituted aryl group; e and g are each independently an integer of 0 to 4; f is an integer of 1 or 2; h is an integer of 0 to 20; and i is an integer of 0 to 2000;

wherein said photoconductive layer comprises a charge generation layer and a charge transport layer which are successively provided on said electroconductive support, said charge transport layer comprising said aromatic block polycarbonate resin;

wherein said charge transport layer is provided on said charge generation layer;

wherein said charge transport layer comprises a first charge transport layer and a second charge transport layer which are successively overlaid on said charge generation layer in this order, said second charge transport layer comprising said aromatic block polycarbonate resin.

4. An aromatic block polycarbonate resin, prepared by polymerizing:

a diphenol compound having a tertiary amine structure, a diol compound represented by formula (1), and a halogenated carbonyl compound

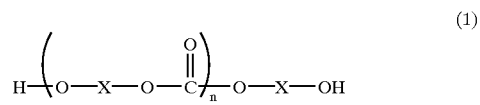

wherein n is an integer of 1 to 50; and X is a substituted or unsubstituted bivalent aliphatic group, a substituted or unsubstituted bivalent cyclic aliphatic group, a substituted or unsubstituted bivalent aromatic group, a bivalent group prepared by bonding the aforementioned bivalent groups, or a bivalent group represented by formulae (1-a), (1-b), or (1-c):

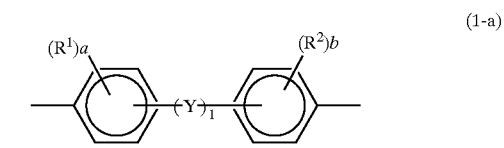

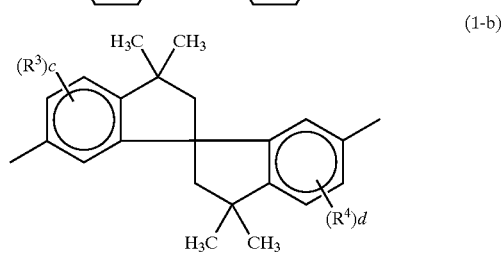

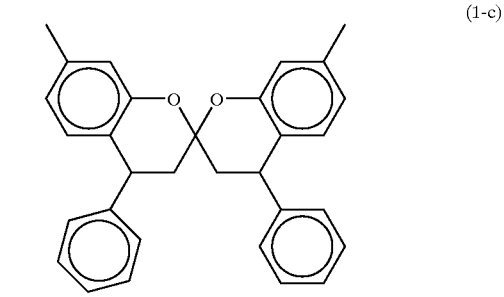

in which $R^1$, $R^2$, $R^3$, and $R^4$ are each independently an alkyl group which may have a substituent, an aryl group which may have a substituent, or a halogen atom; a and b are each independently an integer of 0 to 4; c and d are each independently an integer of 0 to 3; and l is an integer of 0 or 1, and when l=1, Y is a straight-chain alkylene group having 2 to 12 carbon atoms, a substituted or unsubstituted branched alkylene group having 3 to 12 carbon atoms, a bivalent group comprising (1) at least one alkylene group having 1 to 10 carbon atoms and (2) at least one oxygen atom and/or one sulfur atom, —O—, —S—, —SO—, —SO$_2$—, —CO—, —COO—,

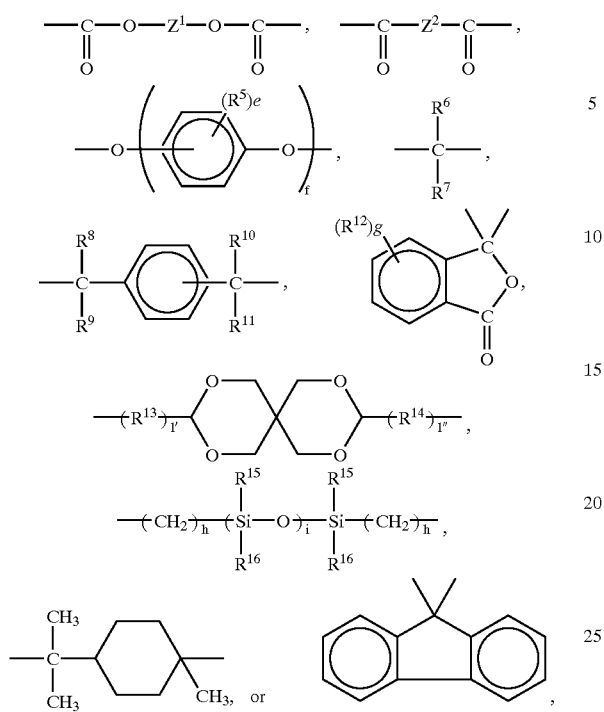

in which $Z^1$ and $Z^2$ are each a substituted or unsubstituted bivalent aliphatic group, or a substituted or unsubstituted arylene group; $R^5$, $R^6$, and $R^{12}$ are each independently a halogen atom, a substituted or unsubstituted alkyl group, a substituted or unsubstituted alkoxyl group, or a substituted or unsubstituted aryl group, $R^7$, $R^8$, $R^9$, $R^{10}$ and $R^{11}$ are each independently a hydrogen atom, a halogen atom, a substituted or unsubstituted alkyl group, a substituted or unsubstituted alkoxy group, or a substituted or unsubstituted aryl group, and $R^6$ and $R^7$ may form together a carbon ring having 5 to 12 carbon atoms; l' and l" are each an integer of 0 or 1, and when l'=1 and l"=1, $R^{13}$ and $R^{14}$ are each an alkylene group having 1 to 4 carbon atoms; $R^{15}$ and $R^{16}$ are each independently a substituted or unsubstituted alkyl group or a substituted or unsubstituted aryl group; e and g are each independently an integer of 0 to 4; f is an integer of 1 or 2; h is an integer of 0 to 20; and i is an integer of 0 to 2000;

wherein said aromatic block polycarbonate resin is represented by formula (3):

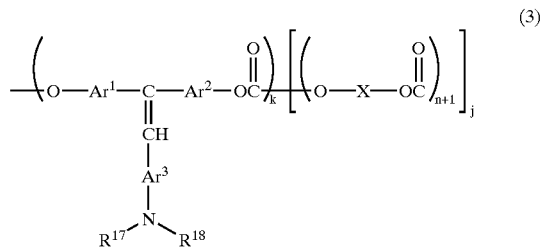

wherein $Ar^1$, $Ar^2$, and $Ar^3$ are each a substituted or unsubstituted arylene group, and $R^{17}$ and $R^{18}$, which may be the same or different, are each an acyl group, an alkly group which may have a substituent, or an aryl group which may have a substituent;

wherein X and n are the same as those previously defined; and wherein k and j represent the compositions ratios, and $0<k/(k+j)<1$;

wherein at least one of $R^{17}$ and $R^{18}$ is an acyl group or an alkyl group.

\* \* \* \* \*

UNITED STATES PATENT AND TRADEMARK OFFICE
CERTIFICATE OF CORRECTION

PATENT NO.     : 6,576,386 B1
DATED          : June 10, 2003
INVENTOR(S)    : Ri et al.

It is certified that error appears in the above-identified patent and that said Letters Patent is hereby corrected as shown below:

<u>Title page,</u>
Item [73], Assignee, should read:
-- [73]   Assignee:   Ricoh Company, Ltd., Tokyo (JP);
                     Hodogaya Chemical Co., Ltd.,
                     Kawasaki (JP) --

Signed and Sealed this

Eighteenth Day of November, 2003

JAMES E. ROGAN
*Director of the United States Patent and Trademark Office*